United States Patent
Arai et al.

(10) Patent No.: US 11,985,424 B2
(45) Date of Patent: May 14, 2024

(54) SIGNAL PROCESSING DEVICE AND SIGNAL PROCESSING METHOD FOR CORRECTING INPUT SIGNAL FROM SENSOR

(71) Applicants: Sony Semiconductor Solutions Corporation, Kanagawa (JP); Sony Group Corporation, Tokyo (JP)

(72) Inventors: Hiroshi Arai, Kanagawa (JP); Yuriko Ohtsuka, Kanagawa (JP); Kenichiro Nishi, Kanagawa (JP); Takeshi Masuura, Kanagawa (JP); Norimitsu Okiyama, Kanagawa (JP); Yuji Matsui, Kanagawa (JP); Satoshi Takashima, Kanagawa (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/910,355

(22) PCT Filed: Feb. 10, 2021

(86) PCT No.: PCT/JP2021/005068
§ 371 (c)(1),
(2) Date: Sep. 9, 2022

(87) PCT Pub. No.: WO2021/186961
PCT Pub. Date: Sep. 23, 2021

(65) Prior Publication Data
US 2023/0156331 A1 May 18, 2023

(30) Foreign Application Priority Data
Mar. 16, 2020 (JP) .................... 2020-045254

(51) Int. Cl.
*H04N 23/68* (2023.01)
*H04N 25/79* (2023.01)

(52) U.S. Cl.
CPC ....... *H04N 23/683* (2023.01); *H04N 23/6812* (2023.01); *H04N 25/79* (2023.01)

(58) Field of Classification Search
CPC ... H04N 23/683; H04N 23/6812; H04N 25/79
See application file for complete search history.

(56) References Cited

U.S. PATENT DOCUMENTS

| 9,361,575 B2 | 6/2016 | Sugioka |
| 2016/0379374 A1 | 12/2016 | Sokeila |

(Continued)

FOREIGN PATENT DOCUMENTS

| JP | 9-237345 A | 9/1997 |
| JP | 2014-66995 A | 4/2014 |

(Continued)

OTHER PUBLICATIONS

International Search Report and Written Opinion dated May 11, 2021, received for PCT Application PCT/JP2021/005068, filed on Feb. 10, 2021, 9 pages including English Translation.

*Primary Examiner* — Nicholas G Giles
(74) *Attorney, Agent, or Firm* — XSENSUS LLP

(57) ABSTRACT

A signal processing device according to the present technology includes a feature quantity extraction unit including a neural network and trained to extract a feature quantity for a specific event with respect to an input signal from a sensor, and a correction unit that performs correction of the input signal on the basis of the feature quantity extracted by the feature quantity extraction unit.

11 Claims, 61 Drawing Sheets

(56) References Cited

U.S. PATENT DOCUMENTS

2018/0084196 A1    3/2018  Saitwal
2019/0208181 A1    7/2019  Rowell
2020/0077023 A1*   3/2020  Kang ................. H04N 23/6812

FOREIGN PATENT DOCUMENTS

| JP | 2017-183952 A  | 10/2017 |
| JP | 2019-110525 A  | 7/2019  |
| JP | 2019-121941 A  | 7/2019  |
| WO | 2018/150685 A1 | 8/2018  |

* cited by examiner

Fig. 5
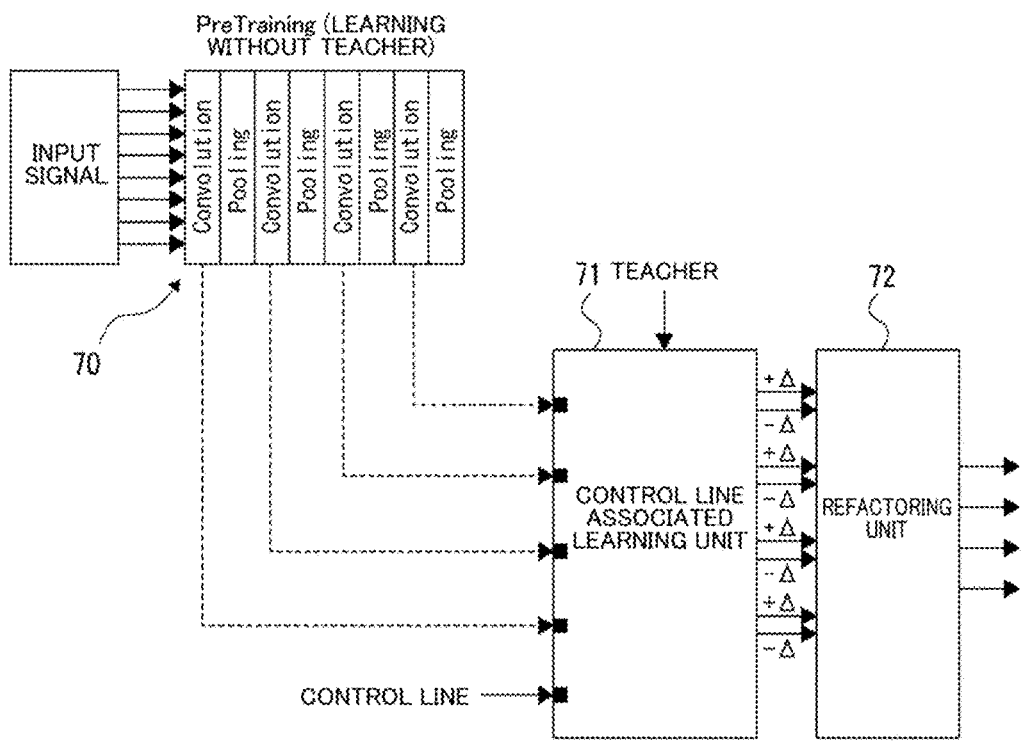
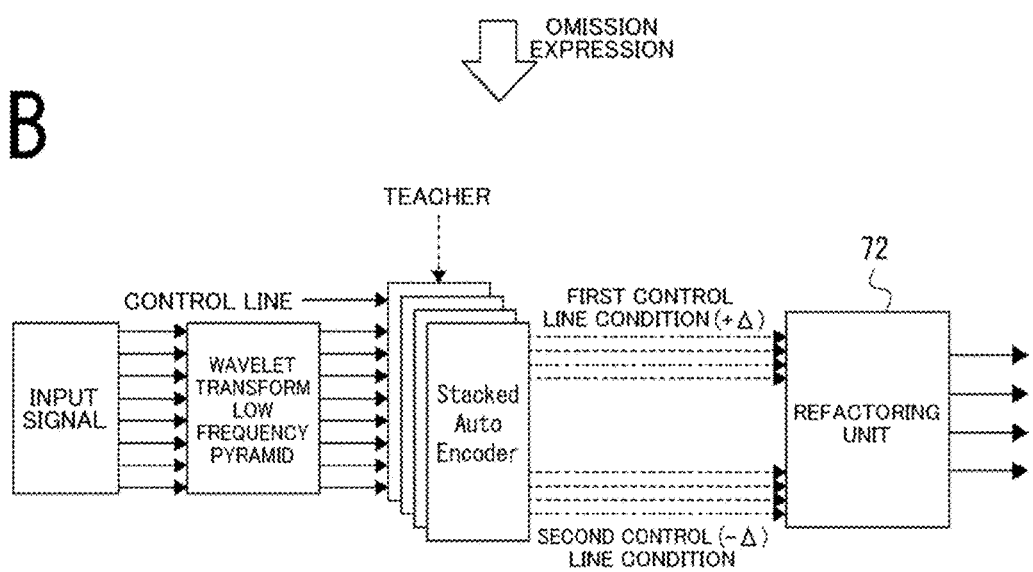

GRID POINT MESH

TRIGONOMETRIC INTERPOLATION OF
REFERENCE COORDINATES IN REMESH

Fig. 43

TRIGONOMETRIC INTERPOLATION RATIO
OBLIQUE COORDINATE SYSTEM SPANNED BY CENTER OF GRAVITY
G AND MIDPOINTS C1 AND C2 OF SIDE IS CONSIDERED
$G = (P0+P1+P2+P3)/4$
$C_1 = (P1+P3)/2$
$C_2 = (P2+P3)/2$
$P = (1-u-v)G + uC_1 + vC_2$
INTERPOLATION RATIOS u AND v CAN BE CALCULATED BY CROSS PRODUCT CALCULATION (×)
$u = \{(P-G) \times (C_2-G)\} / \{(C_1-G) \times (C_2-G)\}$
$v = \{(C_1-G) \times (P-G)\} / \{(C_1-G) \times (C_2-G)\}$

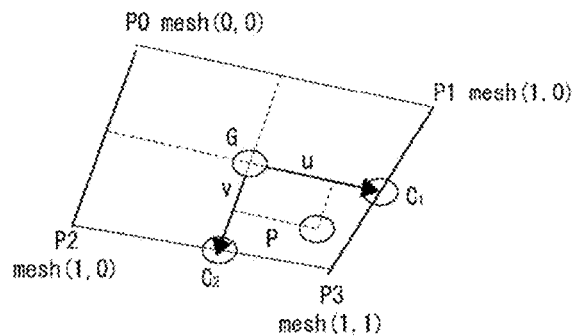

TRIGONOMETRIC INTERPOLATION IS APPLIED
$T_{00} = (T0+T1+T2+T3)/4$
$T_{01} = (T1+T3)/2$
$T_{02} = (T2+T3)/2$
INTERPOLATED VALUE $D = (1-u-v)T_{00} + uT_{01} + vT_{02}$

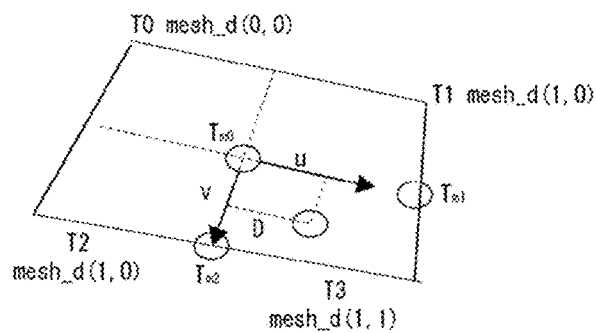

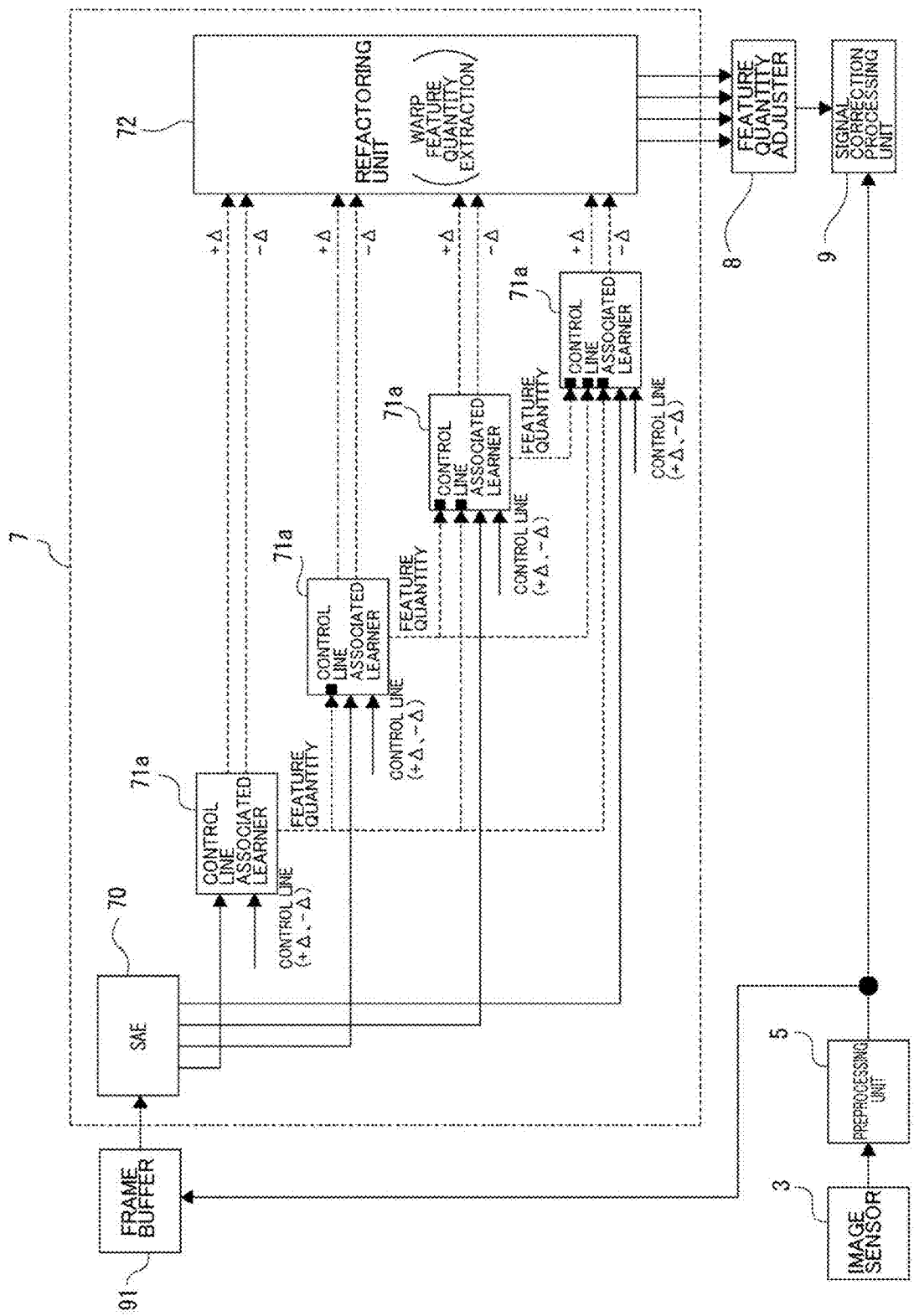

SIGNAL PROCESSING DEVICE AND SIGNAL PROCESSING METHOD FOR CORRECTING INPUT SIGNAL FROM SENSOR

CROSS-REFERENCE TO RELATED APPLICATIONS

The present application is based on PCT tiling PCT/JP2021/005068, filed Feb. 10, 2021, and claims priority to Japanese Application No. 2020-045254, filed Mar. 16, 2020, the entire contents of each are incorporated herein by reference.

TECHNICAL FIELD

The present technology relates to a signal processing device and a method therefor, and more particularly, to a technology for correcting an input signal from a sensor using artificial intelligence (AI).

BACKGROUND ART

For example, various sensors, such as a motion sensor such as an acceleration sensor or an angular velocity sensor, or an image sensor are widely used. In this type of sensor, unnecessary components such as noise may be contained in a detection signal, and it may be required to remove the components. For example, when the motion sensor is used for blur correction processing (stabilization processing) of an in-vehicle camera, a component of the centrifugal force is included in a detection signal of the motion sensor while being mixed with the gravitational acceleration in a case in which centrifugal force is generated due to traveling of a vehicle, but the component of the centrifugal force is an unnecessary component in the blur correction processing and needs to be removed. Alternatively, various noises associated with imaging (hereinafter referred to as "imaging noise") such as photon shot noise, dark current noise, and readout noise are superimposed on an image captured by an image sensor, but these imaging noises should be removed to improve the image quality.

An example of the related art can include PTL 1 below.

CITATION LIST

Patent Literature

[PTL 1]
JP 2014-66995 A

SUMMARY

Technical Problem

For example, an input signal from a sensor may be subjected to necessary correction processing such as removal processing with respect to unnecessary components as described above.

The present technology has been made in consideration of such circumstances, and an object of the present technology is to improve performance regarding correction of an input signal from a sensor.

Solution to Problem

A signal processing device according to the present technology includes a feature quantity extraction unit including a neural network and trained to extract a feature quantity for a specific event with respect to an input signal from a sensor; and a correction unit configured to perform correction of the input signal on the basis of the feature quantity extracted by the feature quantity extraction unit. Examples of the "feature quantity" for a specific event may include a feature quantity for centrifugal force or vibration as an effect when a sensor is a motion sensor for detecting motion of a target object, such as an acceleration sensor or an angular velocity sensor. That is, the feature quantity is, for example, a feature quantity representing what is centrifugal force, or a feature quantity representing what is vibration that should be given to produce a sense of presence in stabilization processing for a camera. Alternatively, when the sensor is an image sensor, examples of the feature quantity can include a feature quantity of imaging noise (feature quantity representing what is imaging noise), and a feature quantity of focus (a feature quantity representing what is focus). For example, when the feature quantity as the centrifugal force can be extracted, it is possible to realize processing of removing an adverse effect of the centrifugal force as the stabilization processing by canceling out the feature quantity in the input signal, and it is possible to improve the stabilization performance. Alternatively, when the feature quantity as the focus can be extracted, it is possible to adjust a focus position in a depth direction of the image through image correction processing using the feature quantity. That is, it is possible to adjust the focus after photographing.

In the present technology, a feature quantity for an event which is difficult to express by a mathematical equation, such as a centrifugal force or a focus, is extracted like an object by learning using artificial intelligence (AI) technology, and the input signal is corrected on the basis of the extracted feature quantity. This makes it possible to easily realize the correction processing which is difficult in filter processing of the related art.

The signal processing device according to the present technology described above can be configured to include an adjuster that adjusts the feature quantity extracted by the feature quantity extraction unit.

This makes it possible to perform the adjustment of the feature quantity so that a better result can be obtained as a correction result for the input signal.

In the signal processing device according to the present technology described above, the sensor can be a motion sensor configured to detect a motion of an imaging device, and the correction unit can be configured to include a stabilization processing unit configured to perform stabilization processing on a captured image of the imaging device on the basis of the input signal from the motion sensor corrected on the basis of the feature quantity.

This makes it possible to perform stabilization processing on the basis of a motion detection signal from which the component of the centrifugal force has been removed, for example, when the feature quantity of the centrifugal force is extracted as the feature quantity. Alternatively, when, for example, the feature quantity of the vibration as an effect is extracted as the feature quantity, it is possible to perform the stabilization processing based on the motion detection signal from which the vibration component as the effect has been removed. That is, it is possible to prevent the vibration component as the effect from being removed in the stabilization processing.

The signal processing device according to the present technology described above may include an adjuster configured to adjust the feature quantity extracted by the feature quantity extraction unit; and a score calculation unit including a neural network and trained to calculate an evaluation score representing performance of the stabilization processing on the basis of an input signal from the motion sensor, wherein the adjuster can be configured to perform adjustment of the feature quantity used for correction of the input signal by the correction unit on the basis of the evaluation score calculated by the score calculation unit. An amount of calculation can be reduced as compared with a case in which calculation of the evaluation score based on the image after the stabilization processing is performed, by calculating the evaluation score on the basis of the input signal from the motion sensor as described above.

In the signal processing device according to the present technology described above, the stabilization processing unit can be configured to generate a grid point mesh having a plurality of grid points arranged in a horizontal direction and a vertical direction in an output coordinate system as a coordinate system of an output image, motion information obtained from the input signal being associated with each grid point in the grid point mesh, and perform the stabilization processing on the basis of the motion information for each grid point in the grid point mesh.

This makes it possible to improve accuracy of the reference coordinates at each pixel position of the output image.

In the signal processing device according to the present technology described above, the correction unit can be configured to include a phase adjuster configured to calculate a delay amount generated in correction processing of the input signal on the basis of the feature quantity and perform phase adjustment for the input signal on the basis of the delay amount.

This makes it possible to realize appropriate stabilization processing even when the correction processing has a certain amount of delay.

The signal processing device according to the present technology described above can include an image sensor configured to obtain the captured image, and an integrated circuit chip including the feature quantity extraction unit and the correction unit can be configured to be mounted in the same semiconductor package as that of the image sensor.

This makes it possible to downsize the signal processing device as compared with a case in which the image sensor and the integrated circuit chip are mounted in separate packages.

In the signal processing device according to the present technology described above, the image sensor is stacked on the integrated circuit chip.

This makes it possible to stack the image sensor and the integrated circuit chip in a vertical direction in the same package and accommodate these in a small space.

Further, a signal processing method according to the present technology is a signal processing method including: performing correction of an input signal on the basis of a feature quantity extracted by a feature quantity extraction unit including a neural network and trained to extract the feature quantity for a specific event with respect to the input signal from a sensor.

Even with such a signal processing method, the same operations as that of the signal processing device according to the present technology described above can be obtained.

BRIEF DESCRIPTION OF DRAWINGS

FIG. 5 is an illustrative diagram of a simplified expression of the feature quantity extraction unit in the embodiment.

FIG. 43 is a diagram illustrating an example of trigonometric interpolation.

FIG. 64 is an illustrative diagram of a warp feature quantity extraction scheme (environment after mounting).

DESCRIPTION OF EMBODIMENTS

Hereinafter, embodiments related to the present technology will be described in the following order with reference to the attached drawings.
<1. Overall configuration of imaging device>
<2. Feature quantity extraction unit>
<3. Feature quantity adjuster>
<4. Extraction examples for various feature quantities>
<5. Game mining>
<6. Stabilization processing>
[6-1. Internal configuration of stabilization processing unit]
[6-2. Stabilization processing as embodiment]
<7. Structure example>
<8. Other peripheral technologies>
<9. Feature quantity extraction related to images>
<10. Modification example>
<11. Conclusion of embodiments>
<12. Present technology>

1. Overall Configuration of Imaging Device

Figure 1:
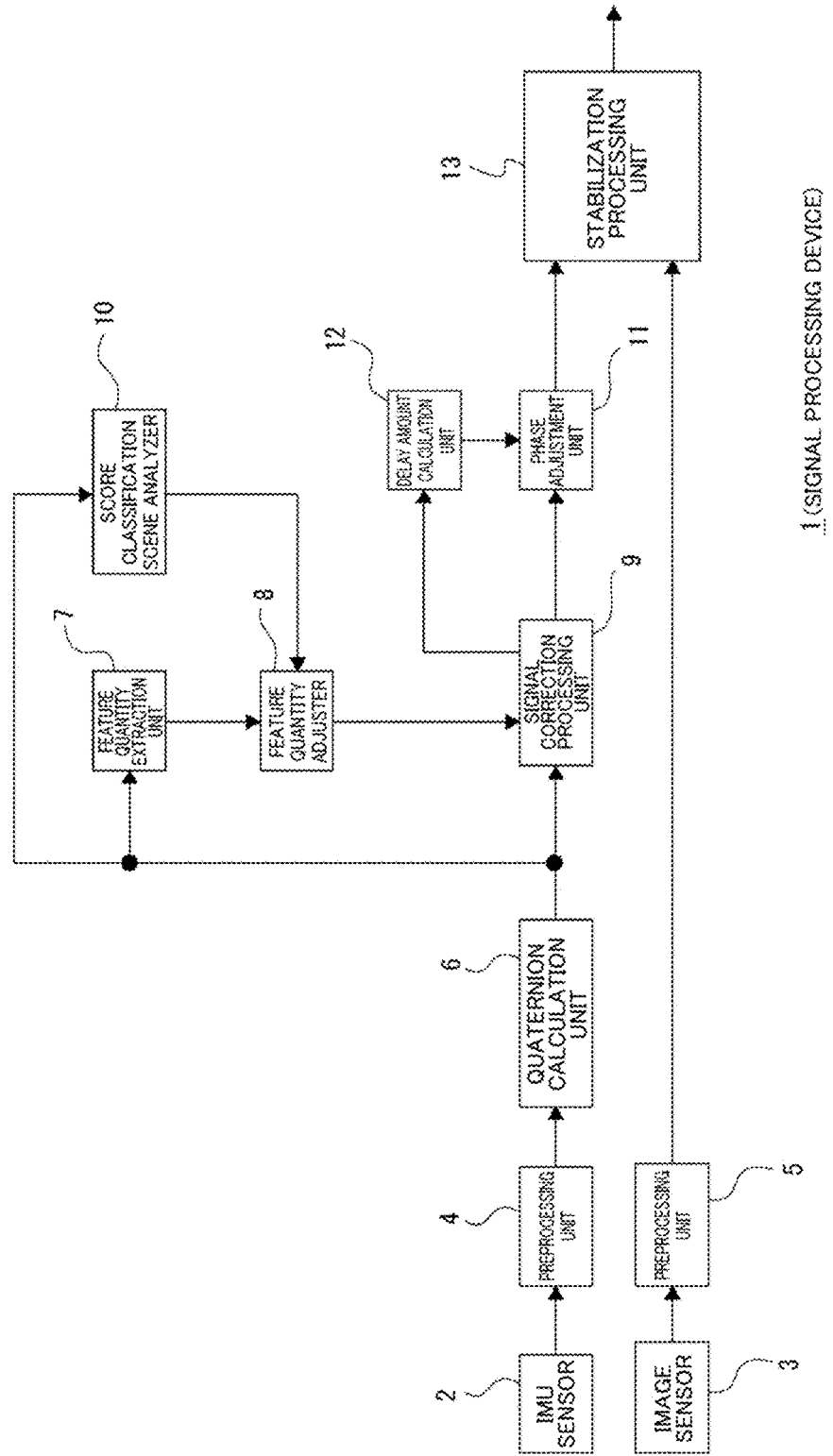
FIG. 1 is a block diagram illustrating a configuration example of a signal processing device as an embodiment according to the present technology.

FIG. 1 is a block diagram illustrating a configuration example of a signal processing device 1 as an embodiment according to the present technology. Here, a case in which the signal processing device 1 is applied to an imaging device as a digital camera device will be illustrated. Specifically, the signal processing device 1 performs signal processing for electronic image stabilization (EIS: Electric Image Stabilizer) on an image captured by the imaging device. Hereinafter, electronic image stabilization processing will be referred to as "stabilization processing".

As illustrated in the figure, the signal processing device 1 includes an Inertial measurement unit (IMU) sensor 2, an image sensor 3, a preprocessing unit 4, a preprocessing unit 5, a quaternion calculation unit 6, a feature quantity extraction unit 7, a feature quantity adjuster 8, a signal correction processing unit 9, a score classification scene analyzer 10, a phase adjustment unit 11, a delay amount calculation unit 12, and a stabilization processing unit 13.

The image sensor 3 is, for example, a complementary metal oxide semiconductor (CMOS) type or a charge coupled device (CCD) type of image sensor, and obtains a captured image by photoelectrically converting light received by a plurality of two-dimensionally arranged light reception elements.

The captured image obtained by the image sensor 3 is subjected to predetermined preprocessing such as white balance adjustment or demosaic processing in the preprocessing unit 5 and then output to the stabilization processing unit 13.

The IMU sensor 2 includes a motion sensor that detects a motion of the imaging device including the signal processing device 1, and outputs a signal indicating a result of detecting the motion. As will be described below, the IMU sensor 2 of the present example includes a 3-axis acceleration sensor (an acceleration sensor 2a to be described below), and an angular velocity sensor (an angular velocity sensor 2b to be described below) as motion sensors. In the present example, detection signals of the acceleration sensor and the angular velocity sensor (6 systems of 3 axes×2) are output as signals indicating results of detecting the motion.

Hereinafter, signals indicating results of detecting the motion, which are output by the IMU sensor 2, are collectively referred to as an "IMU signal".

The preprocessing unit 4 receives the IMU signal from the IMU sensor 2, performs predetermined processing as preprocessing, and outputs a resultant signal to the quaternion calculation unit 6.

The quaternion calculation unit 6 calculates a quaternion representing an attitude of the imaging device on the basis of the IMU signal input via the preprocessing unit 4.

The quaternion calculated by the quaternion calculation unit 6 (hereinafter referred to as "IMU quaternion") is input to the signal correction processing unit 9, and is subjected to predetermined correction processing based on the feature quantity to be described below.

The calculated IMU quaternion is blended at a fixed blend ratio for each acceleration and angular velocity, and is input to the signal correction processing unit 9.

On the other hand, a total of eight systems of quaternions including acceleration=4 systems and angular velocity=4 systems are input to the feature quantity extraction unit 7.

The IMU quaternion subjected to correction processing by the signal correction processing unit 9 is input to the stabilization processing unit 13 after being phase-adjusted by the phase adjustment unit 11.

The stabilization processing unit 13 performs stabilization processing on the captured image input via the preprocessing unit 5 on the basis of the IMU quaternion input in this way. Details of the stabilization processing performed by the stabilization processing unit 13 will be described below.

The phase adjustment unit 11 performs phase adjustment on the IMU quaternion (attitude control quaternion value) after the correction processing in the signal correction processing unit 9, on the basis of the delay amount calculated by the delay amount calculation unit 12.

The phase adjustment unit 11 performs phase adjustment for compensating for a delay (delay with respect to the captured image side) that occurs on the IMU signal side due to the correction processing in the signal correction processing unit 9. Therefore, the delay amount calculation unit 12 calculates a delay amount on the basis of a time required for the correction processing in the signal correction processing unit 9, and the phase adjustment unit 11 performs phase adjustment on an attitude control quaternion value on the basis of the delay amount.

Here, the feature quantity extraction unit 7 extracts information on the feature quantity used for correction by the signal correction processing unit 9, on the basis of the IMU quaternion (the attitude control quaternion value) from the quaternion calculation unit 6.

The feature quantity extracted from the attitude control quaternion value by the feature quantity extraction unit 7 is a feature quantity for a specific event such as a feature quantity for centrifugal force. The feature quantity extraction unit 7 is configured to have a neural network trained to extract the feature quantity for such a specific event from the attitude control quaternion value. Details of the feature quantity extraction unit 7 will be described below.

The feature quantity adjuster 8 adjusts the feature quantity extracted by the feature quantity extraction unit 7. The feature quantity adjuster 8 in the present example adjusts the feature quantity extracted by the feature quantity extraction unit 7 on the basis of an evaluation score calculated by the score classification scene analyzer 10.

The evaluation score calculated by the score classification scene analyzer 10 is a score representing performance of the stabilization processing. The score classification scene analyzer 10 is configured to have a trained neural network trained to calculate the evaluation score representing the performance of the stabilization processing on the basis of the IMU quaternion in this way, but details thereof will be described below.

As illustrated in the figure, the feature quantity extracted by the feature quantity extraction unit 7 is input to the signal correction processing unit 9 via the feature quantity adjuster 8.

2. Feature Quantity Extraction Unit

Here, in the sensor signal processing of the related art, filter processing for appropriately correcting a sensor signal, such as a low pass filter (LPF), a high pass filter (HPF), a Kalman filter, and a complementary filter, has been adopted. On the other hand, with the spread of deep learning these days, attempts are made to perform signal processing using artificial intelligence (AI) technology, but a method of obtaining an expected value by pretraining processing consisting of convolution and pooling processing of learning without a teacher (learning with a semi-teacher) mainly represented by a convolutional neural network (CNN) or an auto encoder, and fine tuning of learning with a teacher in a fully connected layer connected to a subsequent stage is adopted. Such an approach is practical in recognition technology for images or the like, for example, even with a recognition accuracy of about 98%, but in analog signal processing for a sensor signal, stabilization performance or image resolution is influenced even when an error is about 2%, for example, a satisfactory resolution cannot be obtained due to an influence of downsampling such as Max Pooling, and an amount of calculation is an extremely heavy load in analog signal processing of an embedded system. Further, it was confirmed that even when machine learning is performed by refraining from processing such as Max-Pooling and devoting a large amount of calculation resources, good results tend not to be obtained as it is.

The present technology provides a more advanced sensing device having intelligent AI technology with more object-oriented sensing technology for decomposing features like a data structure instead of an approach of performing filtering processing on a sensor signal as in the related art by paying attention to refactoring of a feature quantity inside a network in pretraining processing, and interpreting and extracting a desired feature quantity as object data from control line associated learning for extracting a feature quantity for a specific event and a difference in output results under multiple control line conditions and treating this as a correction value. This approach has a smaller amount of calculation than a CNN of deep learning technology of the related art and can obtain good results in processing of a sensor signal.

A specific problem is considered.

Many schemes have already been proposed in an image stabilization system that uses attitude estimation using the IMU sensor 2, but in this system, the schemes are classified into two systems including a scheme for a world coordinate system and a scheme for a camera local coordinate system. The former mainly includes an example of commercialization of an omnidirectional camera, entire surroundings are imaged, and a viewpoint is performed by a viewpoint movement operation according to preference of the user. The stabilization processing in this system can be basically realized by performing image rotation based on an attitude estimation result from the IMU signal. In order to remove an influence of a gyro bias, the bias is generally removed by a Kalman filter or a complementary filter using information from the acceleration sensor.

On the other hand, in the latter system of the camera local coordinate system, a frame-out problem of an image occurs as a viewpoint of the camera moves unless a camera is an omnidirectional camera. In the stabilization processing of the camera local coordinate system, it is required to track camera work and return a viewpoint to camera center coordinates well while removing vibration, and here, appropriate correction of viewpoint movement in consideration of a scene such as the camera work is desired. A stabilization system of the camera local coordinate system has few examples in the past, and the reason why the stabilization system is difficult is a method of calculating an amount of correction to be returned. While the world coordinate system may perform arbitrary viewpoint movement according to the preference of the user in a manual operation, the camera local coordinate system is required to ascertain intention of the user to some extent and to realize natural viewpoint movement as much as possible. When this amount of correction is calculated, because there is an influence of various disturbances such as centrifugal force, the amount of correction is not expressed by a general mathematical equation model, this is a technical area in which seasoning by a designer is required, and it is appropriately considered that such a seasoned learning set is prepared and correction is performed through optimization using AI technology. In the present technology, for such a difficulty, the IMU signal is refactored into a feature structure using deep learning, and difficulties of a stabilization system of a camera local coordinate system is solved by applying correction to the IMU signal on the basis of the extracted feature quantity.

A difference between a general CNN and the approach of the present technology is described.

Various deep neural network (DNN) blocks will appear in the following description, but because general techniques of the DNN such as the number of input/output taps or layers, an ignition function, and a dropout scheme are not the essence of the present technology, detailed description thereof is omitted. The specific number of layers or the specific number of taps of the DNN to be illustrated below are merely examples for description, and the present invention is not limited thereto.

Figure 2:
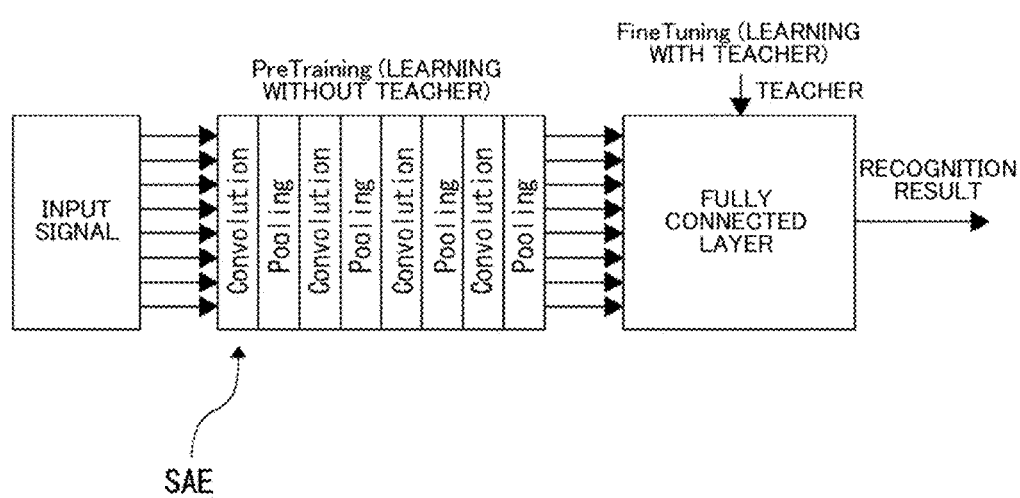
FIG. 2 is an illustrative diagram of a CNN.

As illustrated in FIG. 2, the most popular CNN in a DNN technology includes a stacked auto encoder (SAE) that repeats convolution and pooling, and a fully connected layer in a subsequent stage, and a net structure such as AlexNet is generally known.

In the CNN, pretraining processing for a SAE is performed. The pretraining processing is a type of learning without a teacher (also called learning with a semi-teacher), and means processing for causing learning to be performed so that the output matches an input. It is possible to generate a recognition algorithm by learning with a teacher (called Fine Tuning) in the fully connected layer in the subsequent stage.

Nowadays, the CNN is not limited thereto, and there are various derivative forms of the CNN.

Figure 3:
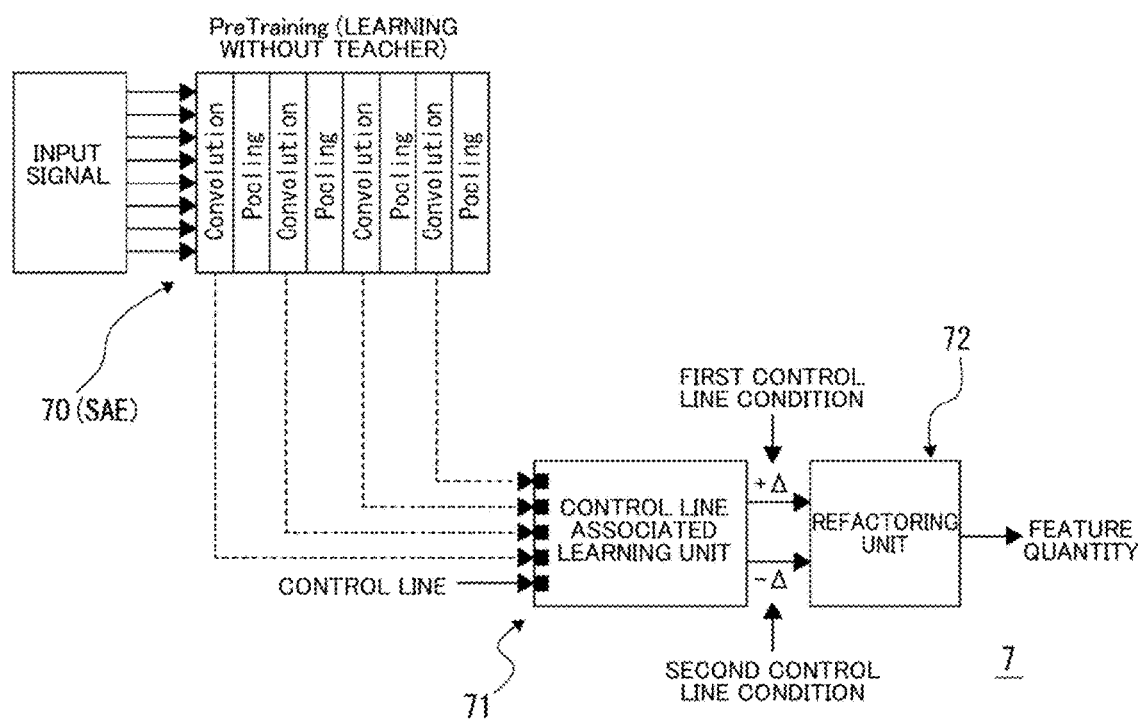
FIG. 3 is a functional block diagram illustrating a functional configuration of a feature quantity extraction unit in an embodiment.

On the other hand, in the present technology, emphasis is placed on analog signal processing such as attitude control or image processing rather than recognition technology in which attention is paid to a CNN, and a configuration as illustrated in FIG. 3 is adopted.

FIG. 3 is a functional block diagram illustrating a functional configuration of the feature quantity extraction unit 7.

As illustrated in FIG. 3, the feature quantity extraction unit 7 includes a SAE 70, a control line associated learning unit 71, and a refactoring unit 72. An input signal of the SAE 70 is a signal as an IMU quaternion in the present example. As the SAE 70, a pretrained SAE is used. A feature quantity obtained in a plurality of predetermined intermediate layers in the SAE after pretraining is used as an input of the control line associated learning unit 71.

Here, the SAE is generally intended for dimensional compression, but has a function of self-teaching and learning a feature expression of a target by performing pretraining to match an input with an output. In the feature quantity extraction unit 7, the feature quantity obtained in the intermediate layer of the SAE 70 that has been subjected to such pretraining and has learned a feature expression of a target is input to the control line associated learning unit 71.

The control line associated learning unit 71 includes a neural network on which control line associated learning has been performed. The control line associated learning means learning by associating different event aspects related to the specific event with respective different control line values. The "specific event" means an event that is an extraction target of a feature quantity, such as centrifugal force. Further, the "event aspect" means, for example, an aspect relating to a specific event, such as an aspect of "with centrifugal force" or an aspect of "without centrifugal force" in the case of centrifugal force.

Details of the control line associated learning will be described below, and the control line associated learning unit 71 generates an algorithm for switching between aspects of the feature quantity that is output according to a value given to the control line by performing the control line associated learning.

The refactoring unit 72 inputs an output when $+\Delta$ is given as the value of the control line (a "first output") and an output when $-\Delta$ is given (a "second output") to the control line associated learning unit 71 in which the control line associated learning is performed and the feature quantity extraction algorithm as described above is generated, and obtains a difference therebetween. Here, $+\Delta$ and $-\Delta$ are values obtained by adding and subtracting $\Delta$ to and from a predetermined reference value (0 in the present example), respectively.

The first output is a feature quantity calculated by the control line associated learning unit 71 under a first control line condition in which the control line value is $+\Delta$, and the second output is a feature quantity calculated by the control line associated learning unit 71 under a second control line condition in which the control line value is $-\Delta$. Therefore, the difference between the first output and the second output obtained by the refactoring unit 72 also takes a form of a feature quantity.

Here, in the present embodiment, the feature quantity obtained in each of the plurality of intermediate layers in the pretrained SAE 70 is used as the input of the control line associated learning unit 71, but this corresponds to features with different resolutions being input as the input of the control line associated learning unit 71.

In the feature quantity extraction unit 7 of the present embodiment, the control line associated learning unit 71 individually performs control line associated learning on each of feature quantities due to such a plurality of resolutions, and the refactoring unit 72 obtains the difference between the first output and the second output for each of those resolutions. This is equivalent to performing recognition of a target with multiple resolutions using a low-frequency pyramid of a wavelet transform, which contributes to improving accuracy of recognition of attitude control by recognizing a temporal flow.

Figure 4:
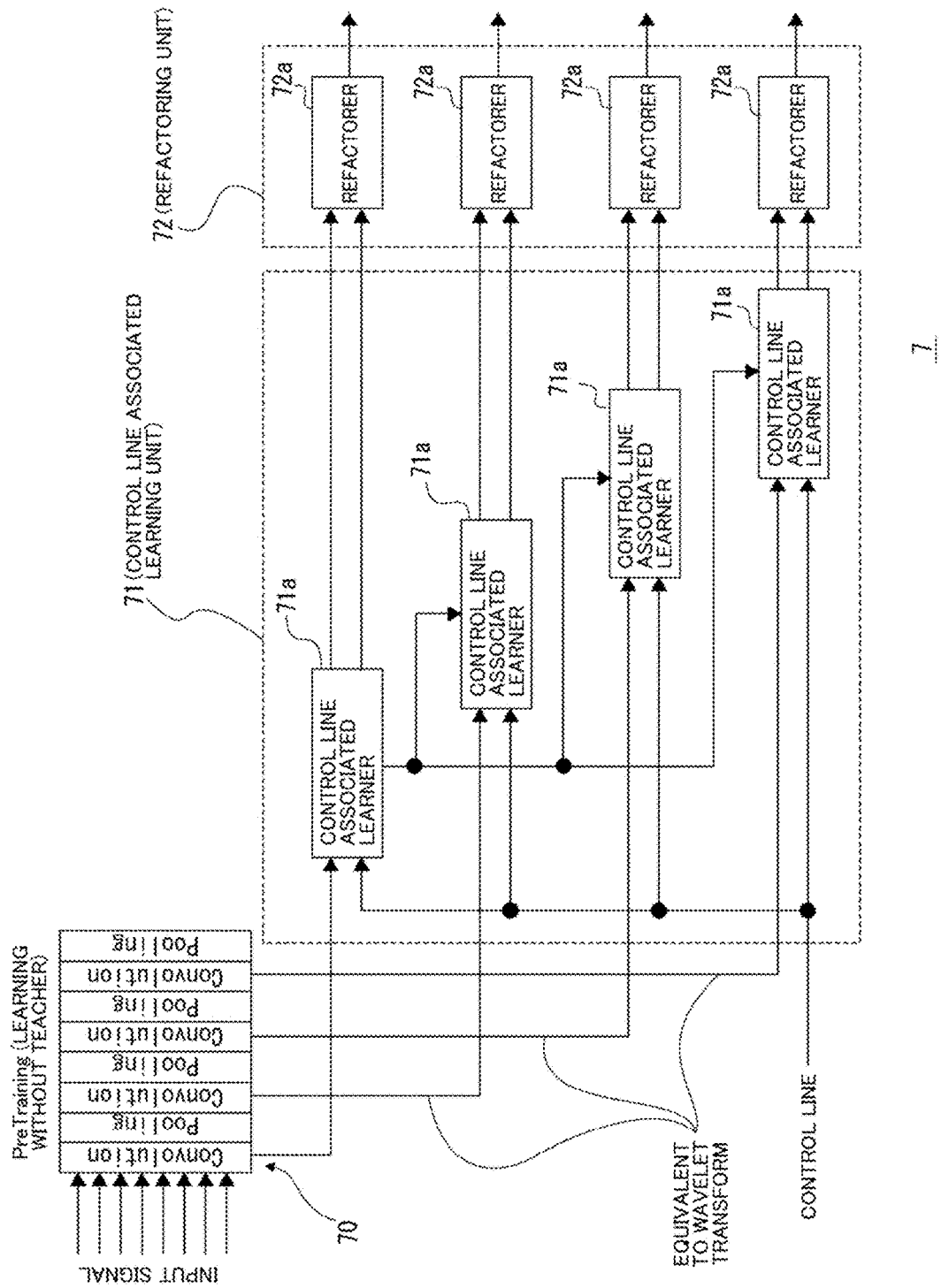
FIG. 4 is a diagram illustrating a specific configuration example of the feature quantity extraction unit in the embodiment.

FIG. 4 illustrates a specific configuration example of the feature quantity extraction unit 7 corresponding to recognition processing at multiple resolutions as described above.

As illustrated in FIG. 4, the control line associated learning unit 71 includes a plurality of control line associated learners 71a, and the feature quantity obtained in the corresponding intermediate layer in the SAE 70 is input to each control line associated learner 71a. Further, the value of the control line is also input to each control line associated learner 71a. Each control line associated learner 71a includes SAE.

In the figure, the control line associated learner 71a shown at the uppermost side of the paper becomes a learner on a top layer (that is, a learner that inputs the feature quantity with the highest resolution), and is the control line associated learner 71a on a lower layer as a position on the paper becomes lower, but a feature quantity obtained by convolution of the control line associated learner 71a on the upper layer is input to each control line associated learner 71a other than the control line associated learner 71a on the top layer, and the accuracy is improved.

The refactoring unit 72 includes a refactorer 72a for each control line associated learner 71a included in the control line associated learning unit 71. Each refactorer 72a obtains the difference between the first output and the second output of the corresponding control line associated learner 71a. In the refactoring unit 72, these refactorers 72a obtain the feature quantities corresponding to the respective resolutions (in the illustrated example, the feature quantities of four systems can be obtained).

Here, the feature quantity extraction unit 7 includes the control line associated learning unit 71, the refactoring unit 72, and the SAE 70 as described above, but in a learning environment, control line associated learning using teacher data is performed using a configuration as illustrated in FIG. 5A, which includes the control line associated learning unit 71 in a state before learning.

Hereinafter, in the description relating to the control line associated learning, a configuration illustrated in FIG. 5A is shown by a simplified expression as illustrated in FIG. 5B.

For confirmation, a block of a wavelet transform low frequency pyramid illustrated in FIG. 5B expresses handling the feature quantity with multi-resolution described above.

Further, a plurality of SAE blocks shown in a stage after a wavelet transform block are collective representations of the SAE 70, and SAEs as the plurality of control line associated learners 71a included in the control line associated learning unit 71.

In the present embodiment, as the extraction of the feature quantity based on the IMU signal, the feature quantity extraction for the centrifugal force is performed. Hereinafter, first, a specific example of control line associated learning corresponding to a case in which feature quantity extraction for such centrifugal force is performed, and feature quantity extraction using a trained neural network will be described.

Figure 6:
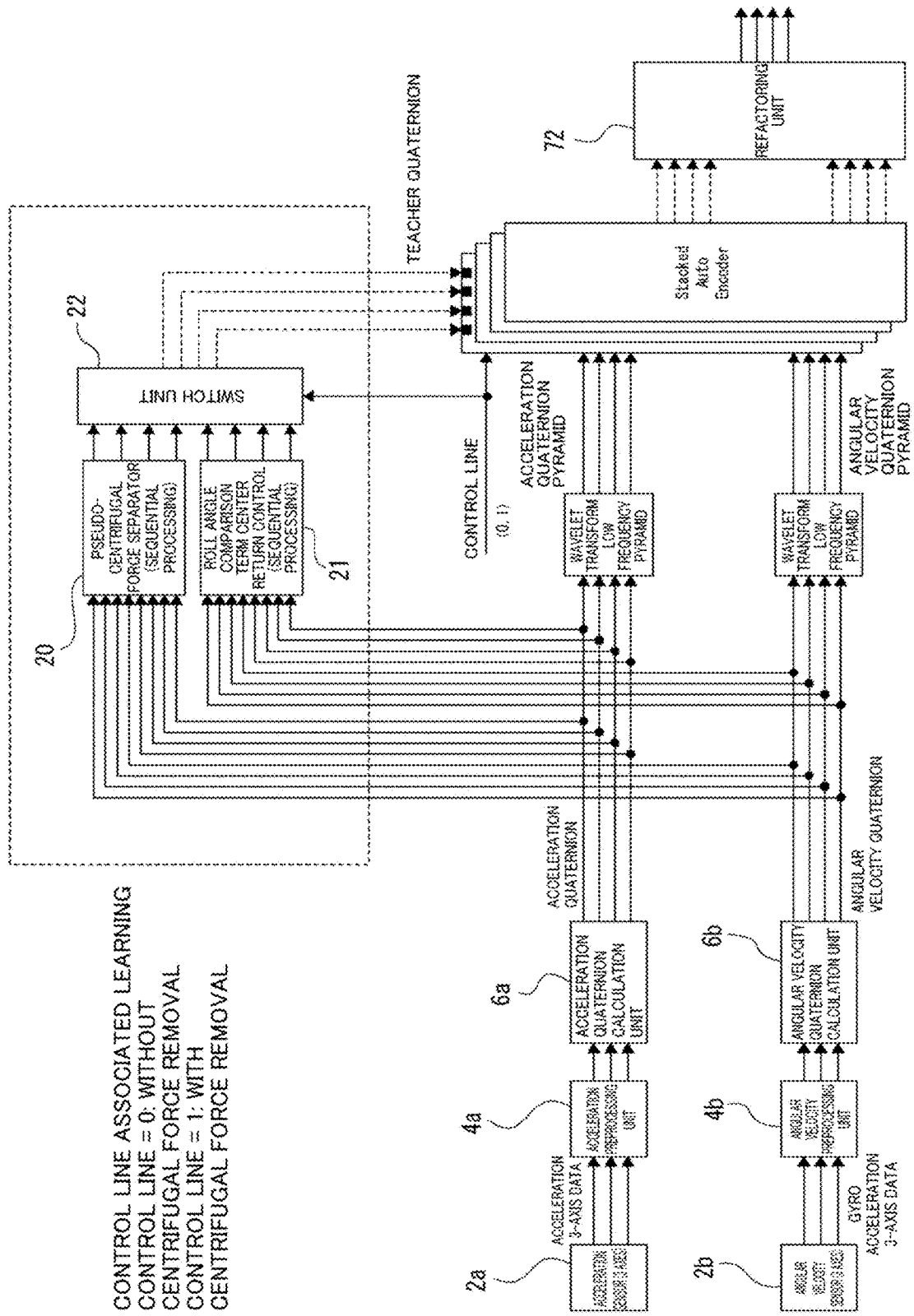
FIG. 6 is an illustrative diagram of control line associated learning corresponding to a case in which centrifugal force feature quantity extraction is performed.

FIG. 6 is an illustrative diagram of control line associated learning corresponding to a case in which centrifugal force feature quantity extraction is performed. The centrifugal force feature quantity extraction is intended to curb tilt of a horizon due to centrifugal force agitation at the time of exercise for an image captured by an imaging device scheduled to be used in a state in which the imaging device is supported by a moving object such as an in-vehicle camera.

First, as a premise, in the present example, a 3-axis acceleration sensor (hereinafter referred to as an "acceleration sensor 2a") and a 3-axis angular velocity sensor (hereinafter referred to as an "angular velocity sensor 2b") are used as the IMU sensor 2, as described above. Further, the preprocessing unit 4 and the quaternion calculation unit 6 described above each include a processing unit that performs preprocessing for acceleration (hereinafter referred to as an "acceleration preprocessing unit 4a"), a processing unit that performs preprocessing for angular velocity (hereinafter referred to as an "angular velocity preprocessing unit 4b"), a calculation unit that calculates an quaternion for acceleration (hereinafter referred to as an "acceleration quaternion calculation unit 6a"), and a calculation unit that calculates an quaternion for angular velocity (hereinafter referred to as an "angular velocity quaternion calculation unit 6b").

Correspondingly, in the learning environment, the acceleration preprocessing unit 4a and the acceleration quaternion calculation unit 6a are provided in a stage subsequent to the acceleration sensor 2a, and the angular velocity preprocessing unit 4b and the angular velocity quaternion calculation unit 6b are provided in a stage subsequent to the angular velocity sensor 2b.

The acceleration quaternion calculated by the acceleration quaternion calculation unit 6a and the angular velocity quaternion calculated by the angular velocity quaternion calculation unit 6b are given as input signals of the learner illustrated in a simplified expression of FIG. 5B.

Here, as a definition of a rotation angles, a rotation angle in an agitation direction is defined as a pitch angle, a rotation angle in a left-right direction is defined as a yaw angle, and a rotation angle on a central axis of the camera is defined as a roll angle for the following description.

An attitude estimation value (quaternion) not influenced by centrifugal force can be obtained by the angular velocity sensor, an acceleration attitude estimation value has the property of being strongly influenced by the centrifugal force, and a learning set obtained by pseudo-removing the centrifugal force through sequential processing using the difference therebetween is generated by a pseudo-centrifugal force separator 20 and roll angle comparison term center return control 21 in the figure. Using this sequential processing, the centrifugal force can be satisfactorily removed only under certain conditions, but the centrifugal force cannot be removed as expected in a complicated motion, and a learning set is prepared by performing optimization work in each scene.

As the control line associated learning, and the learner is caused to learn, as a teacher, quaternion without centrifugal force removal when a value of the control line=0.0, and quaternion with centrifugal force removal when the control line value=1.0 in association with the control line using a switch unit 22 in the figure. In the figure, values after a decimal point are omitted for values of the control line due to space limitations (the same applies to the following figures). As a result of such learning, the control line associated learner 71a generates an algorithm for switching between the aspects of the feature quantity to be output, according to the value given to the control line. That is, there is a difference between a feature quantity output by the control line associated learner 71a when the value of the control line is a first value and a feature quantity output by the control line associated learner 71a when the value of the control line is a second value different from the first value.

Figure 7:
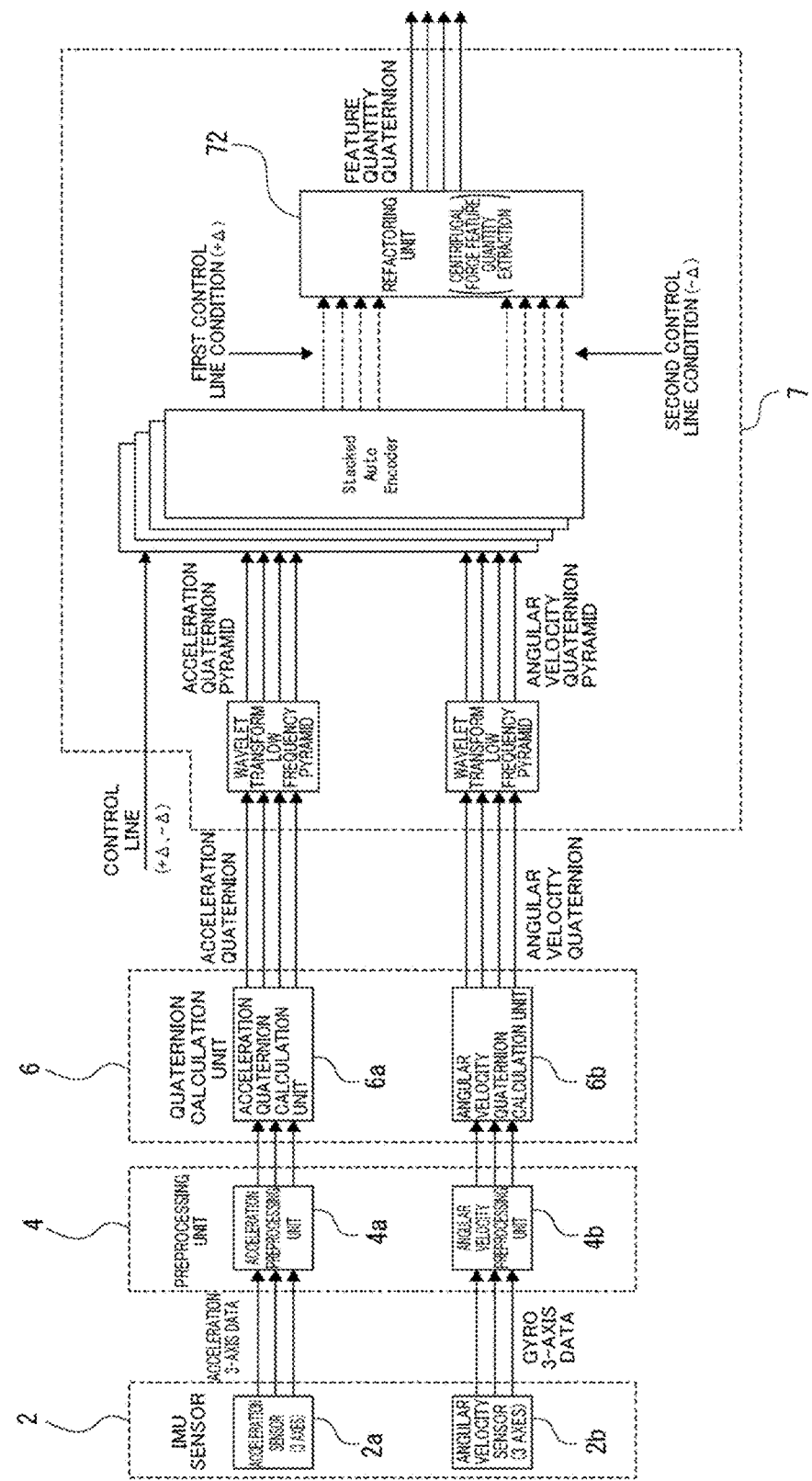
FIG. 7 is a diagram illustrating a configuration for feature quantity extraction using a trained control line associated learner.

FIG. 7 is a diagram illustrating a configuration for feature quantity extraction using a trained control line associated learner 71a.

As illustrated in the figure, the acceleration quaternion and the angular velocity quaternion are given to the input of the feature quantity extraction unit 7 by the acceleration quaternion calculation unit 6a and the angular velocity quaternion calculation unit 6b in the quaternion calculation unit 6.

In the feature quantity extraction in this case, first, an output when the value of the control line is the first value (the first output) and an output when the value of the control line is the second value (the second output) are obtained as outputs of each control line associated learner 71a. In the refactoring unit 72, the difference between the first output and the second output is obtained for each control line associated learner 71a.

Here, for the difference between the first output when the value of the control line is the first value and the second output when the value of the control line is the second value, the first value and the second value do not have the same polarity but have different polarities for easy clarification. Therefore, in the present example, values of +Δ and −Δ with reference to the control line value=0 are used as the first value and the second value, respectively.

Figure 8:
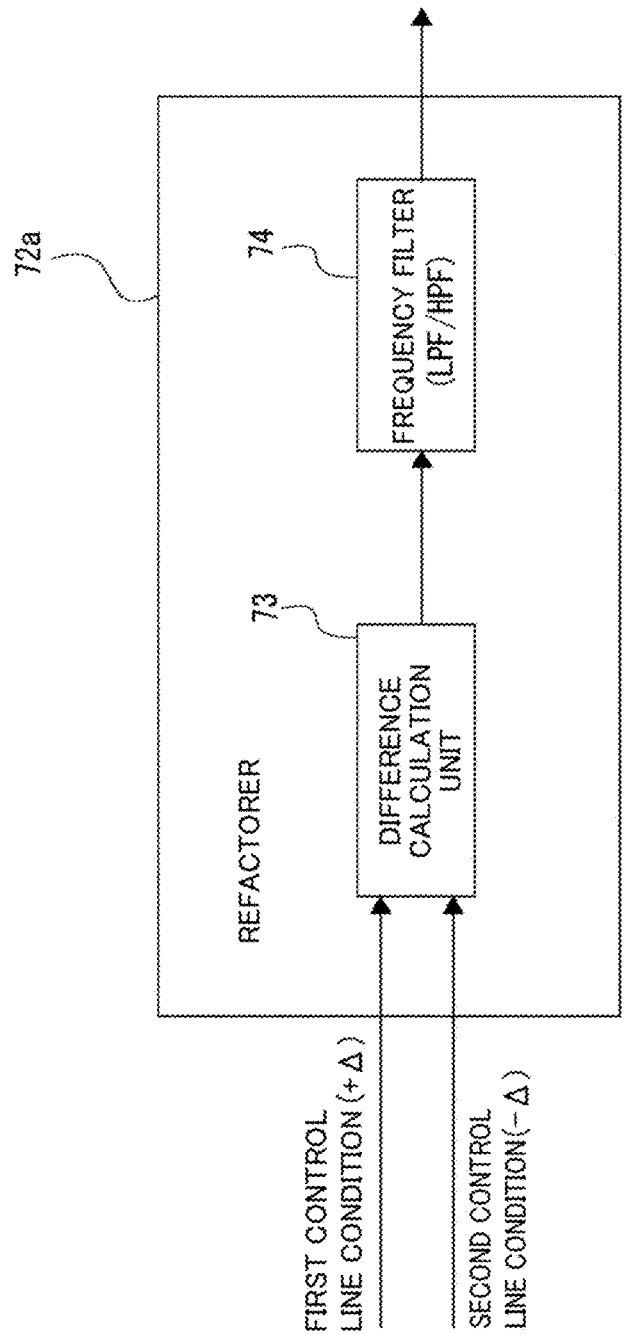
FIG. 8 is a diagram illustrating an example of an internal configuration of a refactorer according to the embodiment.

FIG. 8 illustrates an example of an internal configuration of each refactorer 72a included in the refactoring unit 72.

The refactorer 72a includes a difference calculation unit 73 and a frequency filter 74. The difference calculation unit 73 receives an output of the control line associated learner 71a when the value of the control line is the first value (+Δ in the present example) (the first control line condition) and an output of the control line associated learner 71a when the value of the control line is the second value (−Δ in the present example) (the second control line condition), and calculates a difference therebetween. The frequency filter 74 includes, for example, a LPF or a HPF, and performs processing for extracting some frequency components of a signal (quaternion) as a difference calculated by the difference calculation unit 73.

Providing the frequency filter 74 makes it possible to perform waveform shaping on the signal obtained as the difference between the first output and the second output. This makes it possible to approach an expected feature quantity even when a learning result of the control line associated learner 71a is insufficient, and to improve accuracy of the feature quantity extraction.

Here, the learning set is data obtained by optimally matching actual products in each scene as described above and is not a learning set guaranteeing obtaining a desired mathematical equation with 100% accuracy, and a feature quantity obtained after machine learning also has a certain degree of deterioration, and the frequency filter 74 is adopted to remove such deterioration.

Here, when the feature quantity is learned using only the IMU quaternion (attitude control quaternion value) with centrifugal force as a teacher without performing the control line associated learning as described above, the feature quantity that is extracted by the learner is not always desirable. On the other hand, in the present embodiment, the control line associated learner 71a generates the algorithm for switching between the aspects of the feature quantity to be output, according to the value given to the control line, by performing the control line associated learning. It is assumed that the feature quantity is extracted by using a scheme for obtaining the difference between the first output and the second output when values (+Δ, −Δ) of different control lines are given to the control line associated learner 71a. By adopting the scheme of obtaining the difference between the first and second outputs in this way, it is possible to perform more appropriate feature quantity extraction than a case in which learning of the feature quantity is performed using only the attitude control quaternion value with centrifugal force as a teacher. In other words, it is possible to realize more accurate feature quantity extraction than in a case in which learning using only a specific aspect of a specific event as a teacher is performed.

A goal of centrifugal force feature quantity extraction accuracy is to obtain performance substantially the same as an actual product matching optimization result of each scene at the time of creating the learning set described above when the present feature quantity correction algorithm is applied to various scenes, and is not derive a perfect mathematical equation that can express a centrifugal force feature quantity in a physical sense, but is to obtain something as close as possible to the mathematical equation, so to speak, an approximate equation with accuracy that can withstand an actual operation with a least square algorithm using deep learning.

The extraction of the centrifugal force feature quantity has been described above as an example of the feature quantity extraction, but in the signal processing device 1 of the present example, signal correction based on a feature quantity for another event other than the centrifugal force is also performed as signal correction for the IMU signal (IMU quaternion).

Figure 9:
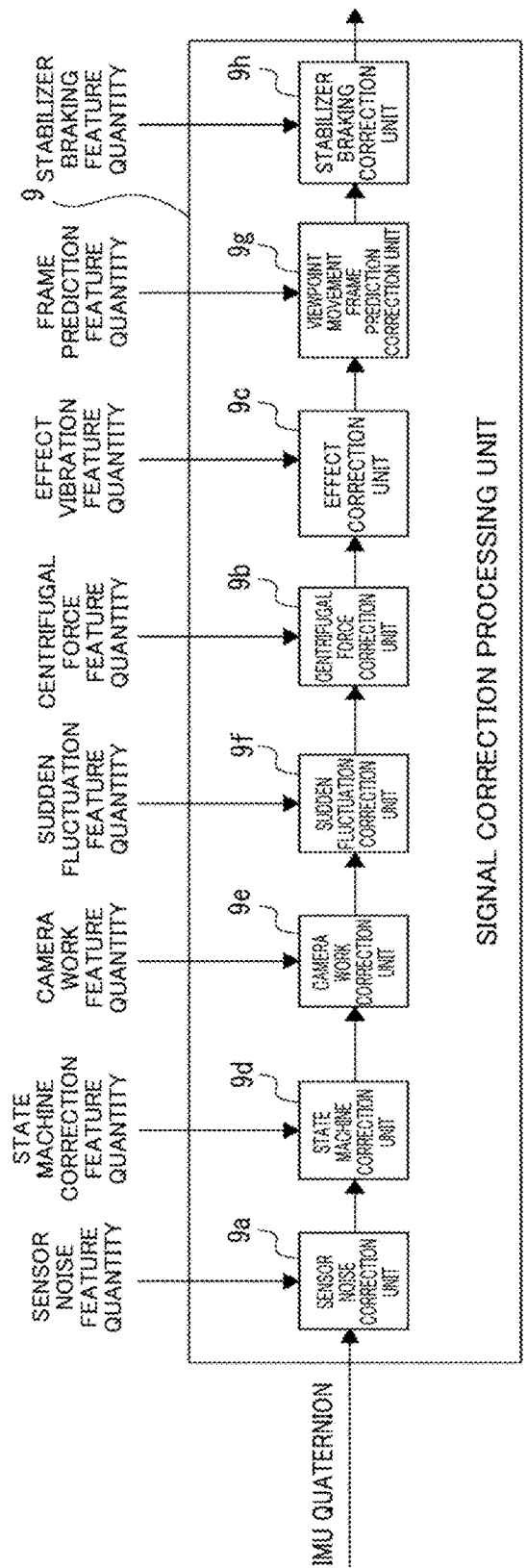
FIG. 9 is a block diagram illustrating an example of an internal configuration of a signal correction processing unit according to the embodiment.

FIG. 9 is a block diagram illustrating an example of an internal configuration of the signal correction processing unit 9.

As illustrated in the figure, the signal correction processing unit 9 includes a sensor noise correction unit 9a, a centrifugal force correction unit 9b, an effect correction unit 9c, a state machine correction unit 9d, a camera work correction unit 9e, a sudden fluctuation correction unit 9f, a viewpoint movement frame prediction correction unit 9g, and a stabilizer braking correction unit 9h as correction units for the IMU quaternion (the attitude control quaternion values). For an order of correction processing, the example illustrated in the figure is only an example, and any order can be adopted.

The sensor noise correction unit 9a performs correction processing for removing sensor noise superimposed on the IMU signal, specifically, DC bias noise or saturation noise. Generally, IMU adjustment or temperature-specific correction, and correction processing using a Kalman filter and a complementary filter in a preprocessing stage are generally performed on the DC bias noise, but even when such preprocessing is performed, the stabilization performance deteriorates due to an influence of noise from various factors, such as random walk noise and temperature-specific changes over time. Therefore, correction processing for extracting a feature quantity of the DC bias noise through learning, and removing a component of the DC bias noise superimposed on the IMU quaternion on the basis of the feature quantity is performed.

By performing such sensor noise correction processing as the DC bias noise, it is possible to intelligently remove noise difficult to remove even with a Kalman filter or temperature-specific correction, and improve the performance of stabilization processing.

Figure 29:
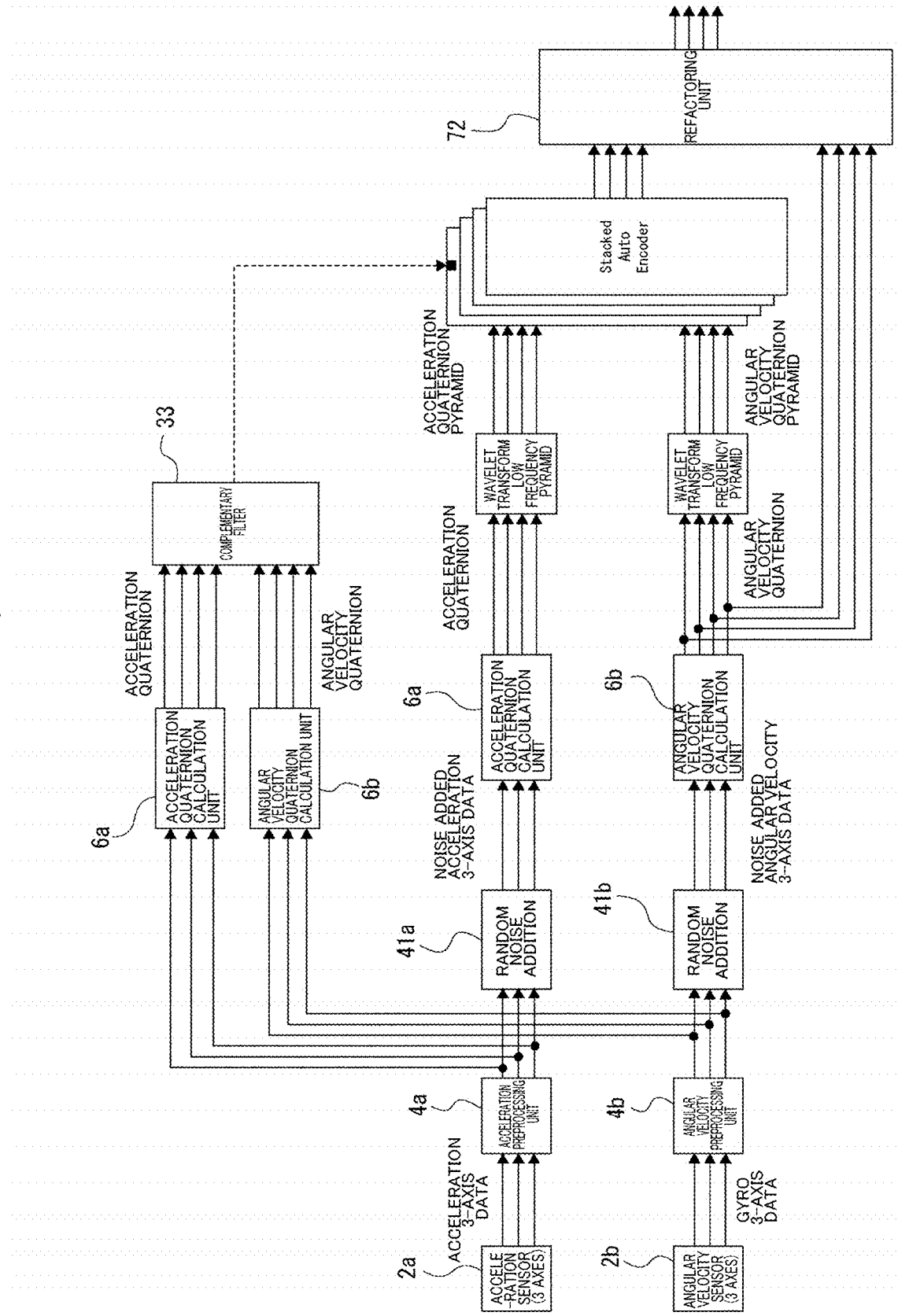
FIG. 29 is an illustrative diagram of a sensor noise feature quantity extraction scheme (learning environment).
Figure 30:
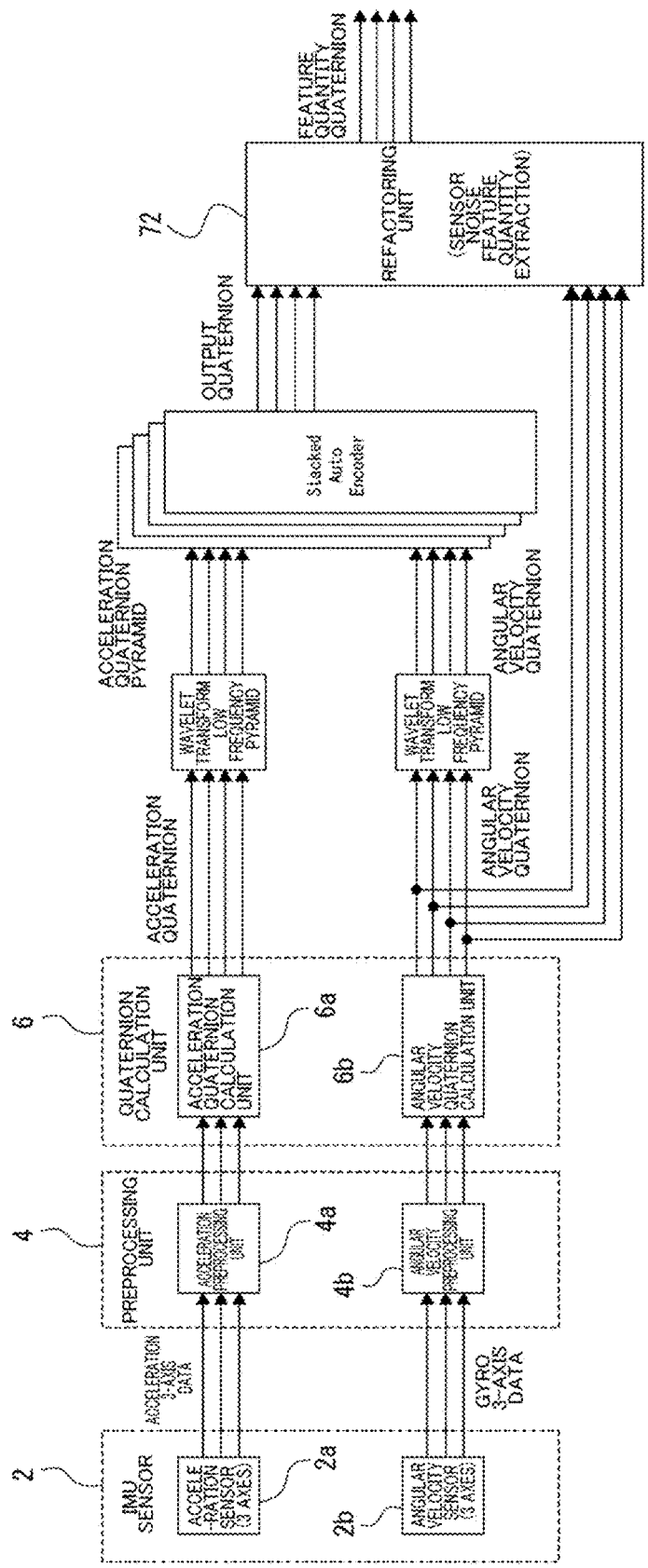
FIG. 30 is an illustrative diagram of a sensor noise feature quantity extraction scheme (environment after mounting).

The extraction of the sensor noise feature quantity is performed by performing signal waveform analysis on the correlation between the acceleration quaternion and the angular velocity quaternion and extracting a result thereof as a noise feature quantity, which will be described in detail below (FIGS. 29 and 30).

The centrifugal force correction unit 9b performs correction processing for removing the component of the centrifugal force (centrifugal force noise) from the attitude control quaternion value on the basis of the above-described centrifugal force feature quantity.

This makes it possible to remove centrifugal force noise and perform horizontal correction well even in a violent motion, and to improve the performance of stabilization processing.

The effect correction unit 9c performs correction processing on the IMU quaternion so that vibration as an effect is not removed in the stabilization processing unit 13 in order to create a picture with a sense of presence.

There is a case in which removal of excessive vibration is not desired because the removal impairs a sense of presence of the video depending on a camera user. Therefore, a vibration corresponding to the sense of presence is learned and extracted as an effect vibration feature quantity, and the vibration component as the effect included in the attitude control quaternion value is removed on the basis of the effect vibration feature quantity. This makes it possible to prevent the vibration component from being removed in the stabilization processing, and to improve the sense of presence.

The extraction of the effect vibration feature quantity will be described below (see FIGS. 19 and 20).

The state machine correction unit 9d performs correction processing for state machine control.

The camera system in the present example has a horizontal correction function (a gimbal function), but when the camera faces directly above or below, a concept of a horizontal line disappears and it is necessary to stop the gimbal function. Further, it is unrealistic to provide state machine such as a dribbling scene or collision in scenes of a soccer, a motion of a keeper, and a rotation scene of a gymnast in sequential processing implementation for each competition. The control of whether or not to stop the gimbal function in this way is called state machine control (attitude control state machine control) here.

In an actual field test, because a motion of the athlete is very complicated and is influenced by centrifugal force, it is difficult to perform state machine control of the stabilization system in a threshold value determination of a pitch angle in the sequential processing implementation or detection processing, and in addition, it was found that it is very difficult to individually deal with various scenes such as athletics, motors sports, and ball games. Therefore, in the present example, a scheme for automatically estimating a case in which the gimbal function is to be stopped by AI is adopted. For this purpose, the state machine correction unit 9d performs correction processing for state machine control on the IMU quaternion on the basis of a state machine correction feature quantity.

The extraction of the state machine correction feature quantity will be described below (see FIGS. 32 and 33).

The camera work correction unit 9e performs correction processing for appropriately reflecting the camera work by the user on the basis of the feature quantity (camera work feature quantity) of the camera work extracted from the IMU quaternion.

The camera system in the present example mainly assumes a stabilization function at camera local coordinates, and it is required to appropriately understand a motion equivalent to camera work by the user and determine a center position of an angle of view, apart from rotation control based on the IMU signal. For this purpose, correction processing for learning the camera work feature quantity and appropriately reflecting the camera work on the basis of the camera work feature quantity is performed.

The extraction of camera work feature quantity will be described below (see FIGS. 21 and 22).

The sudden fluctuation correction unit 9f performs correction processing for curbing a sudden shock and improving camera work control in the stabilization processing unit 13. Braking damper-like correction processing for curbing sudden fluctuation is performed on the IMU quaternion.

In order to realize such correction processing, the control line associated learner 71a is caused to learn a sudden fluctuation feature quantity, and the feature quantity extraction unit 7 extracts the sudden fluctuation feature quantity from the IMU quaternion. The sudden fluctuation correction unit 9f performs correction processing for curbing sudden fluctuation on the basis of the sudden fluctuation feature quantity extracted in this way.

The extraction of the sudden fluctuation feature quantity will be described below (see FIGS. 23 and 24).

The viewpoint movement frame prediction correction unit 9g performs viewpoint adjustment based on a frame prediction feature quantity and correction processing for buffer out prediction on the IMU quaternion.

It is possible to improve prediction accuracy with respect to buffering control for the buffer memory 63 in the stabilization processing unit 13 to be described below.

Extraction of the frame prediction feature quantity will be described below (see FIGS. 25 and 26).

The stabilizer braking correction unit 9h performs correction processing for improving the camera work.

In a case in which control is performed by a simple proportional component when conversion from world coordinates to camera local coordinates is performed, tracking speed becomes slow with active viewpoint movement in a use case such as attaching a camera to a head of the user. Therefore, correction processing for more actively performing attitude control similar to viewpoint movement of the user is performed.

In order to realize such a correction processing, the control line associated learner 71a is caused to learn the stabilizer braking feature quantity to be described below, and the feature quantity extraction unit 7 performs extraction of the stabilizer braking feature quantity from the IMU quaternion. The stabilizer braking correction unit 9h performs correction processing for curbing sudden fluctuations on the basis of the stabilizer braking feature quantity extracted in this way.

The extraction of stabilizer braking feature quantity will be described below (see FIGS. 27 and 28).

Here, the correction processing of each correction unit in the signal correction processing unit 9 is, for example, filter processing for the IMU quaternion, and a corresponding processing time is required.

The delay amount calculation unit 12 illustrated in FIG. 1 calculates the time required for processing in each of these correction units as a delay amount and outputs the time to the phase adjustment unit 11. As described above, the phase adjustment unit 11 performs phase adjustment on an IMU quaternion after the correction processing in the signal correction processing unit 9 on the basis of the delay amount calculated by the delay amount calculation unit 12.

Accordingly, delay compensation for the captured image side is realized.

3. Feature Quantity Adjuster

Next, the feature quantity adjuster 8 illustrated in FIG. 1 will be described. As described above, the feature quantity adjuster 8 performs the adjustment of the feature quantity extracted by the feature quantity extraction unit 7.

Work of adding the feature quantity obtained by the feature quantity extraction unit 7 to a target sensor signal (the IMU signal in the present example) as a correction value actually requires some adjustment of actual product matching. This is because the learning set given to the machine learning does not guarantee 100% mathematical equation derivation, adjustment considering an error of an algorithm generated by the machine learning is required, and various adjustments are required so that data does not diverge unstably in order to introduce, as an IIR filter, a machine-learned filter with a pair of an FIR-like input and an expected value in a system having a feedback structure. Here, the adjustment of the feature quantity in the feature quantity adjuster 8 is performed as adjustment of the blend ratio of the feature quantities of respective resolution input in a plurality of systems from the feature quantity extraction unit 7.

It is conceivable to perform the adjustment of the feature quantity as manual adjustment. That is, the feature quantity adjuster 8 may be configured to perform the adjustment of the feature quantity on the basis of an operation input.

However, because the camera system of the present example adopts a scheme for correcting a sensor signal on the basis of the features extracted by deep learning, this is an algorithm difficult to express by a physically accurate mathematical equation in a program and, in reality, there are cases in which manual adjustment is difficult. As a measure for smoothly proceeding with adjustment work in such an architecture, the present example proposes a mechanism for evaluating performance of the architecture and automatically adjusting the feature quantity on the basis of the evaluation score.

Figure 10:
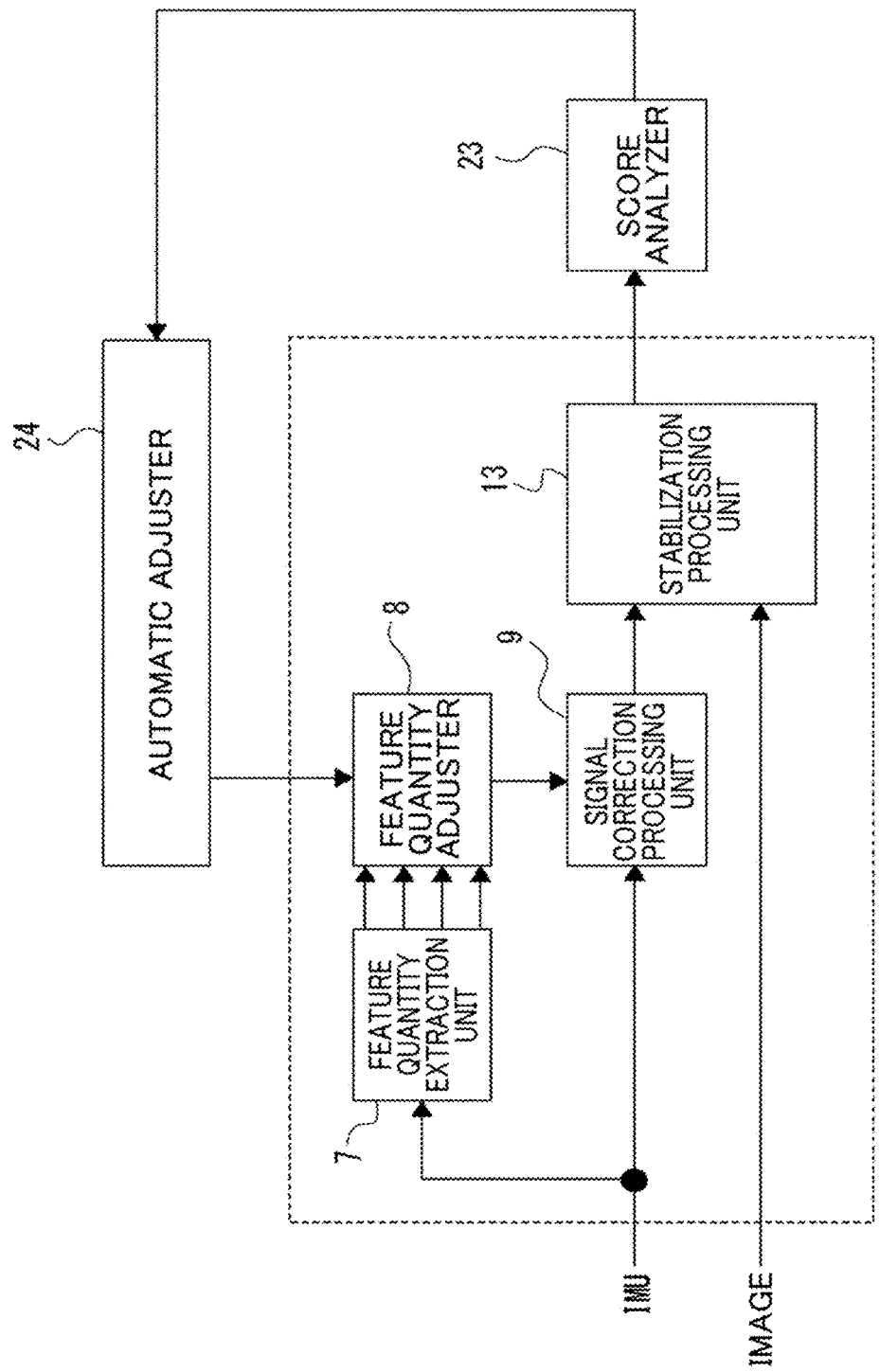
FIG. 10 is a diagram illustrating a configuration for searching for a blend ratio of feature quantities to be set in a feature quantity extractor.

FIG. 10 is a diagram illustrating a configuration for searching for a blend ratio of feature quantities to be set in the feature quantity adjuster 8.

First, a configuration for performing image stabilization processing on the basis of the IMU signal is prepared (a configuration within a dashed line in the figure), as in the camera system that is a target. Actually, the phase adjustment unit 11 is provided in a stage subsequent to the signal correction processing unit 9, and the delay amount calculation unit 12 that gives the delay amount generated in the signal correction processing unit 9 to the phase adjustment unit 11 is provided as in the configuration illustrated in FIG. 1, but illustration thereof is omitted herein.

Further, a score analyzer 23 and an automatic adjuster 24 will be prepared for search.

An image subjected to stabilization processing by the stabilization processing unit 13 (hereinafter, may also be referred to as a "stabilized image") is input to the score analyzer 23. The score analyzer 23 is an AI trained to calculate an evaluation score that is a performance index of the stabilization processing from the input image, and outputs the evaluation score calculated on the basis of the stabilized image to the automatic adjuster 24. The score analyzer 23 will be described below.

The automatic adjuster 24 performs processing of searching for a blend ratio that satisfies a predetermined criterion by referring to the evaluation score at each blend ratio while adjusting the blend ratio of the feature quantity in the feature quantity adjuster 8. The blend ratio satisfying the predetermined criteria referred to here means, for example, a blend ratio in which the evaluation score is set to a certain threshold value or higher, or a blend ratio in which the evaluation score is the best among a plurality of blend ratios used for search.

In this case, the automatic adjuster 24 searches for the optimum blend ratio by using, for example, a genetic algorithm.

Figure 11:
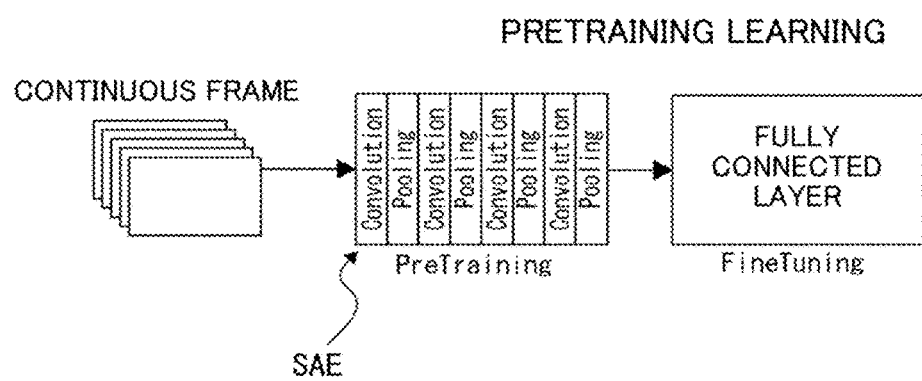
FIG. 11 is an illustrative diagram of pretraining processing for a score analyzer in the embodiment.

The score analyzer 23 will be described with reference to FIGS. 11 to 13. As the score analyzer 23, substantially the same image recognition scheme as that in a general CNN is used, and as illustrated in FIG. 11, in the generation of the learning set, first, a continuous frame image not subjected to stabilization processing is given to an input of the SAE, and pretraining processing consisting of convolution processing and pooling processing is performed.

Figure 12:
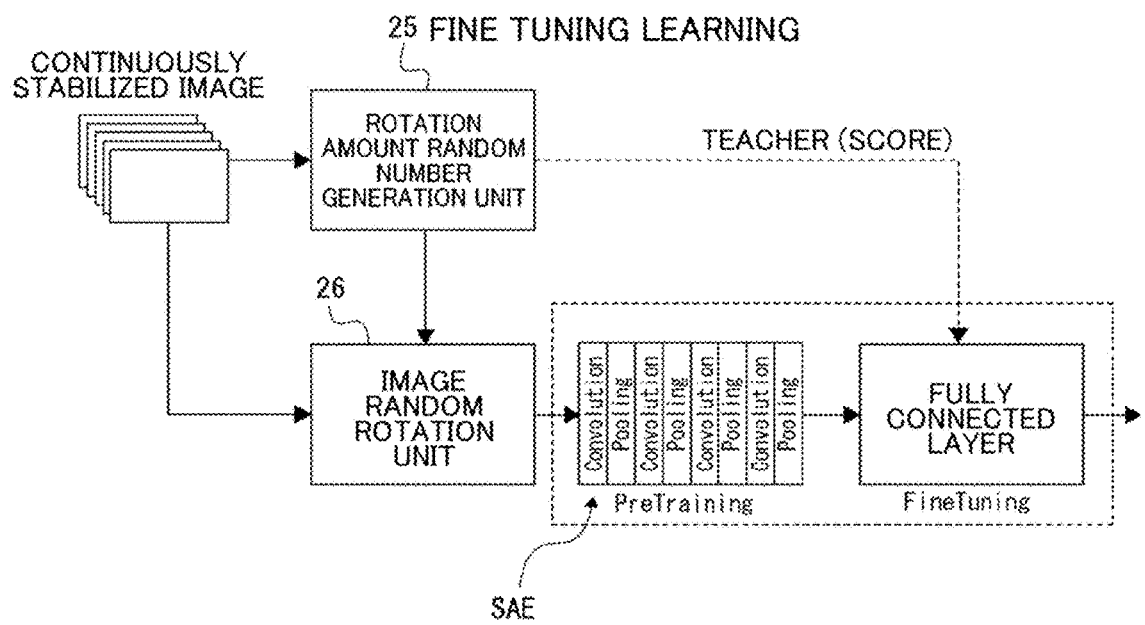
FIG. 12 is an illustrative diagram of a learning method for obtaining a score analysis algorithm.

Next, the designer carefully selects continuous stabilized images from which a good stabilization operation could be visually confirmed, and random rotation is applied to the continuous stabilized images by a rotation amount random number generation unit 25 and an image random rotation unit 26, as illustrated in FIG. 12, to perform score recognition learning in the fully connected layer. Accordingly, a score analysis algorithm for image recognition capable of performing a determination with a lower score as rotation of an input continuous frame is larger is procured. The SAE surrounded by the dashed line in the figure and the fully connected layer become the score analyzer 23 that realizes such a score analysis algorithm.

Figure 13:
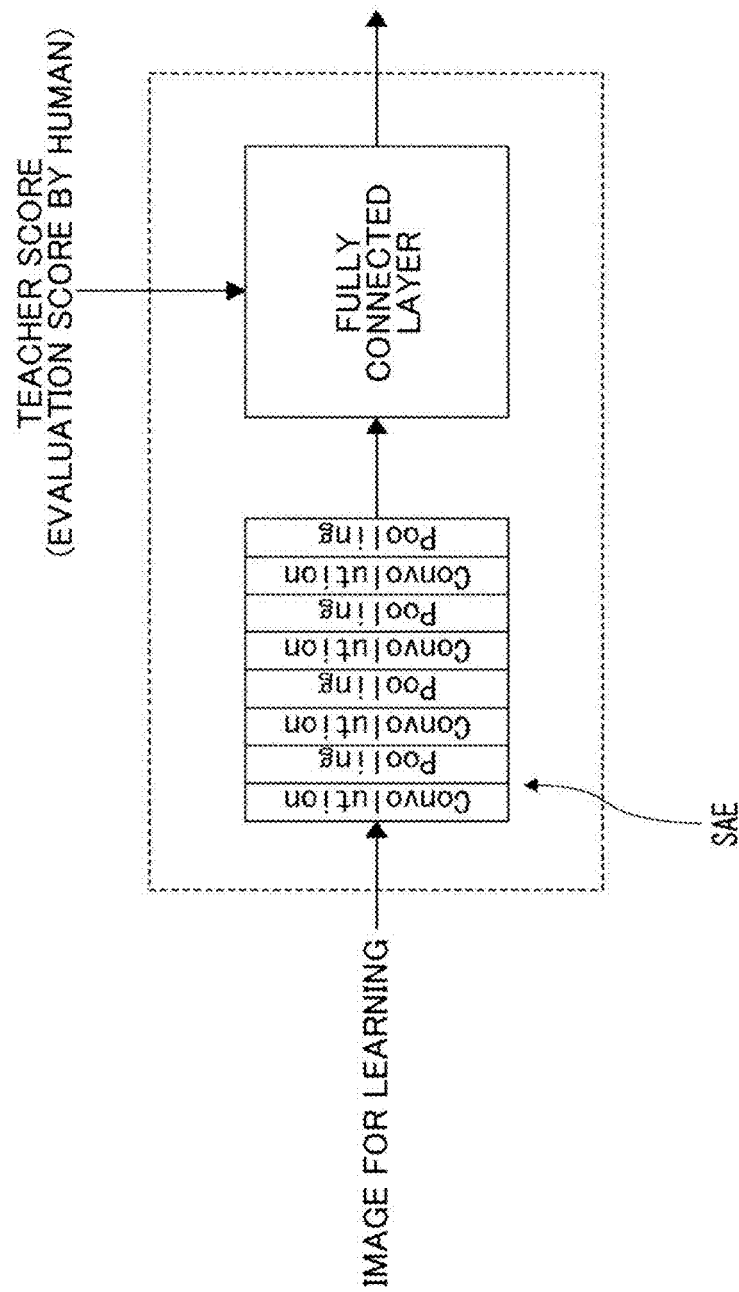
FIG. 13 is an illustrative diagram of another learning scheme for obtaining a score analysis algorithm.

The score analyzer 23 can also perform generation by learning with a human evaluation score as a teacher, as illustrated in FIG. 13. In the learning in this case, a score of a result of human evaluating an image for learning prepared in advance is input as a teacher score for the fully connected layer.

Here, when performance of the system is scored, there may be a plurality of evaluation items to be scored. For example, it is possible to pay attention to performance of a horizontal holding function (the gimbal function) described above, performance of camera work, performance of lens distortion correction, or the like, in addition to simply paying attention to correction performance for an amount of rotation (that is, vibration correction).

When evaluation of the performance is performed on a plurality of items in this way, a totaled value of the score calculated for each item is used as the evaluation score.

However, when a totaled score of a plurality of items is used as the evaluation score of the system performance, there may be a trade-off relationship depending on a combination of items that are evaluation targets. For example, there is a trade-off relationship between the performance of the camera work (tracking performance of the camera local coordinates) and vibration correction performance, and tracking performance of the camera local coordinates becomes better as the vibration correction is not performed. For example, when the evaluation scores for the two performances are not appropriately weighted, a false score is obtained in the search for the blend ratio in the automatic adjuster 24 described above, and good performance is hindered.

In order to avoid such a problem, in the present example, weighting of each item evaluation score for obtaining a totaled score is set for each destination of a product.

For example, in a use case of a fixed camera such as a surveillance camera, the camera local coordinates and the world coordinates are substantially equivalent to each other, and tracking performance of the camera work can be ignored, and therefore weighting may be performed with an emphasis on the vibration correction performance. By performing such weighting, the problem of false described above does not occur. On the other hand, in scenes such as a soccer or a basketball in which a viewpoint moves violently, because the tracking performance of the camera local coordinates is emphasized, weighting of the evaluation score for the tracking performance of the camera work is increased.

Figure 14:
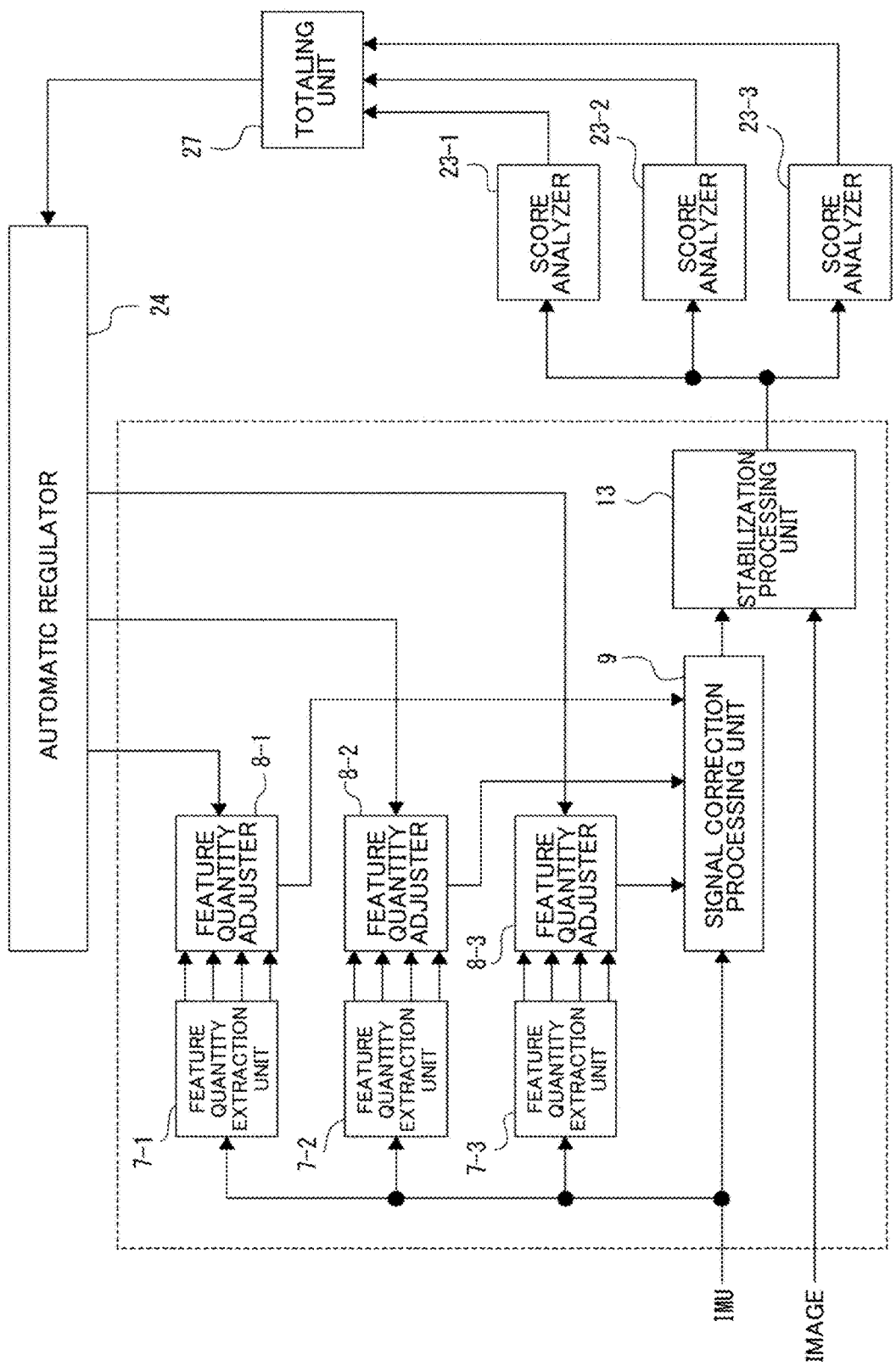
FIG. 14 is a diagram illustrating a configuration for searching for a blend ratio of feature quantities on the basis of a totaled score of a plurality of items.

FIG. 14 is a diagram illustrating a configuration for searching for the blend ratio of the feature quantities on the basis of a totaled score of a plurality of items.

As can be seen with reference to FIG. 9 above, in the camera system of the present example, the signal correction processing unit 9 performs a plurality of types of correction processing based on a plurality of types of feature quantities, such as correction processing for removing centrifugal force and correction processing for reflecting camera work. Corresponding to this, in the blend ratio search in this case, a camera system including a plurality of feature quantity extraction units 7 (reference signs 7-1, 7-2, and 7-3 in the figure) as surrounded by a dashed line in the figure is used. In the camera system in this case, the feature quantity adjuster 8 (reference signs 8-1, 8-2, and 8-3 in the figure) is provided in each feature quantity extraction unit 7, and an output of these feature quantity adjusters 8 (the feature quantity after blend) is input to the signal correction processing unit 9. The number of feature quantity extraction units 7 and feature quantity adjusters 8 is set to three for convenience of illustration, and in reality, these are provided in each correction unit included in the signal correction processing unit 9.

In this case, the stabilized image obtained by the stabilization processing unit 13 is input to a plurality of score analyzers 23 (reference signs 23-1, 23-2, and 23-3 in the figure). The score analyzers 23 calculate evaluation score for a corresponding item among a plurality of items that are evaluation targets, such as vibration correction performance, horizontal holding function, and performance of tracking to camera work described above. The number of the score analyzers 23 is set to three for convenience of illustration, and the score analyzers 23 in this case may be provided for each item that is an evaluation target.

A totaling unit 27 calculates a totaled score by totaling evaluation scores for respective items calculated by each score analyzer 23, and outputs the totaled score to the automatic adjuster 24.

In this case, the automatic adjuster 24 searches for a combination of blend ratios satisfying a predetermined criterion on the basis of the totaled score while sequentially changing a combination of blend ratios set in each feature quantity adjuster 8.

When weighting each destination as described above is performed, the totaling unit 27 totals respective evaluation scores by weighting according to the destination.

Figure 15:
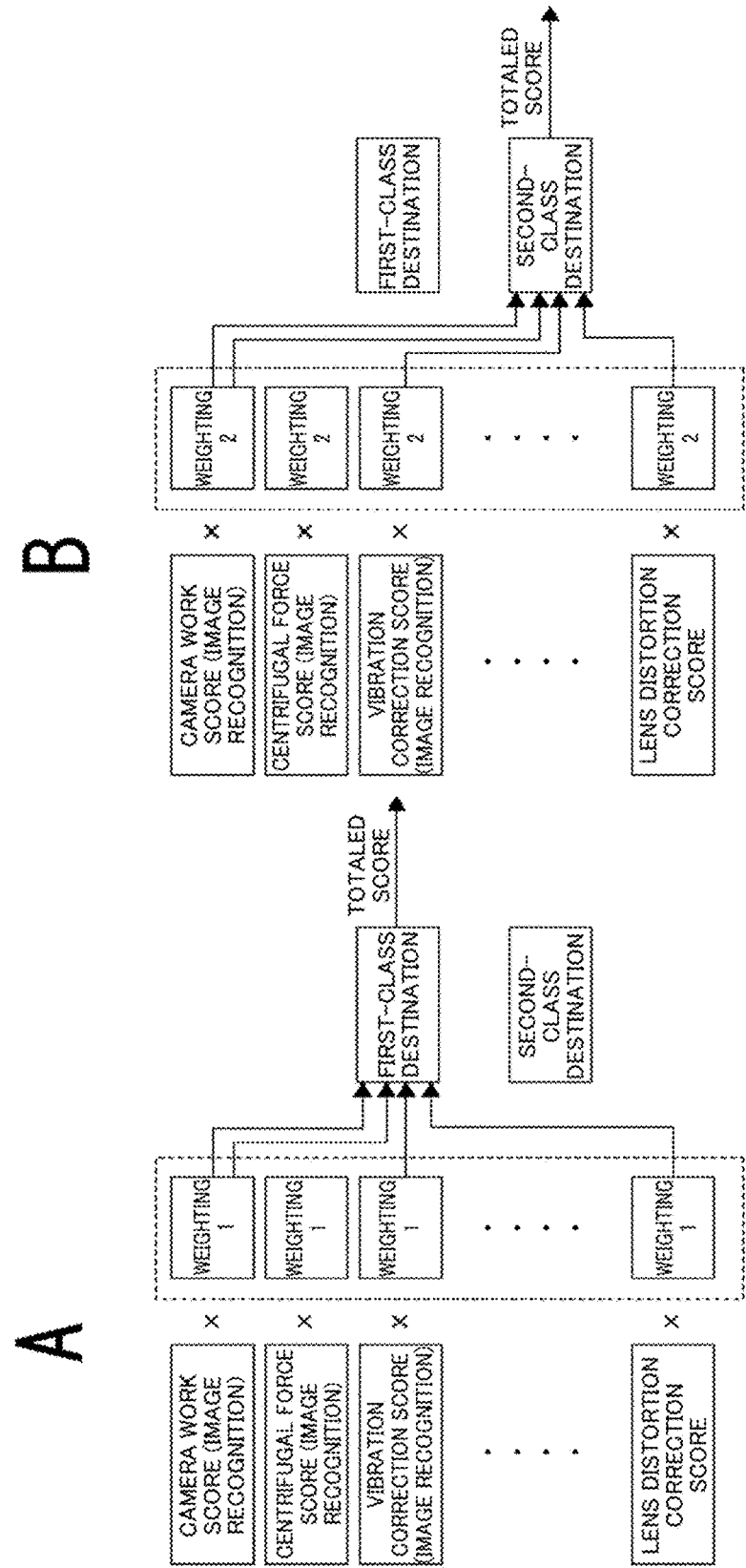
FIG. 15 is a diagram illustrating an example of a quantitative weighting scheme as a specific example of a weighting scheme according to a destination.
Figure 16:
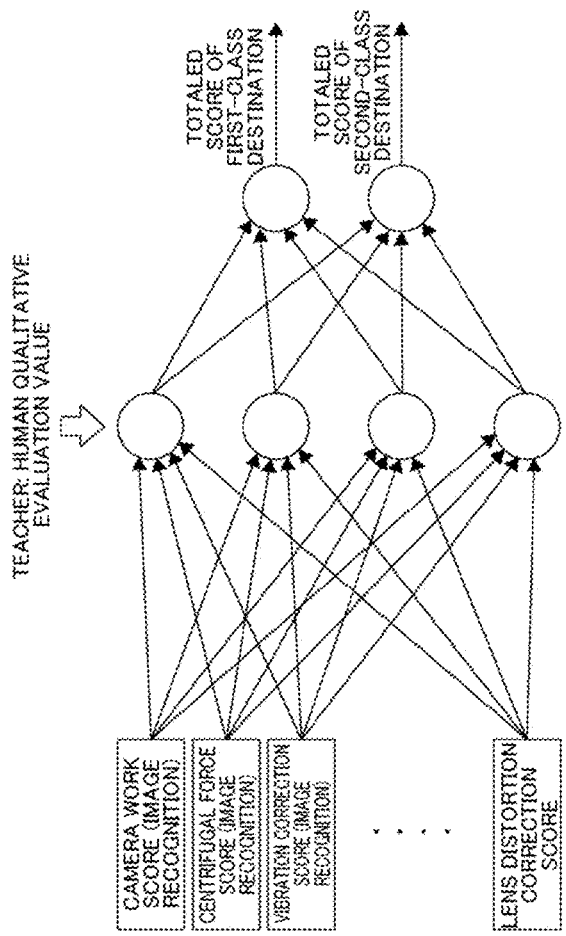
FIG. 16 is a diagram illustrating an example of a qualitative weighting scheme as a specific example of a weighting scheme according to a destination.

FIGS. 15 and 16 are illustrative diagram of specific examples of weighting schemes according to destinations.

FIG. 15 is a diagram illustrating an example of a quantitative weighting scheme, and in this scheme, a totaled score for each destination is calculated by weighting and adding evaluation scores calculated for each of items such as camera work, centrifugal force, and vibration correction with a weighting coefficient determined for each destination in advance, as illustrated in FIGS. 15A and 15B through a comparison.

FIG. 16 is a diagram illustrating an example of a qualitative weighting scheme. In the quantitative weighting scheme illustrated in FIG. 15, each item is weighted by a predetermined weighting coefficient, whereas in the qualitative weighting scheme, weighting calculation by a neural network is performed in order to reproduce human sensitivity. As illustrated in the figure, an input to the neural network is used as the evaluation score for each item, the teacher data is used as the score scored by humans, and learning is performed to output a totaled score close to the score scored by humans for each destination.

This makes it possible to search for a blend ratio to be set in the feature quantity adjuster 8 on the basis of a performance evaluation score close to human sensitivity.

Here, for the blend ratio of the feature quantities in the feature quantity adjuster 8, an appropriate blend ratio may differ depending on a scene that is an imaging target. For example, the appropriate blend ratio may differ in a case in which a scene, which is an imaging target, is a scene by a point of view of a driver of a vehicle traveling at a speed of hundreds of kilometers per hour and a case in which the scene is a scene by a point of view of a user moving on foot.

Therefore, in the search for the blend ratio using the automatic adjuster 24 described above, it is desirable to obtain a blend ratio that satisfies a predetermined criterion for each scene.

It is conceivable that in order to set the appropriate blend ratio for each scene, the blend ratio for each scene obtained in search is held in the feature quantity adjuster 8, and the blend ratio is switched according to the scene analysis result based on the captured image.

In this case, it is conceivable to use the same CNN as that used in general image recognition as an analyzer that performs the scene analysis (hereinafter referred to as a "scene analyzer"), but it is not desirable to separately mount an AI as the CNN for such image recognition and an AI as the feature quantity extraction unit 7 in the camera system due to limitation of calculation resources.

Therefore, in the present example, a scheme for analyzing a scene through recognition from an image is not adopted, and a determination is made whether or not an evaluation score from IMU motion data, which is lighter data, satisfies a certain criterion, and when the certain criterion is not satisfied, stabilization processing in an embedded system is lightened by adopting a blend ratio switching scheme.

In this case, it is conceivable to use the score analyzer 23 described above for calculation of the evaluation score, but because the score analyzer 23 calculates the evaluation score on the basis of the stabilized image, calculation resources increase.

Therefore, in the present example, AI trained to calculate the evaluation score from the IMU signal lighter than an image signal with the evaluation score calculated by the score analyzer 23 as a teacher is used as the score classification scene analyzer 10 illustrated in FIG. 1.

Figure 17:
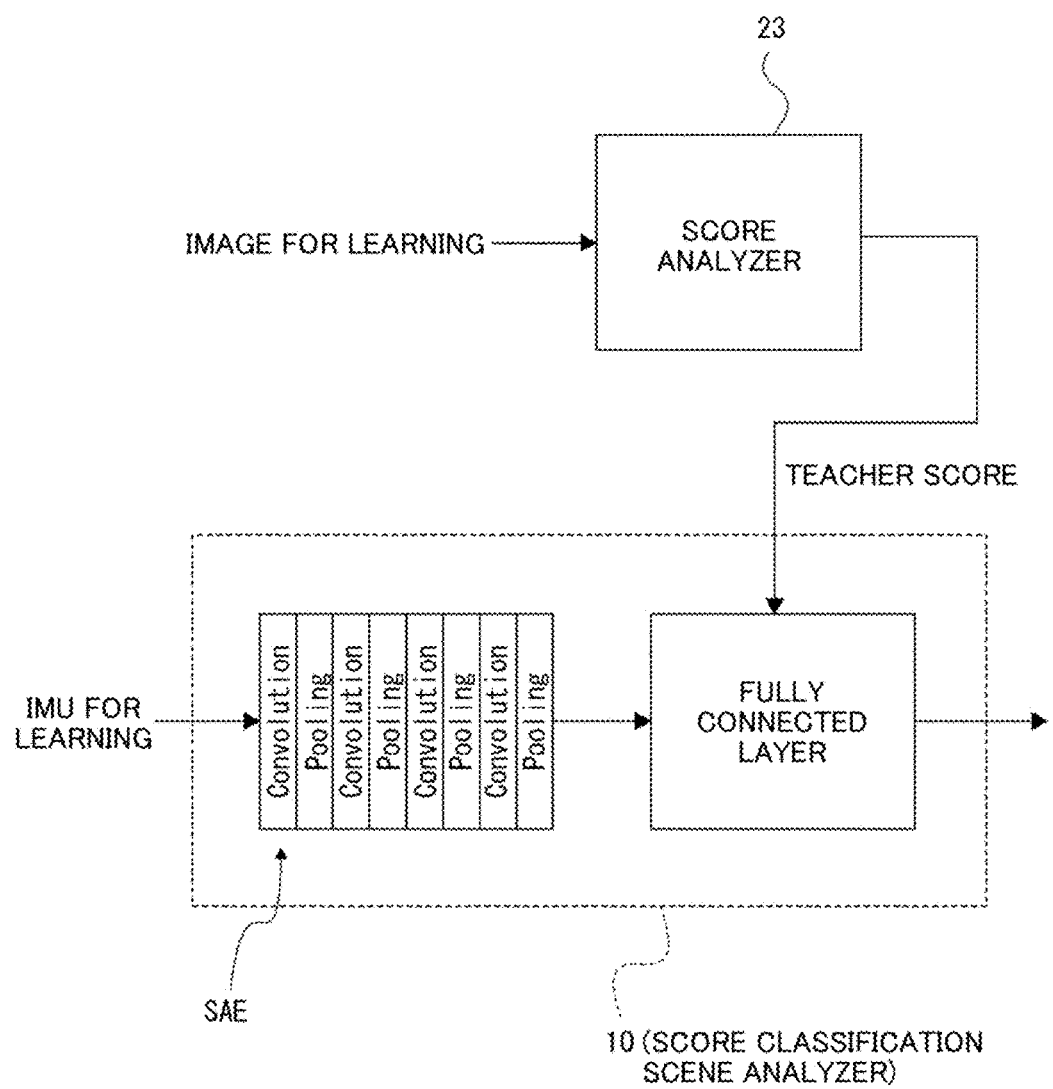
FIG. 17 is a diagram illustrating an example of a generation scheme for a score classification scene analyzer in the embodiment.

FIG. 17 is a diagram illustrating an example of a generation scheme of the score classification scene analyzer 10.

As shown by a dashed line in the figure, the score classification scene analyzer 10 has a configuration of a general CNN that includes a SAE and a fully connected layer in a subsequent stage.

The trained score analyzer 23 is caused to calculate the evaluation score with the image for learning as an input. On the other hand, an algorithm for giving an IMU signal (the IMU quaternion in the present example) synchronized with the image for learning as an input to the score classification scene analyzer 10 as an IMU for learning, giving the evaluation score calculated by the score analyzer 23 to the fully connected layer as a teacher score, and calculating the same evaluation score as that of the score analyzer 23 from an IMU signal through learning as fine tuning is generated. On the fine tuning side, machine learning is performed with a value obtained by performing differential processing on the evaluation score from the score analyzer 23 as necessary as a teacher.

Here, for the score classification scene analyzer 10 generated by the learning as described above, the input signal is an IMU signal, as in the feature quantity extraction unit 7. Further, the IMU signal as an input signal is given to the SAE in the score classification scene analyzer 10, and the IMU signal as an input signal is also given to the SAE (SAE 70) in the feature quantity extraction unit 7. From this, the SAE 70 in the feature quantity extraction unit 7 can be shared as the SAE in the score classification scene analyzer 10.

Figure 18:
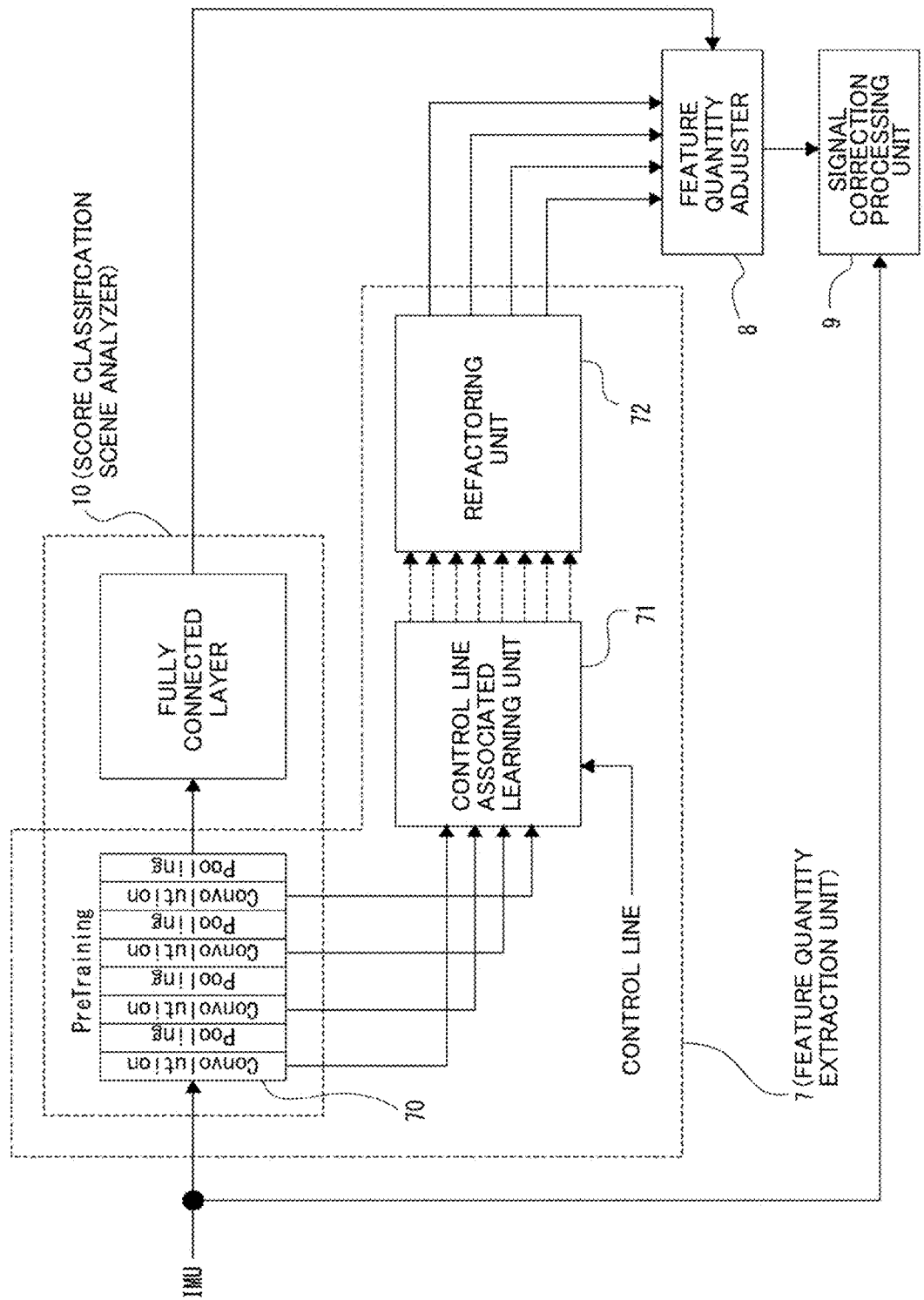
FIG. 18 is a diagram illustrating a configuration relationship between a feature quantity extraction unit and a score classification scene analyzer in the signal processing device of the embodiment.

FIG. 18 illustrates a configuration relationship between the feature quantity extraction unit 7 and the score classification scene analyzer 10 in the signal processing device 1.

As illustrated in the figure, the score classification scene analyzer 10 includes the SAE 70 in the feature quantity extraction unit 7 and the fully connected layer in the subsequent stage.

Thus, a configuration in which the SAE in the feature quantity extraction unit 7 is shared can be adopted as the score classification scene analyzer 10, and thus, it is possible to reduce the calculation resources as compared with a case in which AI as the feature quantity extraction unit 7 and AI as the score analyzer 23 are provided individually.

As described above, a pretrained SAE is used as the SAE 70 in the feature quantity extraction unit 7. Therefore, a pretrained SAE is used as the SAE in the score classification scene analyzer 10 at the time of learning described with reference to FIG. 17.

In FIG. 18, the score classification scene analyzer 10 calculates an evaluation score on the basis of an IMU signal (the IMU quaternion in the present example), and outputs the calculated evaluation score to the feature quantity adjuster 8.

In this case, the feature quantity adjuster 8 stores at least two kinds of blend ratios as blend ratios of the feature quantities. These blend ratios are the blend ratios obtained for each scene by searching for the blend ratio using the automatic adjuster 24.

The feature quantity adjuster 8 blends feature quantities of a plurality of systems input from the feature quantity extraction unit 7 by any of the stored blend ratios. On the other hand, a sequential determination is made whether or not the evaluation score input from the score classification scene analyzer 10 is a score satisfying a predetermined criterion (for example, whether or not the evaluation score is equal to or higher than a predetermined threshold value), and when the predetermined criteria is not met, the blend ratio in use is switched to another blend ratio.

This makes it possible to perform switching to another blend ratio when satisfactory performance is not obtained, and to perform switching to an appropriate blend ratio according to the scene.

4. Extraction Examples for Various Feature Quantities

Subsequently, an example of extraction schemes for various feature quantities based on the IMU signal will be described with reference to FIGS. 19 to 32.

Because the scheme for extracting the centrifugal force feature quantity has already been described, the description here will be omitted.

Figure 19:
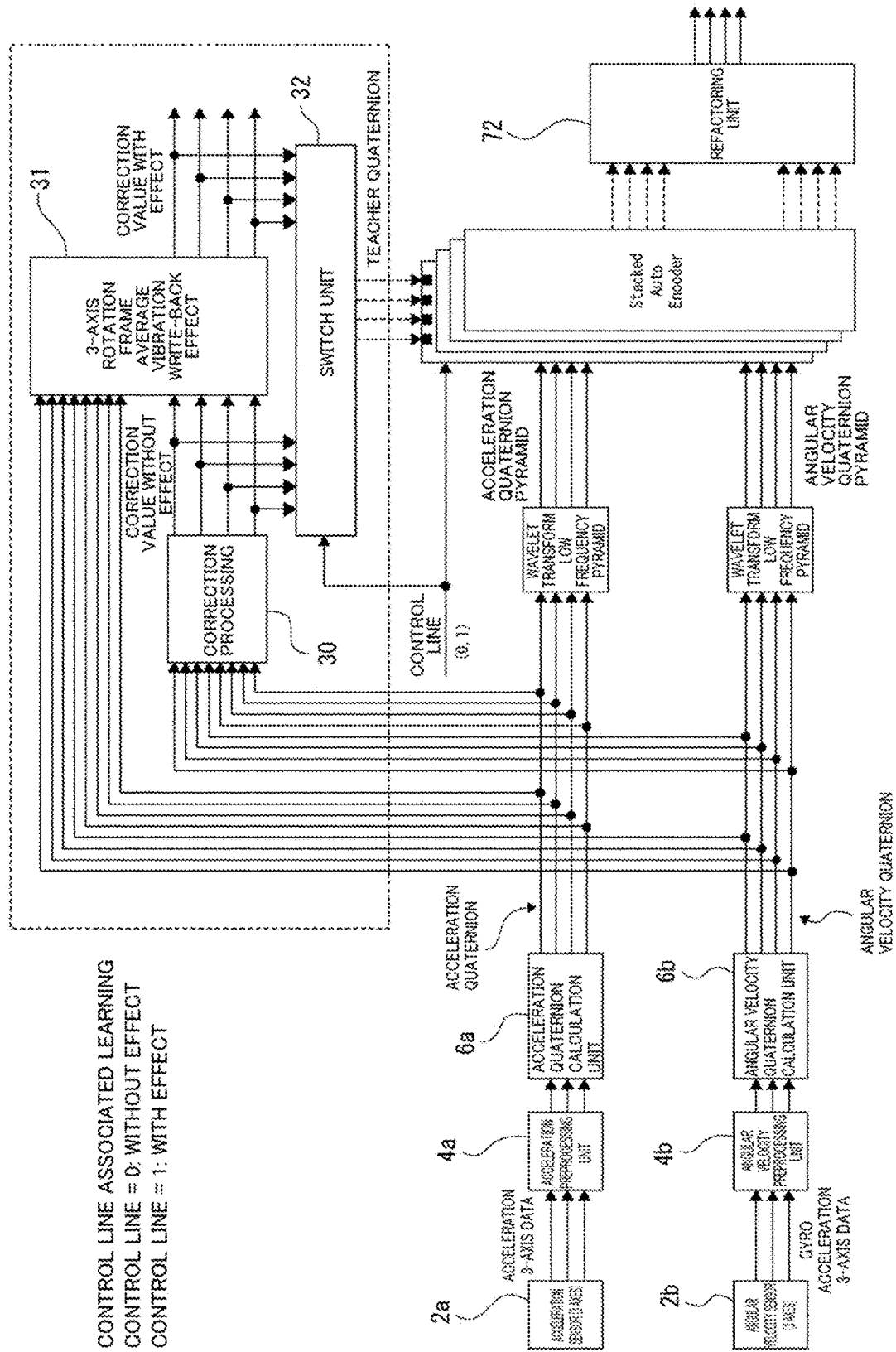
FIG. 19 is an illustrative diagram of an effect vibration feature quantity extraction scheme (learning environment).
Figure 20:
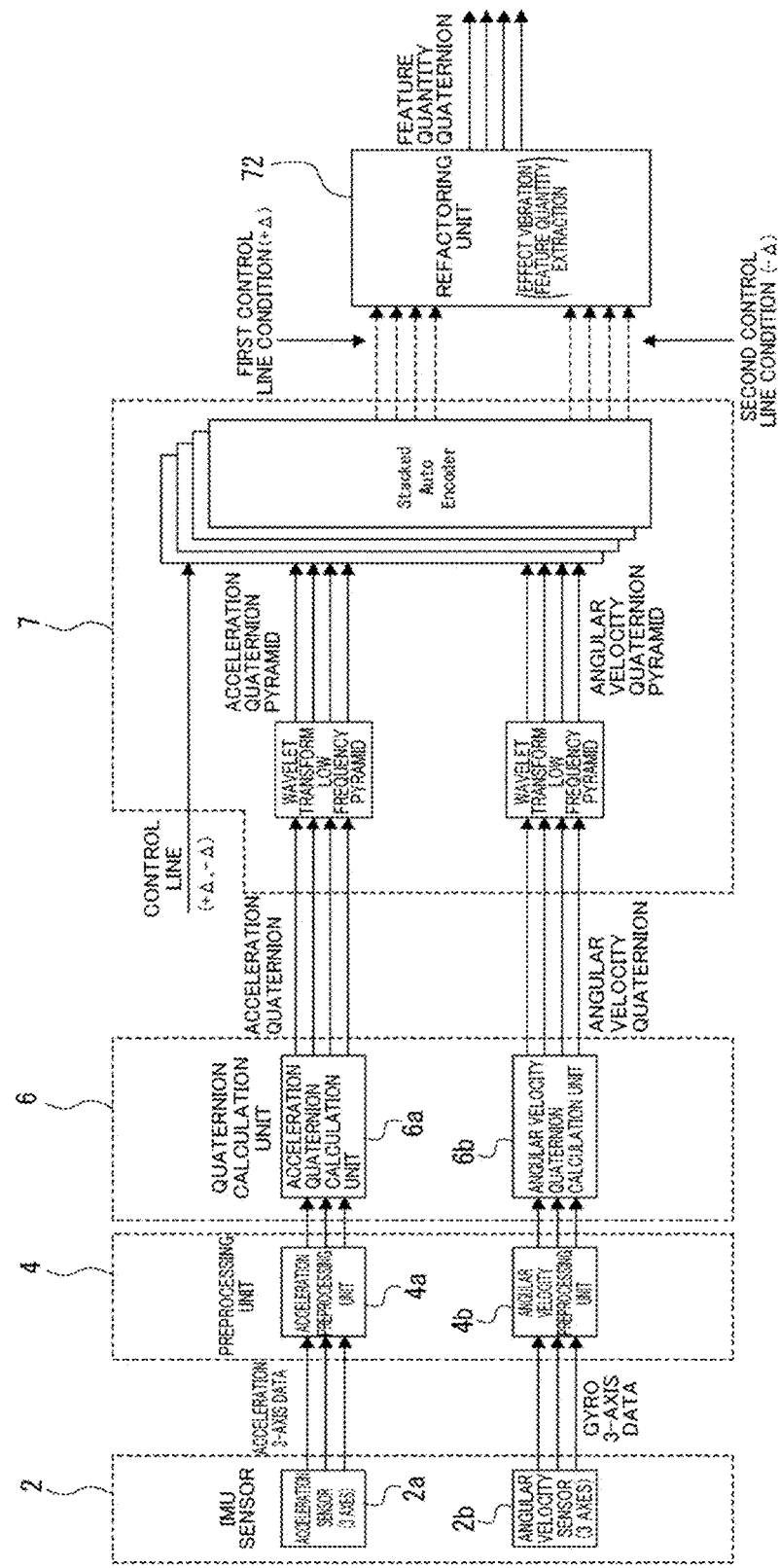
FIG. 20 is an illustrative diagram of an effect vibration feature quantity extraction scheme (environment after mounting).

FIGS. 19 and 20 are illustrative diagrams of the effect vibration feature quantity extraction scheme.

In a learning environment illustrated in FIG. 19, regarding the generation of the learning set, as shown in a dashed line frame in the figure, the quaternion without the effect vibration is generated by correction processing 30, and then a quaternion with effect vibration obtained by writing back an amount of rotation from which a rolling shutter (RS) distortion component such as a rotation frame average has been removed is generated, as shown by a 3-axis rotation frame average vibration write-back effect 31 in the figure. As machine learning, a quaternion without an effect is given as a teacher by the switch unit 32 when the control line value=0.0, and a quaternion with an effect is given as a teacher when the control line value=1.0, and the control line associated learning is performed. Accordingly, the algorithm for switching between aspects of the effect vibration feature quantity to be output, according to the value given to the control line, is generated.

In an environment after mounting on the signal processing device 1, an extracted feature quantity when the control line value=+Δ is given to the feature quantity extraction unit 7 (the control line associated learning unit 71), and an extracted feature quantity when the control line value=−Δ is given are input to the refactoring unit 72, as illustrated in FIG. 20. In the refactoring unit 72, a difference between these extracted feature quantities is calculated, and LPF processing or HPF processing is performed as necessary to obtain a feature quantity quaternion as an effect vibration feature quantity. This feature quantity quaternion is input to the effect correction unit 9c (see FIG. 9) in the signal correction processing unit 9 after being adjusted (blended) by the feature quantity adjuster 8.

In effect insertion in sequential processing, an effect from which RS distortion is simply removed and to which a rotation average value is added is such a monotonous effect, but it is possible to realize effect processing with a high sense of presence as a result of causing AI to learn an effect pattern according to various patterns.

Figure 21:
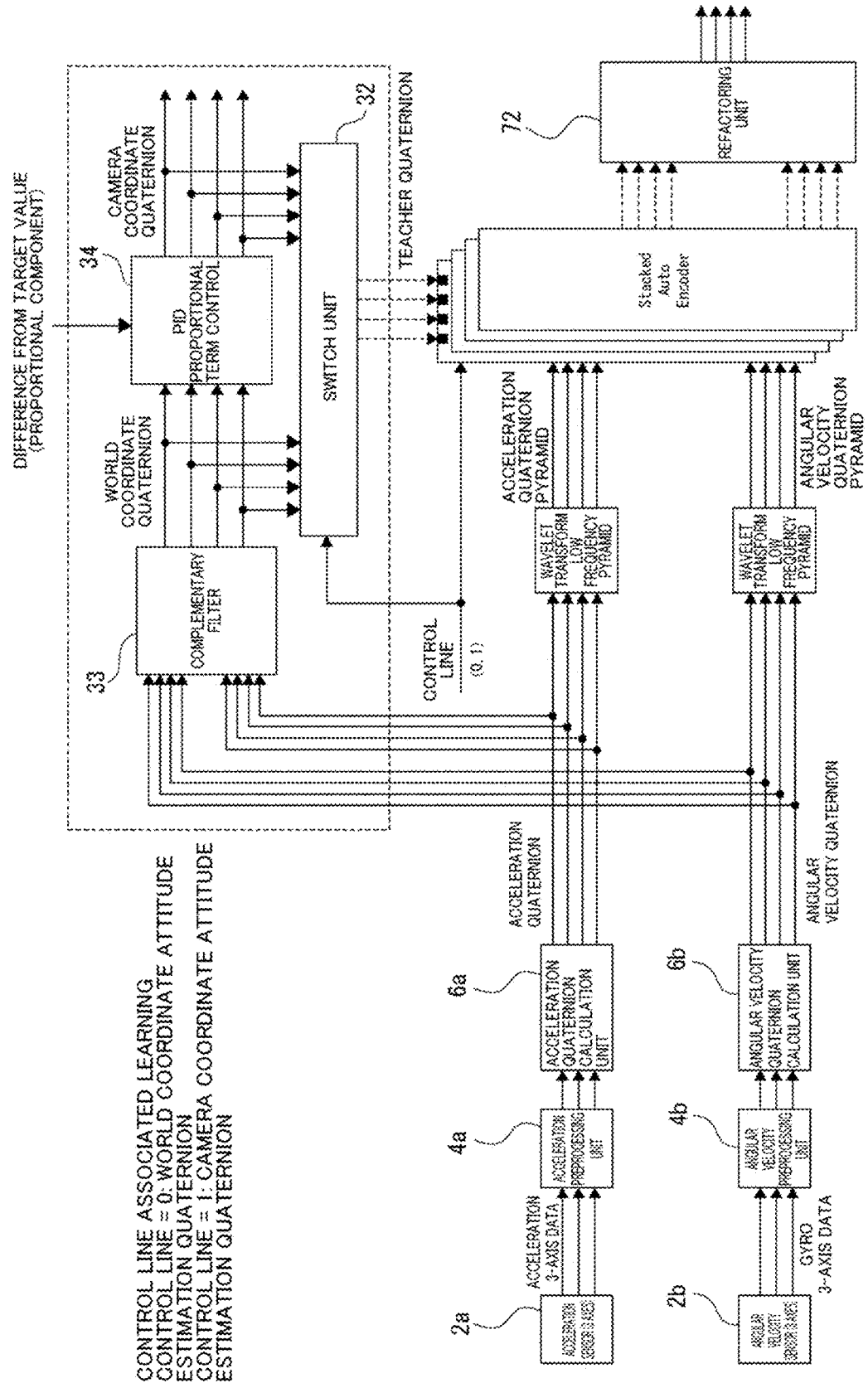
FIG. 21 is an illustrative diagram of a camera work feature quantity extraction scheme (learning environment).
Figure 22:
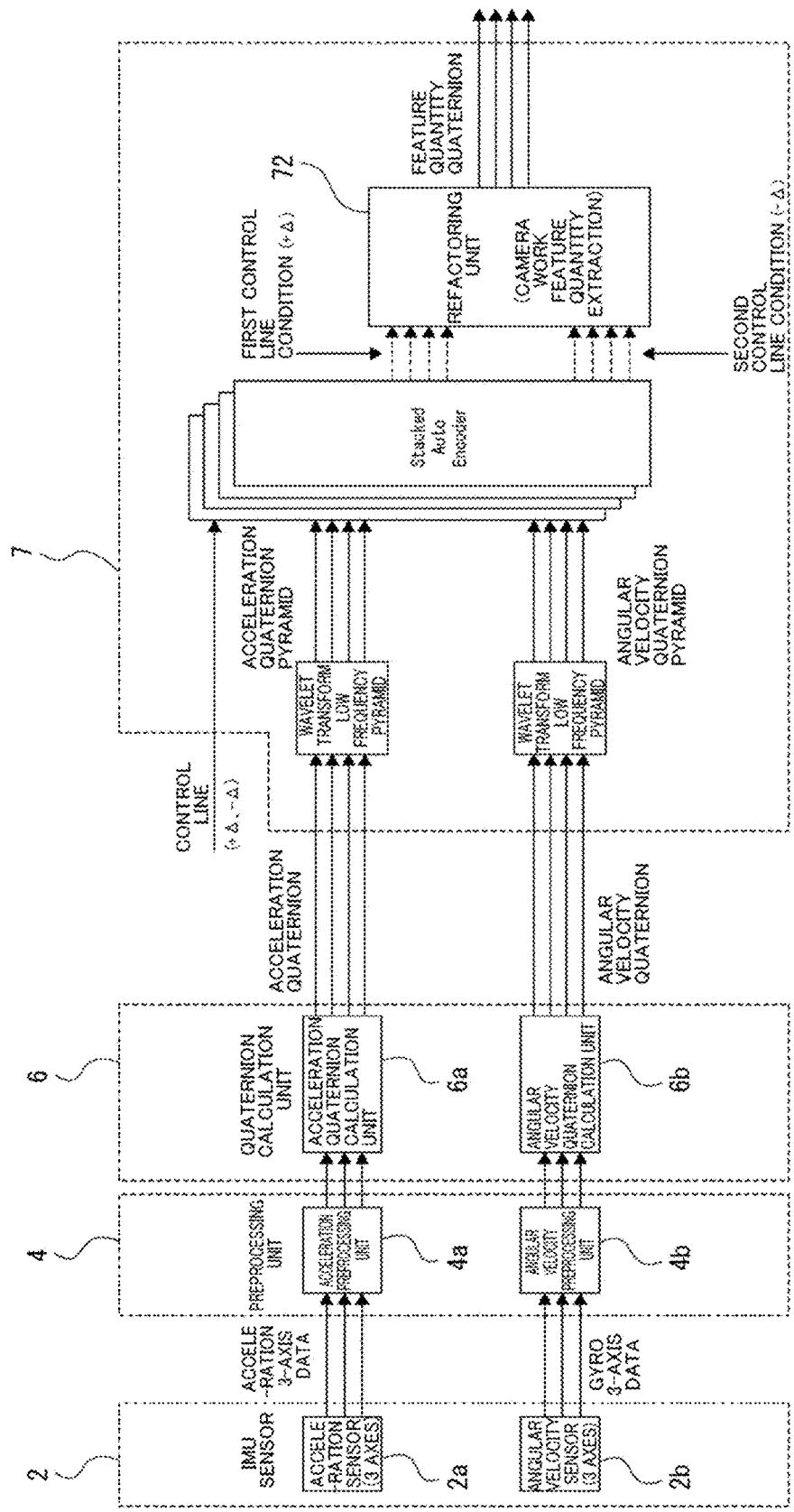
FIG. 22 is an illustrative diagram of a camera work feature quantity extraction scheme (environment after mounting).

FIGS. 21 and 22 are illustrative diagram of the camera work feature quantity extraction scheme.

In a learning environment illustrated in FIG. 21, a world coordinate quaternion is obtained from the angular velocity quaternion and the acceleration quaternion through a complementary filter 33. Further, a camera local coordinate quaternion is generated by appropriate center return sequential processing (proportional term control in PID control) as shown as PID proportional term control 34 in the figure, on the basis of this world coordinate quaternion. As machine learning, the world coordinate quaternion is given as a teacher by the switch unit 32 when the control line value=0.0 and the camera local coordinate quaternion is given as a teacher when the control line value=1.0, and control line associated learning is performed. Accordingly, an algorithm for switching between the aspects of the camera work feature quantity to be output, according to the value given to the control line, is generated.

In the environment after mounting on the signal processing device 1, an extracted feature quantity when the control line value=+Δ is given to the feature quantity extraction unit 7, and an extracted feature quantity when the control line value=−Δ is given are input to the refactoring unit 72, as illustrated in FIG. 22. In the refactoring unit 72, a difference between these extracted feature quantities is calculated, and LPF processing or HPF processing is performed as necessary to obtain a feature quantity quaternion as a camera work feature quantity. This feature quantity quaternion is input to the camera work correction unit 9e in the signal correction processing unit 9 after being adjusted by the feature quantity adjuster 8.

It is difficult to formulate a mathematical model for center return in the sequential processing used for teacher generation, and erroneous correction is performed depending on scenes, but in machine learning, it is possible to understand a camera work feature quantity even in a complicated motion, by learning a huge number of patterns, and to realize appropriate correction from world coordinates to camera local coordinates.

Figure 23:
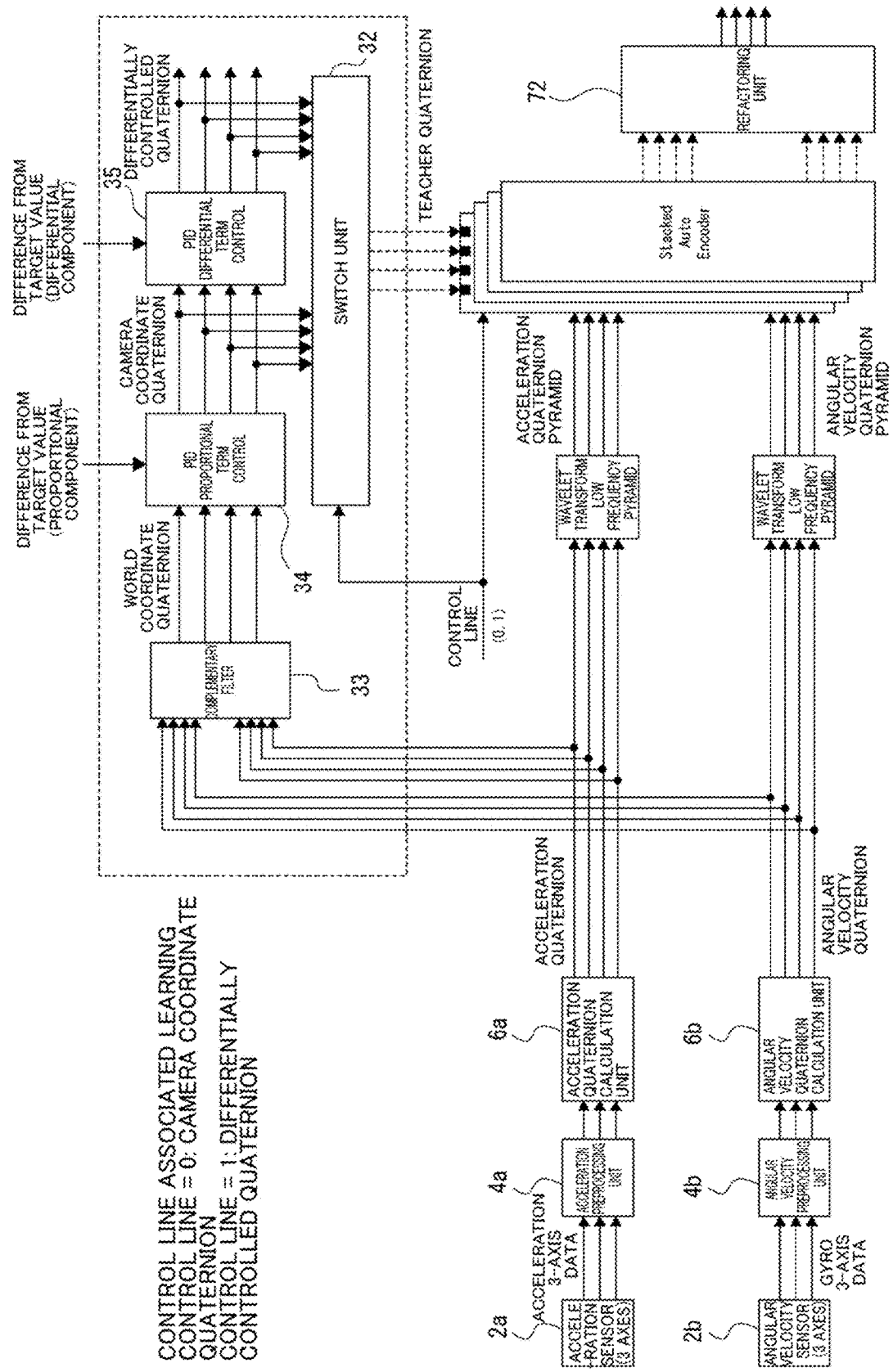
FIG. 23 is an illustrative diagram of a sudden fluctuation feature quantity extraction scheme (learning environment).
Figure 24:
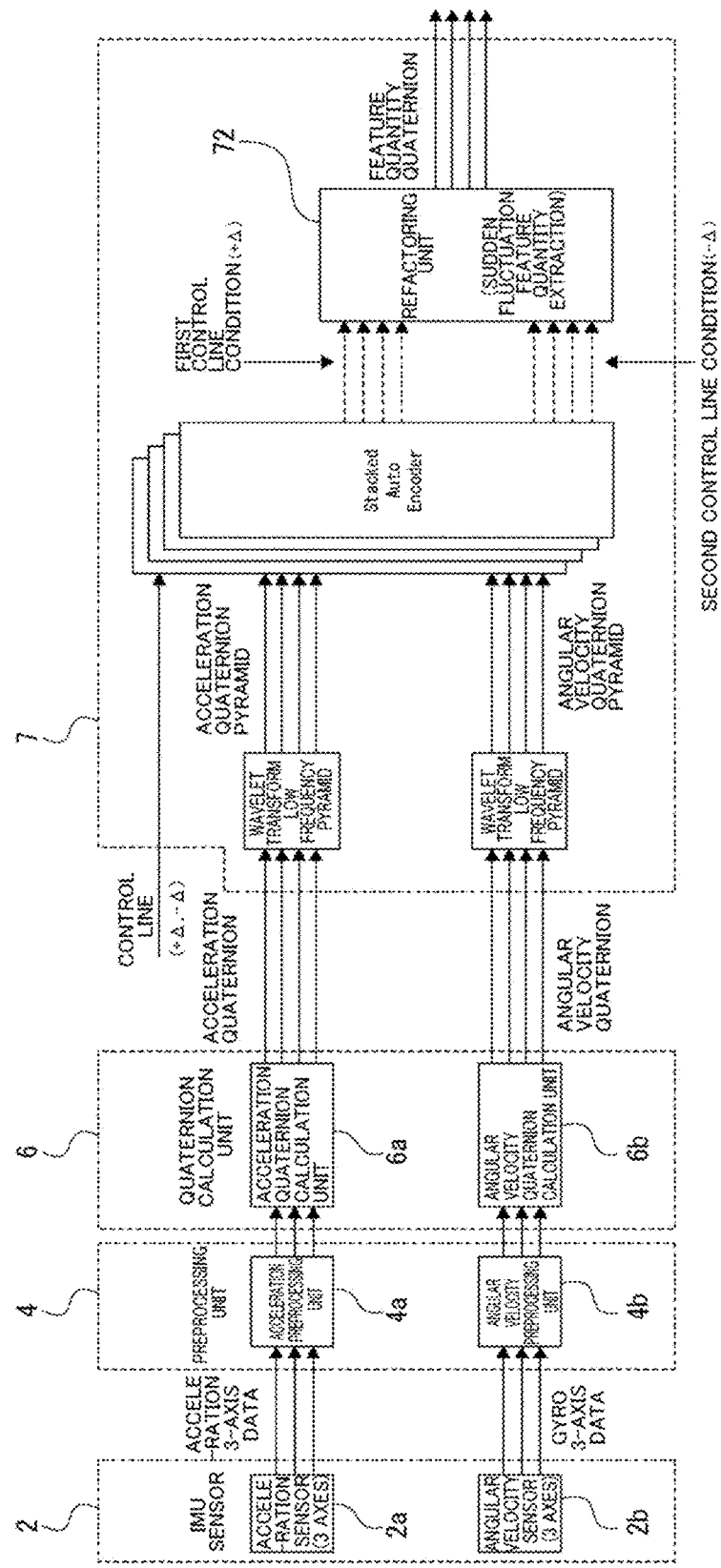
FIG. 24 is an illustrative diagram of a sudden fluctuation feature quantity extraction scheme (environment after mounting).

FIGS. 23 and 24 are illustrative diagrams of a sudden fluctuation feature quantity extraction scheme.

In a learning environment illustrated in FIG. 23, the learning set is the same as that in a case of the extraction of the camera work feature quantity until the proportional term (camera local coordinate quaternion) is generated. In this case, for teacher generation, a differential term is further provided (see a PID differential term control 35 in the figure) and a differentially controlled quaternion that limits large fluctuation is generated. In learning, the camera local coordinate quaternion when the control line value is 0.0, and a differentially controlled quaternion as a teacher when the control line value is 1.0 are given as a teacher by the switch unit 32, and control line associated learning is performed. Accordingly, an algorithm for switching between the aspects of the sudden fluctuation feature quantity to be output, according to the value given to the control line, is generated.

In the environment after mounting on the signal processing device 1, an extracted feature quantity when the control line value=+Δ is given to the feature quantity extraction unit 7, and an extracted feature quantity when the control line value=−Δ is given are input to the refactoring unit 72, as illustrated in FIG. 24. In the refactoring unit 72, a difference between these extracted feature quantities is calculated, and LPF processing or HPF processing is performed as necessary to obtain a feature quantity quaternion as a camera work feature quantity. This feature quantity quaternion is input to the sudden fluctuation correction unit 9f in the signal correction processing unit 9 after being adjusted by the feature quantity adjuster 8.

Sudden fluctuation curbing processing is also a proposition in which it is relatively difficult to formulate a correct mathematical model in the sequential processing used for teacher generation, and incorrect correction is performed in some scenes, but in machine learning, it is possible to understand the sudden fluctuation feature quantity even in a complicated motion by learning various patterns in a time-series flow for a certain period of time with the low frequency pyramid of the wavelet transform as an input, and to realize high-quality sudden fluctuation curbing processing as than that in a case in which a sequential processing implementation algorithm for a designer is adopted, through feature quantity correction based on AI processing.

Figure 27:
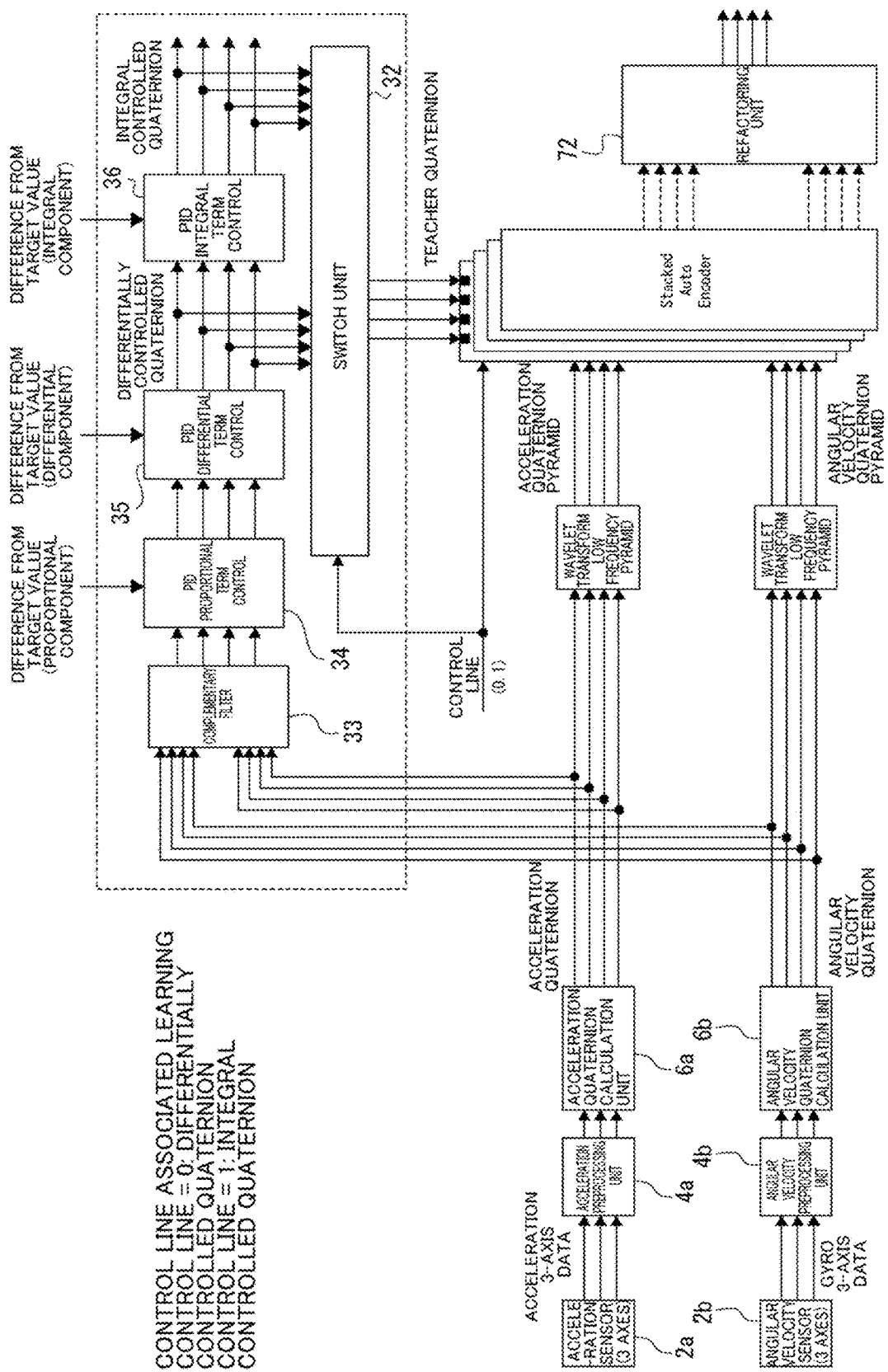
FIG. 27 is an illustrative diagram of an extraction scheme for a stabilizer braking feature quantity (learning environment).
Figure 28:
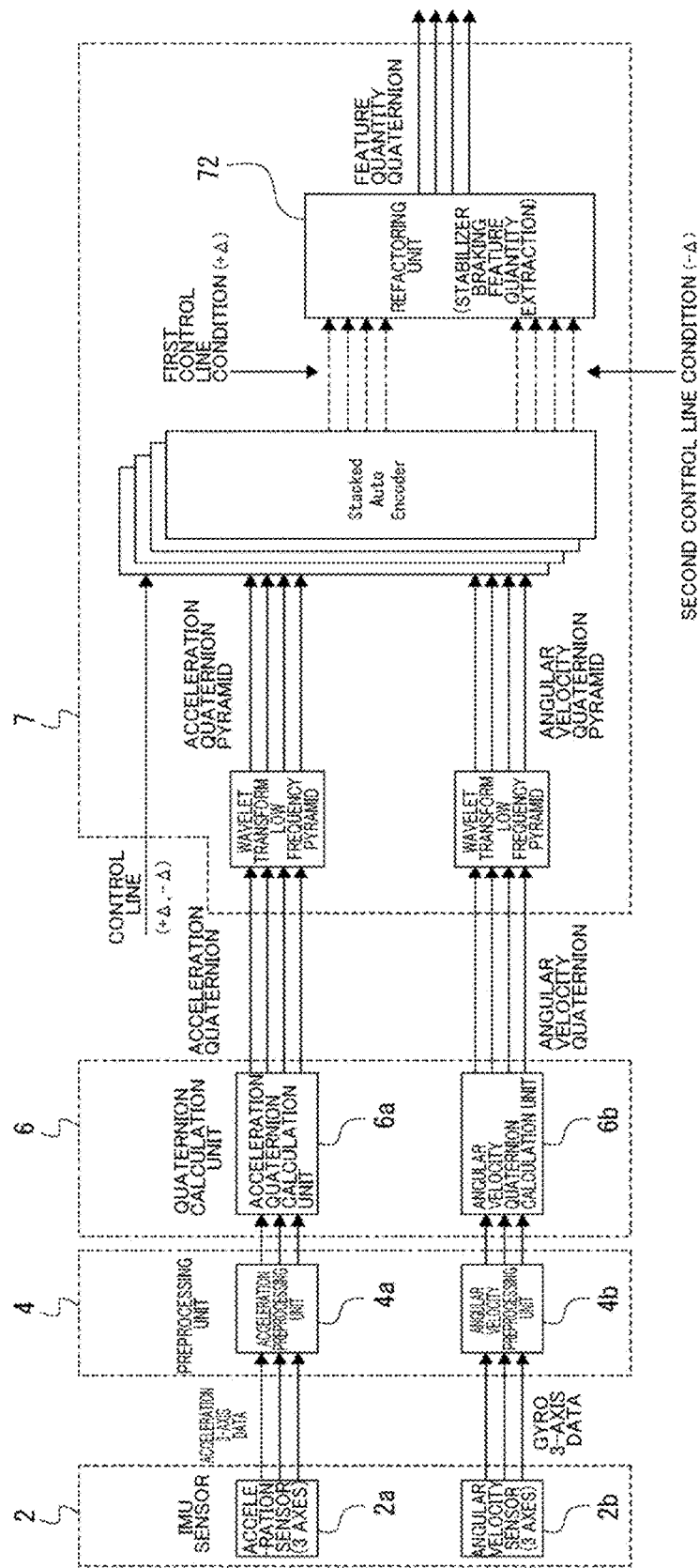
FIG. 28 is an illustrative diagram of an extraction scheme for a stabilizer braking feature quantity (environment after mounting).

FIGS. 27 and 28 are illustrative diagram of a scheme for extracting the stabilizer braking feature quantity.

In a learning environment illustrated in FIG. 27, an integral controlled quaternion obtained by also performing correction of an integral item using PID integral term control 36 on the above-described differentially controlled quaternion (FIG. 23) is generated. With this integral controlled quaternion, even when a center deviation is small, a center return becomes stronger due to integral, and as an effect, in a stabilization system including a telephoto lens such as a surveillance camera, stable stabilizer braking processing without being agitated by a minute bias of a rotational angular velocity sensor becomes possible. As machine learning, a differentially controlled quaternion when the control line value=0.0 and an integral controlled quaternion when the control line value=1.0 are given as a teacher, and control line associated learning is performed. Accordingly, an algorithm for switching between the aspects of the stabilizer braking feature quantity to be output, according to the value given to the control line, is generated.

In the environment after mounting on the signal processing device 1, an extracted feature quantity when the control line value=+Δ is given to the feature quantity extraction unit 7, and an extracted feature quantity when the control line value=−Δ is given are input to the refactoring unit 72, as illustrated in FIG. 28. In the refactoring unit 72, a difference between these extracted feature quantities is calculated, and LPF processing or HPF processing is performed as necessary to obtain a feature quantity quaternion as a stabilizer braking feature quantity. This feature quantity quaternion is input to the stabilizer braking correction unit 9h in the signal correction processing unit 9 after being adjusted by the feature quantity adjuster 8.

It is possible to improve performance of tracking to the camera local coordinates by performing such correction processing on the basis of the stabilizer braking feature quantity, and to appropriately reflect the viewpoint movement of the user. Especially with a telephoto lens, stabilization processing moves greatly due to geometric factors with a slight rotation, which causes a stabilized image to wobble due to an influence of a slight gyro bias noise, and the integral term is intended to remove such a minute bias for stabilization.

Figure 25:
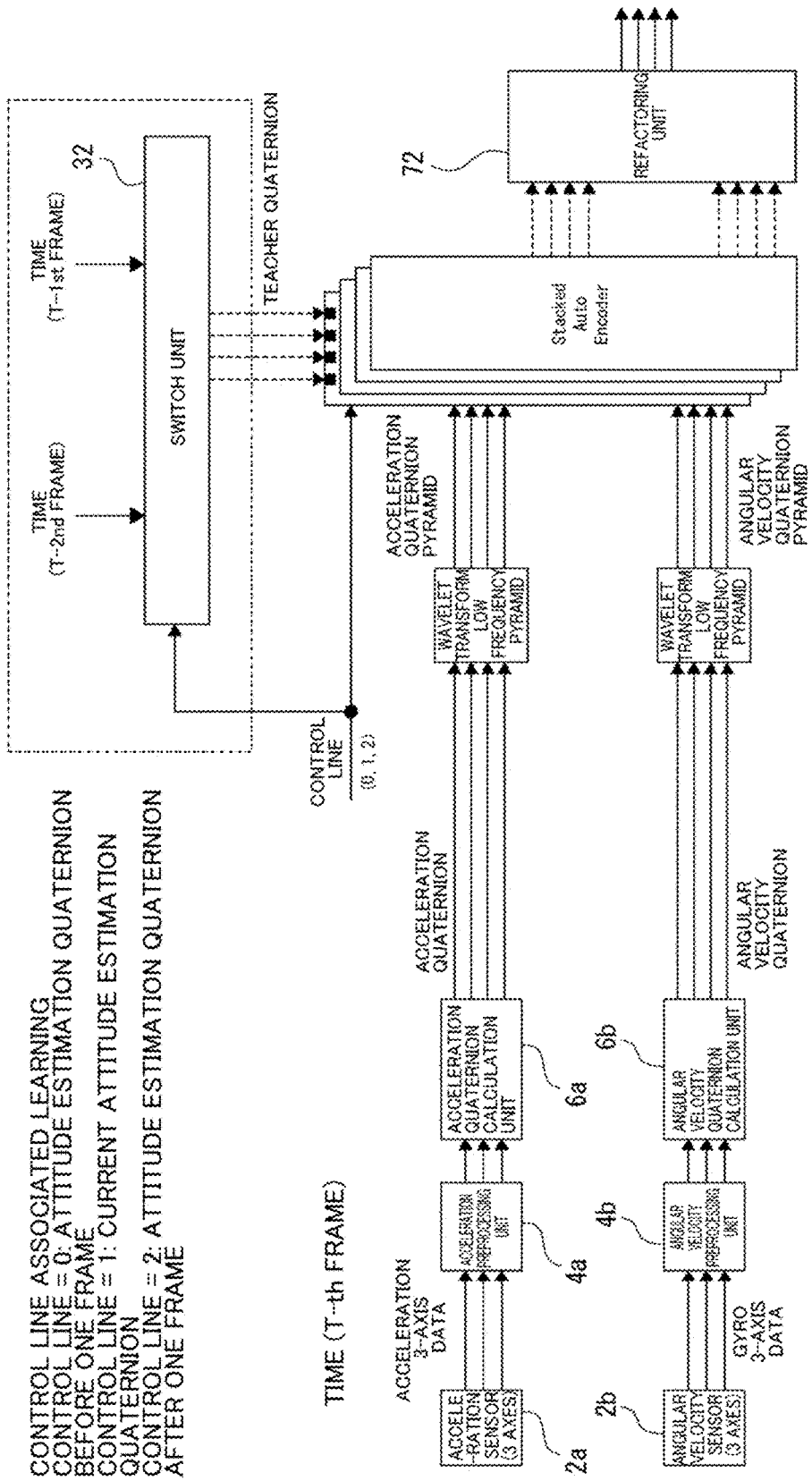
FIG. 25 is an illustrative diagram of a frame prediction feature quantity extraction scheme (learning environment).
Figure 26:
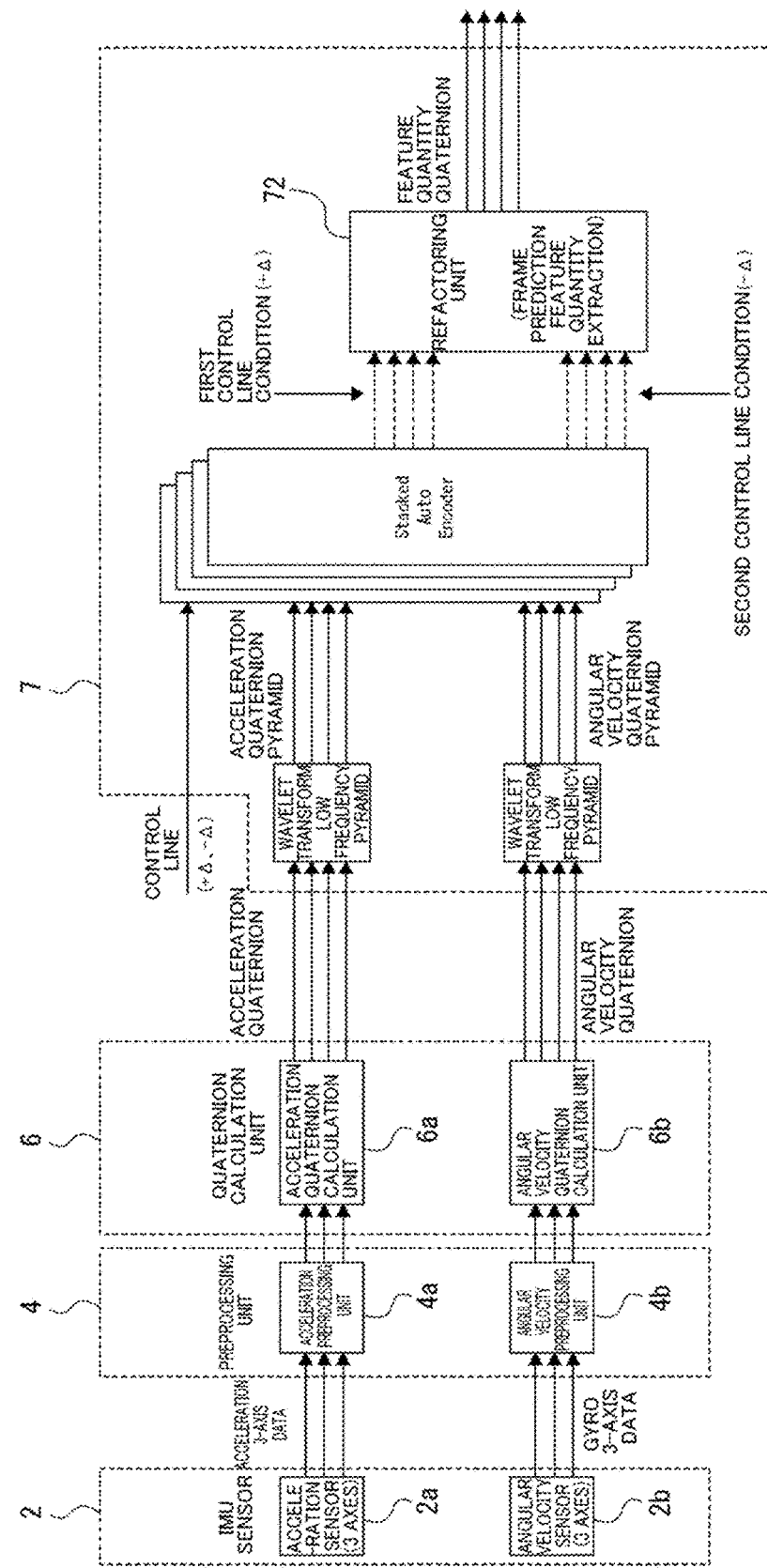
FIG. 26 is an illustrative diagram of a frame prediction feature quantity extraction scheme (environment after mounting).

FIGS. 25 and 26 are illustrative diagrams of a frame prediction feature quantity extraction scheme.

In a learning environment illustrated in FIG. 25, when the learning set is generated, the quaternions of the acceleration and the angular velocity are dumped at each frame and, in association with the control line, an output before one frame when the value of the control line=0.0, a current frame output when the value of the control line=1.0, and an estimated value after one frame when the value of the control line=2.0 are given as a teacher, and the control line associated learning is performed. Accordingly, an algorithm for switching between the aspects of the frame prediction feature quantity to be output, according to the value given to the control line, is generated.

In the environment after mounting on the signal processing device 1, an extracted feature quantity when the control line value=+Δ is given to the feature quantity extraction unit 7, and an extracted feature quantity when the control line value=−Δ is given are input to the refactoring unit 72, as illustrated in FIG. 26. In the refactoring unit 72, a difference between these extracted feature quantities is calculated, and LPF processing or HPF processing is performed as necessary to obtain a feature quantity quaternion as a frame prediction feature quantity. This feature quantity quaternion is input to the viewpoint movement frame prediction correction unit 9g in the signal correction processing unit 9 after being adjusted by the feature quantity adjuster 8.

By performing correction processing based on the frame prediction feature quantity as described above, it is possible to improve the prediction accuracy in buffering control of the stabilization processing unit 13 in a subsequent stage. The prediction is a statistical prediction and does not guarantee a 100% prediction.

FIGS. 29 and 30 are illustrative diagram of the sensor noise feature quantity extraction scheme.

As described above, for the sensor noise (the DC bias noise), a correlation between the acceleration sensor 2a and the angular velocity sensor 2b is subjected to signal waveform analysis and extracted as a sensor noise feature quantity.

In a learning environment illustrated in FIG. 29, random noise (random walk noise) is added to each of acceleration 3-axis data and angular velocity (gyro) 3-axis data preprocessed by the acceleration preprocessing unit 4a and the angular velocity preprocessing unit 4b (see random noise addition 41a and random noise addition 41b in the figure). For the 3-axis data after the random noise has been added, the acceleration quaternion and the angular velocity quaternion calculated by the acceleration quaternion calculation unit 6a and the angular velocity quaternion calculation unit 6b are input to the AI including the SAE. Further, a teacher for this is a blend quaternion obtained by the complementary filter 33 blending the acceleration quaternion and the angular velocity quaternion calculated from the acceleration 3-axis data and the angular velocity 3-axis data before noise addition.

In the environment after mounting on the signal processing device 1 illustrated in FIG. 30, an output of learned AI and the angular velocity quaternion obtained by the angular velocity quaternion calculation unit 6b are input to the refactoring unit 72. In the refactoring unit 72, when a difference therebetween is taken, this becomes the sensor noise feature quantity recognized by AI.

The sensor noise feature quantity obtained by the refactoring unit 72 is input to the sensor noise correction unit 9a in the signal correction processing unit 9 after being adjusted by the feature quantity adjuster 8.

Using correction processing of the sensor noise correction unit 9a, it is possible to intelligently remove noise difficult to remove even with a Kalman filter or temperature-specific correction of the related art, and improve performance of the stabilization processing.

Figure 31:
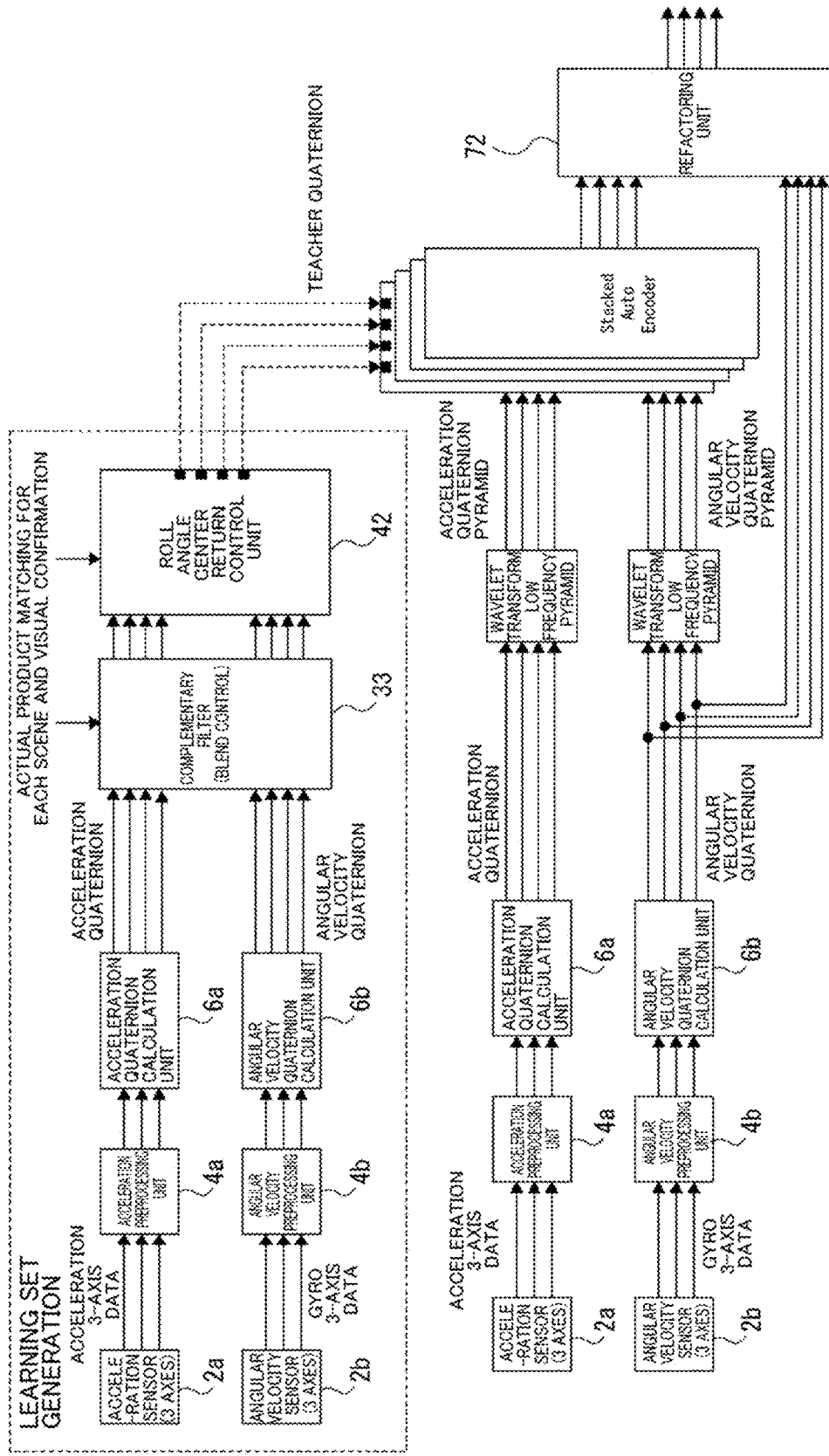
FIG. 31 is an illustrative diagram of a state machine feature quantity extraction scheme (learning environment).
Figure 32:
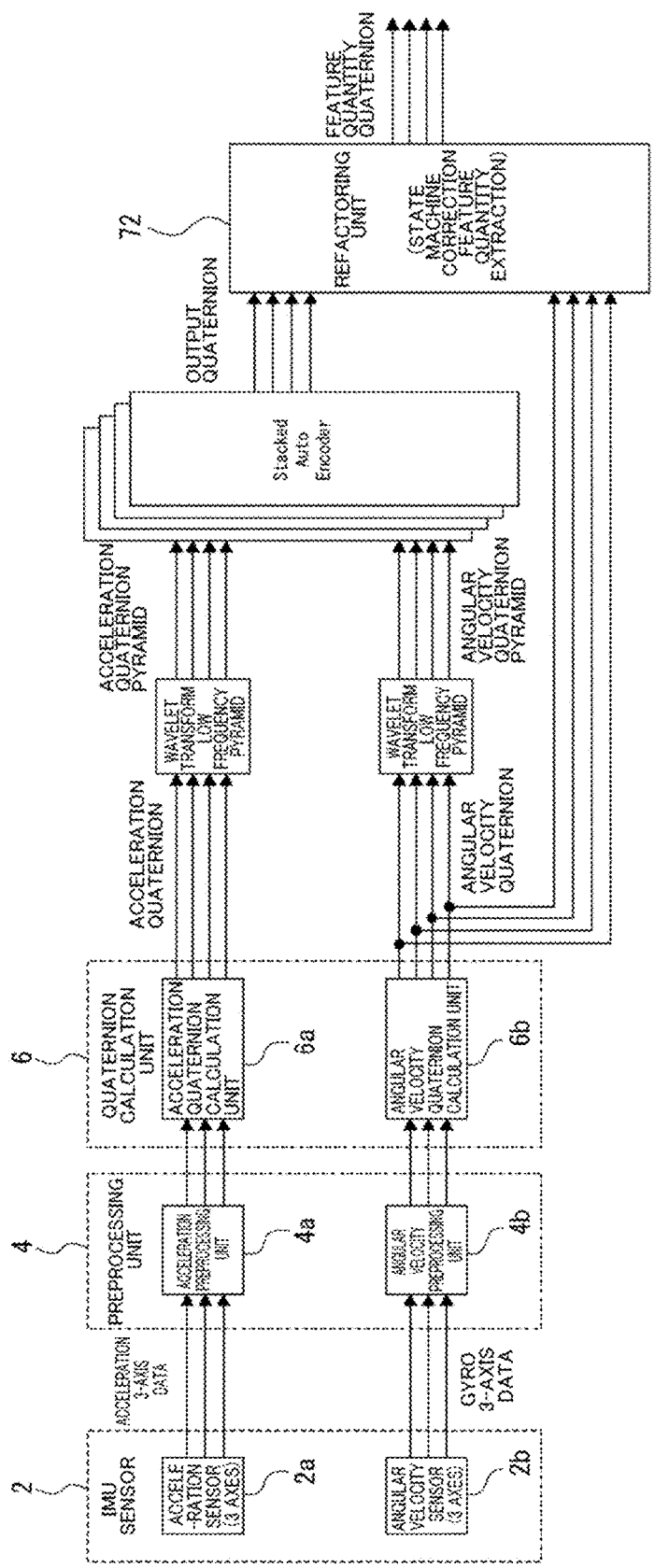
FIG. 32 is an illustrative diagram of a state machine feature quantity extraction scheme (environment after mounting).

FIGS. 31 and 32 are illustrative diagrams of a state machine feature quantity extraction scheme.

As described above, the state machine feature quantity is the feature quantity related to the state machine control. The state machine control is control for stopping the gimbal function when the camera faces directly upward or downward or when horizontal correction cannot be performed such as the time of returning from that state.

In a learning environment illustrated in FIG. 31, an input and output result of attitude control at an adjustment value when actual product matching adjustment in a scene in which the gimbal is established and the gimbal function when the gimbal is not established are turned off are prepared. These learning sets can be controlled well only in a specific scene through actual product matching by sequential processing, and the learning sets are prepared by visual confirmation of a designer. In the learning set, an output value after processing in the complementary filter 33 and a roll angle center return control unit 42 obtained by matching actual products with the acceleration quaternion and the angular velocity quaternion as inputs is used as a teacher.

In the environment after mounting on the signal processing device 1 illustrated in FIG. 32, an output of learned AI and the angular velocity quaternion obtained by the angular velocity quaternion calculation unit 6b are input to the refactoring unit 72. A difference therebetween calculated by the refactoring unit 72 is a state machine feature quantity.

The state machine feature quantity obtained by the refactoring unit 72 is input to the state machine correction unit 9d in the signal correction processing unit 9 after being adjusted by the feature quantity adjuster 8.

As a result of learning a huge number of state scenes by machine learning, AI can understand the scene by itself and make a state transition even when the designer does not mount state machine with detailed sequential processing, and it is possible to obtain good stabilization results without detailed state machine control of the designer for each sport competition in a fierce sports scene.

5. Game Mining

As can be understood from the above description, in the present embodiment, a feature quantity obtained by the feature quantity adjuster 8 blending feature quantities of a plurality of systems extracted by the feature quantity extraction unit 7 according to a required blend ratio is used as the feature quantity to be input to the signal correction processing unit 9. In this case, in order to appropriately extract the feature quantity, it is important to set parameters related to the feature quantity extraction such as the value of the control line given to the control line associated learner 71a and the blend ratio in the feature quantity adjuster 8 to appropriate values. Appropriate parameters can be derived by performing search with reference to a performance evaluation value of signal processing using the extracted feature quantity, such as a performance evaluation value of stabilization processing, but work of searching for such parameters is a kind of factorization problem with combinatorial optimization that cannot be easily automated by machine learning. This uses a very intelligent deep learning network, and eventually, an average value of patterns within the learning set is obtained, and it is especially difficult to solve a proposition in which there are only trade-off answers with a neural network. Further, even when a genetic algorithm scheme or the like is used, brute force search is performed and a huge amount of calculation is required. Ultimately, it is ideal to analyze such a proposition using a quantum computer, but it is difficult to solve this kind of analog problem with the accuracy of qubits these days.

On the other hand, such a parameter search problem is a problem of searching for the best combination among filter characteristics having an analog correlation, the program does not have a higher difficulty than that in a deciphering problem of factorizing a product of two prime numbers as in deciphering and is capable of visualizing and searching for correlated patterns, and approach of distributed processing for converting this problem into a game model in terms of an event, and solving the problem like a puzzle game. A scheme for searching for appropriate parameters using a game model in this way is referred to as "game mining" here.

For example, it is conceivable to adopt a puzzle game or the like as a game. In the game mining here, a combination of parameters related to feature quantity extraction is selected according to a game operation. An evaluation score for a signal processing result in a case in which a parameter by the selected combination has been set is acquired, and a combination of parameters satisfying a predetermined evaluation score condition such as a best combination of parameters is searched for on the basis of the acquired evaluation score.

Such game mining makes it possible to convert abstract potential energy of game players around the world into production energy for parameter search and use the production energy. That is, for example, for parameters related to the feature quantity extraction processing in the signal processing device, such as the value (A) of the control line or the blend ratio in the feature quantity adjuster 8, it becomes possible to realize search for optimal parameters through the approach of the distributed processing via game content.

Although algorithm development has become extremely sophisticated due to advance in deep learning these days, a certain challenge is a proposition for factorization and polynomial generation, and deep learning is not always universal for such a proposition, and for the proposition, an opportunity to work on development cannot be obtained generally unless a person is not an expert in the field. As an example, in an algorithm development proposition that a feature quantity is extracted from analog data and drawn up into a data structure in the sensor field, a huge amount of manpower is required for the work of excavating feature quantity separation conditions described above, but such a proposition is a very large technical area, but unfortunately, the development resources at the development site are overwhelmingly insufficient. On the other hand, work of converting a factorized problem into a game event such as a puzzle problem in terms of an event and searching for a convergence condition such as the game mining in the present example does not specially have an entry barrier requiring specialized knowledge in the field except for the sense of solving puzzles, can be treated as pure gameplay, and can convert potential energy of game players around the world into production energy for algorithm development. That is, it is possible to link a potential of human resources, wasted in the form of gameplay to driving force of development that contributes to the development of science and technology.

In game mining, an elemental technology of an algorithm development layer can be hidden, and there is also an advantage that confidentiality of the technology can be guaranteed.

Figure 33:
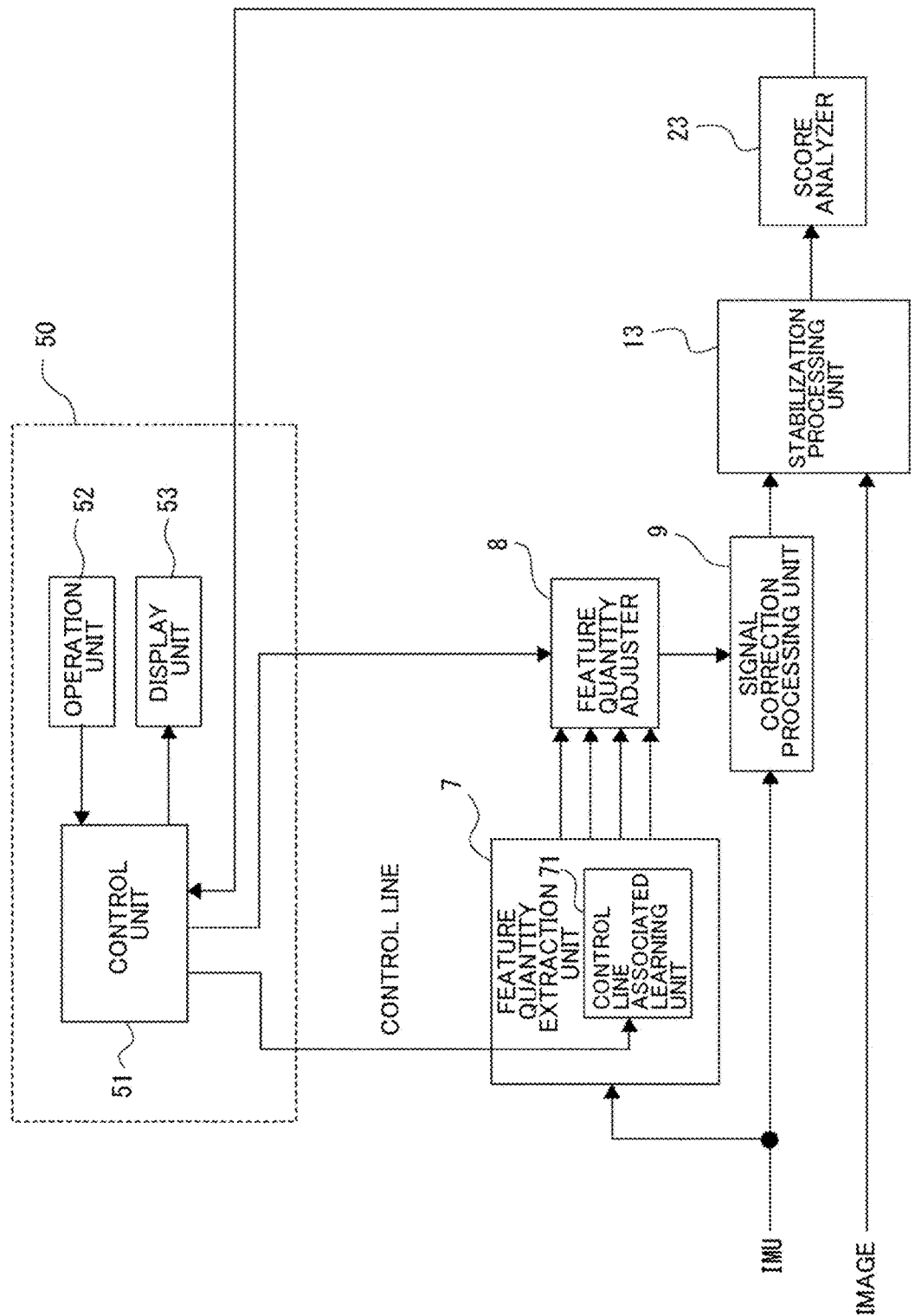
FIG. 33 is a block diagram illustrating a system configuration example used for parameter search by game mining.

FIG. 33 is a block diagram illustrating a system configuration example used for parameter search using game mining.

First, in the present system, a feature quantity extraction unit 7, a feature quantity adjuster 8, a signal correction processing unit 9, and a stabilization processing unit 13 are provided as a configuration imitating the signal processing device 1 illustrated in FIG. 1. Although not illustrated, the phase adjustment unit 11 and the delay amount calculation unit 12 are actually provided as a configuration imitating the signal processing device 1.

Further, in the present system, the score analyzer 23 for evaluating the performance of the stabilization processing is provided.

In the present system, it is assumed that the control line associated learning unit 71 in the feature quantity extraction unit 7 has been subjected to control line associated learning.

Further, in the present system, an information processing device 50 that performs processing for parameter search on the basis of a game operation or the evaluation score from the score analyzer 23 is provided.

As illustrated in the figure, the information processing device 50 includes a control unit 51, an operation unit 52, and a display unit 53. The control unit 51 includes, for example, a microcomputer including a central processing unit (CPU), a read only memory (ROM), a random access memory (RAM), and the like, and executes various types of processing for parameter search.

The operation unit 52 comprehensively represents operators allowing the user to perform various operation inputs, such as various keys, buttons, and touch panels, and the display unit 53 indicates a display device that can display image information, such as a liquid crystal display.

The control unit 51 controls progress of game content such as a puzzle game. Specifically, processing for generation of a game image according to a game operation of the user performed by the operation unit 52, processing for displaying the generated game image on the display unit 53, and the like are performed.

Further, the control unit 51 performs processing for parameter search on the basis of the game operation of the user in the operation unit 52 and the evaluation score calculated by the score analyzer 23.

Figure 34:
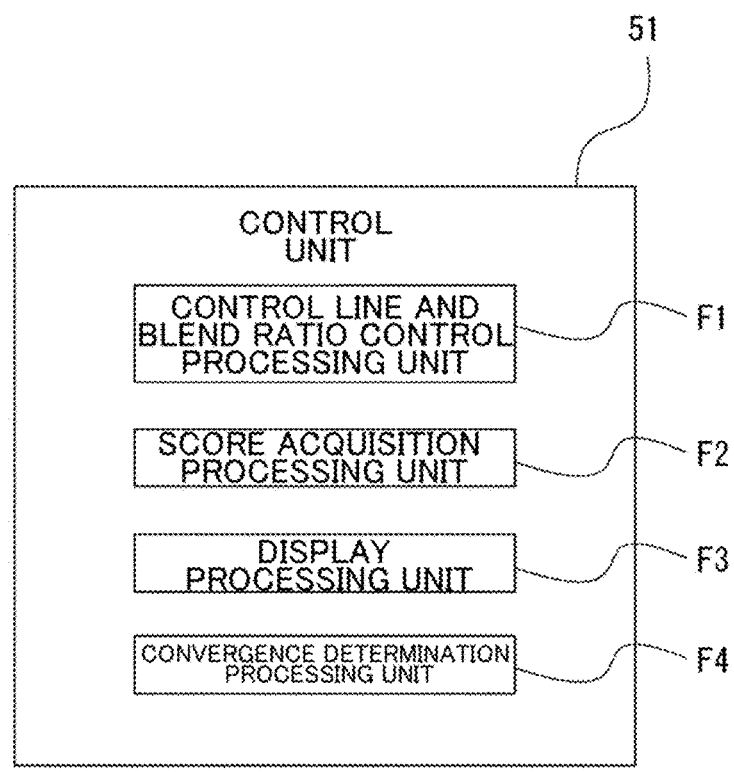
FIG. 34 is a functional block diagram illustrating functions related to game mining included in the information processing device illustrated in FIG. 33 as blocks.

FIG. 34 is a functional block diagram illustrating functions related to game mining included in the control unit 51 as blocks.

As illustrated in the figure, the control unit 51 includes a control line and blend ratio control processing unit F1, a score acquisition processing unit F2, a display processing unit F3, and a convergence determination processing unit F4.

The control line and blend ratio control processing unit F1 selects a combination of the value ($\Delta$ in the present example) of the control line in the control line associated learning unit 71 with the blend ratio in the feature quantity extractor 8 according to the game operation of the user and sets the value of the control line in the selected combination in the control line associated learning unit 71, and the blend ratio in the feature quantity extractor 8.

The control line and blend ratio control processing unit F1 reselects the combination of the value of the control line with the blend ratio each time the game operation, specifically, a puzzle operation in a puzzle game in the present example is performed, and sets the value of the control line in the control line associated learning unit 71 and the blend ratio in the feature quantity extractor 8.

The score acquisition processing unit F2 acquires the evaluation score for the stabilization processing unit 13 performed in a state in which the value of the control line and the blend ratio selected by the control line and blend ratio control processing unit F1 have been set, from the score analyzer 23.

The display processing unit F3 performs processing for displaying information obtained by visualizing the evaluation score acquired by the score acquisition processing unit F2 on a game screen. In the puzzle game of the present example, the puzzle is displayed as a shield of an enemy character, and the information obtained by visualizing the evaluation score is displayed as, for example, a remaining hit points (HP) of the enemy character. The display is performed so that the remaining HP is smaller when the evaluation score is better.

Alternatively, visualization information of the evaluation score can be displayed in such an aspect that a display density (or luminance) of the puzzle is lower when the evaluation score is better (an image in which the shield is thinner when the evaluation score is better).

Various schemes for displaying the visualization information of the evaluation score can be considered, and the present invention is not limited to the above scheme.

Here, in order to help game attack, an evaluation score around a current setting parameter may be calculated and displayed on the game screen. Further, a puzzle model may be generated on the basis of the evaluation score around the current setting parameter.

The convergence determination processing unit F4 performs a convergence determination on the evaluation score acquired by the score acquisition processing unit F2. In the present example, a target value for the evaluation score is set as a parameter search end condition, and a determination is made that the evaluation score has converged when the evaluation score reaches the target value.

The control unit 51 ends the processing for parameter search according to a game operation in response to the convergence determination processing unit F4 determining that the evaluation score has converged. Processing for storing the value of the control line and the blend ratio set at that time as the value of the parameter satisfying the convergence condition is performed.

When the evaluation score converges, this is game attack, and the control unit 51 performs processing for displaying a corresponding image on the display unit 53 at the time of the game attack.

A scheme for determining the convergence of the evaluation score is not limited to the determination as to whether or not the target value has been reached as described above. As the convergence determination for the evaluation score, a determination as to whether or not at least a predetermined evaluation score condition is satisfied may be performed.

Further, although the case in which the search for the value of the control line and the blend ratio is performed as the search for the parameters related to the feature quantity extraction has been illustrated above, the parameters as search targets are not limited thereto and, examples of the parameters can include parameters such as the number of layers in multiple resolution.

6. Stabilization Processing

6-1. Internal Configuration of Stabilization Processing Unit

Next, the stabilization processing as an embodiment will be described.

Figure 35:
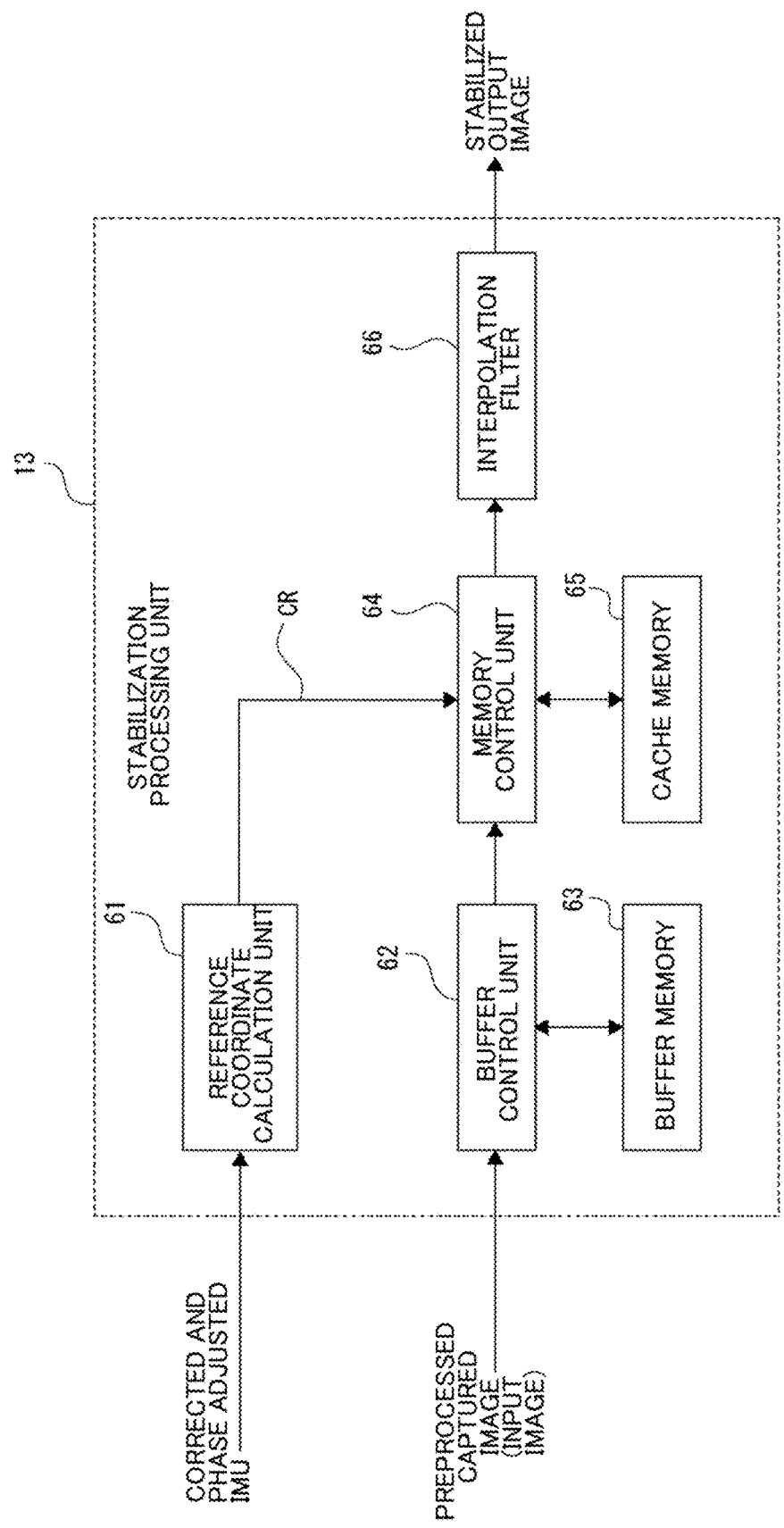
FIG. 35 is a block diagram illustrating an example of an internal configuration of a stabilization processing unit in the embodiment.

FIG. 35 is a block diagram illustrating an example of an internal configuration of the stabilization processing unit 13.

Here, in the following description, a coordinate system of the input image for the stabilization processing unit 13, that is, the captured image preprocessed by the preprocessing unit 5 in the present example is referred to as an "input coordinate system", and a coordinate system of the output image from the stabilization processing unit 13, that is, a stabilized output image is referred to as an "output coordinate system".

Because the stabilization processing unit 13 performs processing for obtaining the stabilized output image by cutting out a part of the input image as electronic image stabilization (EIS), it is assumed that the number of pixels of the input image>the number of pixels of the output image. Specifically, in the present example, it is assumed that the input image is a 4 k image (the number of pixels in a horizontal direction=about 4000, and the number of pixels in a vertical direction=about 2000), and the output image is a 2 k image (the number of pixels in a horizontal direction=about 2000, and the number of pixels in a vertical direction=about 1000).

In FIG. 35, the stabilization processing unit 13 includes a reference coordinate calculation unit 61, a buffer control unit 62, a buffer memory 63, a memory control unit 64, a cache memory 65, and an interpolation filter 66.

The corrected and phase-adjusted IMU quotation is input to the reference coordinate calculation unit 61. That is, the IMU quaternion subjected to the correction in the signal correction processing unit 9 and the phase adjustment in the phase adjustment unit 11 is input.

The reference coordinate calculation unit 61 calculates a reference coordinates CR for each pixel of the output image on the basis of the IMU quaternion input in this way.

The reference coordinates CR are information indicating a value of a position in the input coordinate system that should be used as a value of each pixel position in the output coordinate system when the output image is cut out from the input image. That is, the reference coordinates CR is information indicating a value of a position in the input coordinate system that should be referred to, for each pixel position in the output coordinate system.

The buffer memory 63 is a memory that sequentially buffers input images for one frame, and the buffer control unit 62 controls writing and reading of image data to and from the buffer memory 63.

The cache memory 65 is a memory that is used for cutout of an output image from an input image, and the memory control unit 64 controls writing and reading of the image data to and from the cache memory 65.

The memory control unit 64 acquires the image data corresponding to a cutout range among the image data buffered in the buffer memory 63 through the buffer control unit 62, and writes the image data to the cache memory 65.

Further, the memory control unit 64 reads image data for a plurality of pixels including the pixels of the input coordinate system indicated by the reference coordinates CR and pixels around the pixels (for example, image data for 4×4=16 pixels when the interpolation filter 66 is for Lanczos2 interpolation) for each pixel position of the output coordinate system from image data (image data of the input image) cached in the cache memory 65 as described above, and outputs the image data to the interpolation filter 66.

As described above, the interpolation filter 66 sequentially inputs the image data for the plurality of pixels read for each pixel position in the output coordinate system by the memory control unit 64, and performs interpolation processing using a scheme to be described below, for each pixel position in the output coordinate system to obtain a value of each pixel position in the output coordinate system. Accordingly, the stabilized output image can be obtained.

6-2. Stabilization Processing as an Embodiment

Details of the stabilization processing in the embodiment will be described with reference to FIGS. 36 to 51.

In the stabilization processing, processing for removing an influence of a tilt and motion of a camera from the captured image is performed.

Figure 36:
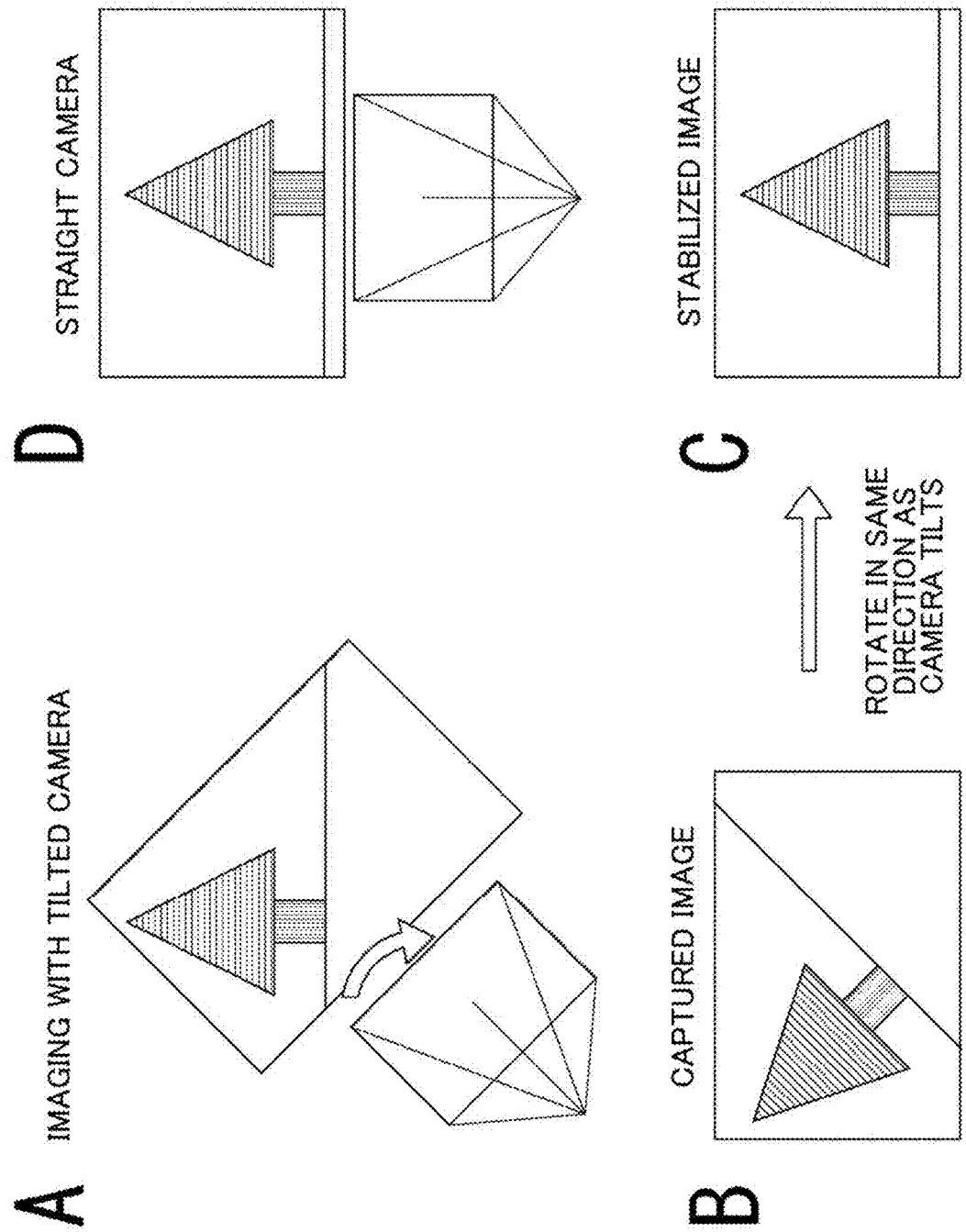
FIG. 36 is a diagram illustrating a state of imaging with a tilted camera.

FIG. 36 illustrates a state of imaging in a tilted camera.

A tilted state here is a state in which the camera is tilted in a roll direction, and horizontal and vertical directions are not maintained. In this case, the image data obtained by imaging is in a state in which a subject is tilted as illustrated in FIG. 36B.

For such image data, it is possible to obtain the image data of FIG. 36C by rotating the image in the same direction as the tilt of the camera using the stabilization processing. The image data in FIG. 36C is the same as an image captured by the camera in a straight attitude (an attitude with no tilt in the roll direction) as illustrated in FIG. 36D.

Rotation with respect to the tilt of the attitude is performed in this way, but this is realized by rotating a cutout pixel range on the basis of the attitude information when an output image having a size smaller than an input image size is cut out from the input image.

Figure 37:
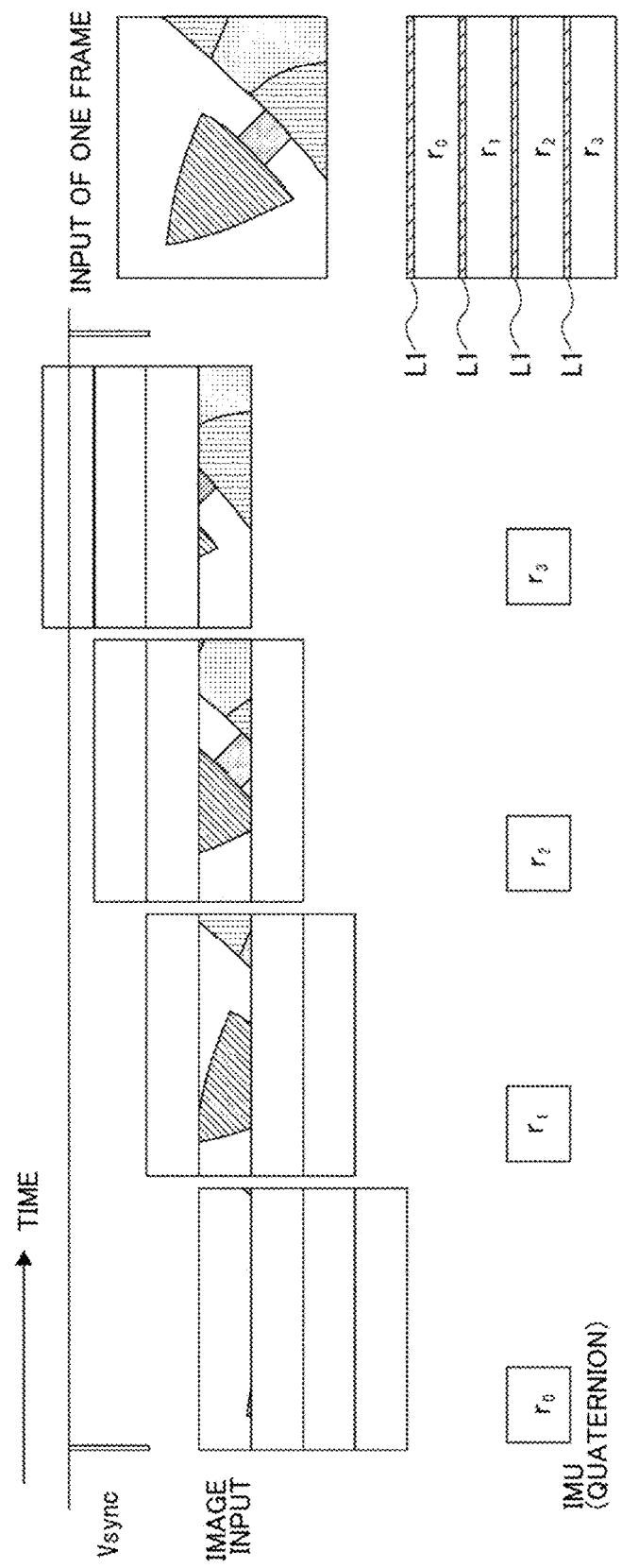
FIG. 37 is a diagram illustrating a relationship between an IMU quaternion and an image input.

FIG. 37 illustrates a relationship between the IMU quaternion and the image input.

When photographing is performed while the camera is being moved, the IMU quaternion will change even during one frame.

When IMU data is acquired every plurality of lines, for example, IMU quaternions (represented by r0, r1, r2, and r3 in the figure) are also acquired every few lines as illustrated in the figure. Here, it is shown that four IMU quaternions are acquired in a period of one frame indicated by a vertical synchronization signal Vsync, but this is merely an example for description. In this case, an IMU quaternion r0 is associated with an upper ¼ image of the frame, an IMU quaternion r1 is associated with a next ¼ image, an IMU quaternion r2 is associated with a next ¼ image, and an IMU quaternion r3 is associated with the last ¼ image.

Here, "virtual line L1" in the figure indicates a virtual line corresponding to an IMU quaternion having the same value.

In the related art, on the premise that IMU data is acquired multiple times within one frame period as described above, a plurality of virtual lines L1 corresponding to the same IMU quaternion value are assumed, the reference coordinates CR are fitted to each pixel position of the output coordinate system according to these virtual lines L1, and the input image is cut out on the basis of the fitted reference coordinates CR so that a stabilized image is obtained.

However, it has been found that sufficient stabilization performance cannot be obtained by the stabilization processing using such a virtual line L1.

Figure 38:
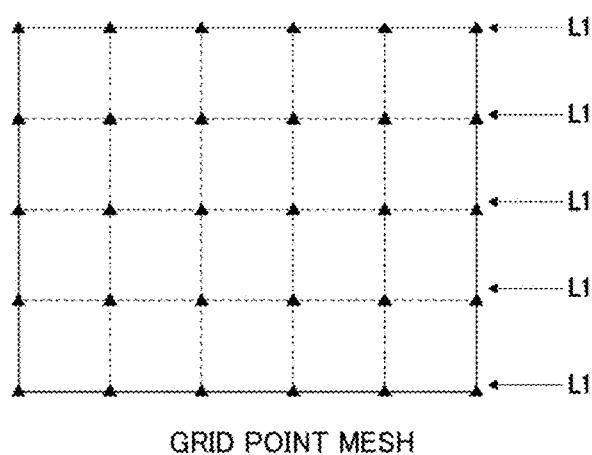
FIG. 38 is a diagram illustrating a grid point mesh.

Therefore, in the present embodiment, a grid point mesh as illustrated in FIG. 38 is used.

The grid point mesh has a plurality of grid points (indicated by a mark ▲ in the figure) arranged in the horizontal direction and the vertical direction.

In the grid point mesh, a plurality of grid point rows consisting of a plurality of grid points arranged in a horizontal direction are arranged in a vertical direction. Alternatively, this can be rephrased as a plurality of grid point sequences each consisting of a plurality of grid points arranged in the vertical direction being arranged in the horizontal direction.

In the grid point mesh, each grid point row corresponds to the virtual line L1 illustrated in FIG. 37, and an IMU quaternion based on the IMU data acquired at a timing corresponding to each row position is associated with each grid point row. In other words, values of the IMU quaternions associated with the respective grid points are the same for each grid point row.

In the figure, an example in which the number of grid points in each grid point row of the grid point mesh is 6, that is, the number of divisions in the horizontal direction is 5, and the number of grid points in each grid point sequence is 5, that is, the number of divisions in the vertical direction is 4 is shown, but the number of divisions of the grid point mesh in the horizontal direction and the vertical direction is not limited to these values.

The position of each grid point of the grid point mesh is managed as a position in the input coordinate system in order to correspond to a timing at which the IMU data is acquired.

The reference coordinate calculation unit 61 converts the position of the grid point in such an input coordinate system to the position in the output coordinate system.

Figure 39:
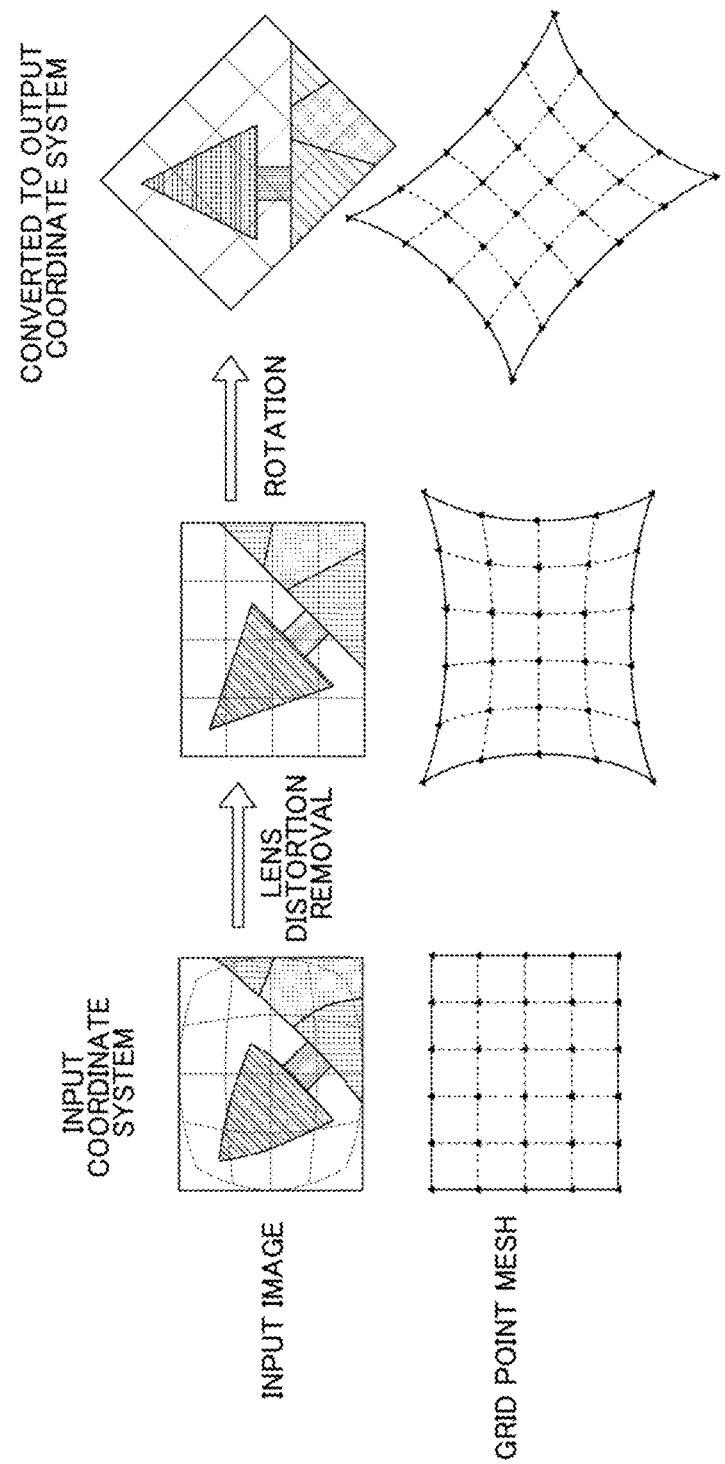
FIG. 39 is an illustrative diagram of coordinate conversion of a grid point mesh.
Figure 40:
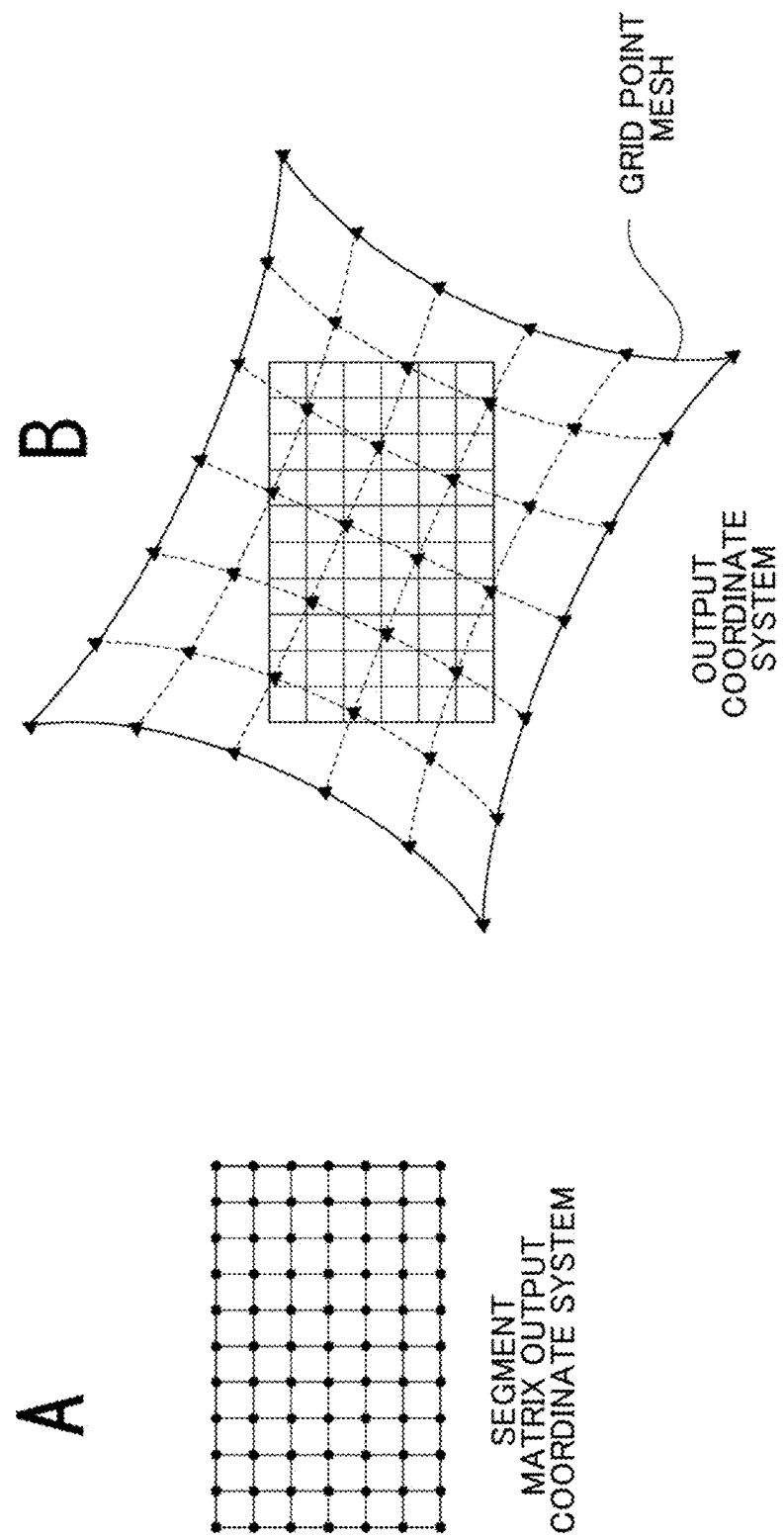
FIG. 40 is a diagram illustrating a relationship between a segment matrix and the grid point mesh.

FIG. 39 is an illustrative diagram of coordinate conversion of the grid point mesh. To convert the position of the grid point to the position of the output coordinate system, the same change as the change received by the input image may be added to the grid point mesh. Specifically, as illustrated in FIG. 39, first, lens distortion removal processing is applied to the grid point mesh in response to the lens distortion removal processing being applied to the input image, and then rotation is performed in the same orientation as that of the camera. This is the conversion to the output coordinate system.

In the stabilization processing of the present example, the grid point mesh converted into the output coordinate system as described above, and a segment matrix as illustrated in FIG. 40A are used.

The segment matrix represents a position (indicated by a mark • in the figure) of each segment when the output image is divided in units of predetermined segments. In the present example, a size of one segment is assumed to be, for example, 64 pixels×64 pixels.

FIG. 40B illustrates the grid point mesh coordinate-converted to the output coordinate system and the segment matrix that are superimposed in the output coordinate system.

A size of the grid point mesh is larger than that of the segment matrix because a size of the input image is larger than that of the output image as described above.

It is possible to specify a positional relationship between a position (mark •) of each segment in the segment matrix and each grid point in the grid point mesh as illustrated in the figure by converting the grid point mesh to the output coordinate system.

The reference coordinate calculation unit 61 obtains the reference coordinates CR for each segment on the basis of a positional relationship between each segment and the grid point in the output coordinate system.

Figure 41:
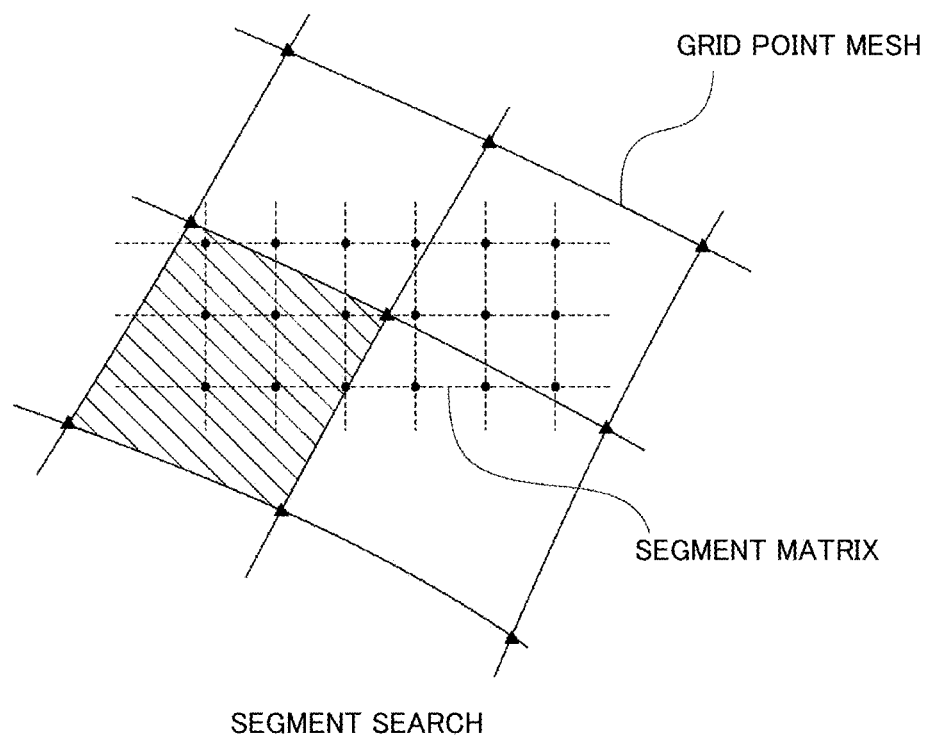
FIG. 41 is an illustrative diagram of segment search in an embodiment.

For this purpose, the reference coordinate calculation unit 61 first performs segment search as illustrated in FIG. 41.

The segment search is processing for ascertaining a square in the grid point mesh in which a segment position indicated by a mark • is located, for each of segments constituting the segment matrix.

Specifically, the reference coordinate calculation unit 61 specifies the included segment position for each square in the grid point mesh through an inside/outside determination. A square in the grid point mesh in which each segment position is located is specified through this inside/outside determination.

The reference coordinates CR at each segment position can be obtained on the basis of the IMU quaternion at each of the four grid points including the segment position. In the following description, it is assumed that information on the reference information CR calculated from the corresponding IMU quaternion is associated with each grid point in the grid point mesh. Hereinafter, the reference coordinates CR associated with each grid point in this way is referred to as "grid point reference coordinates".

Figure 42:
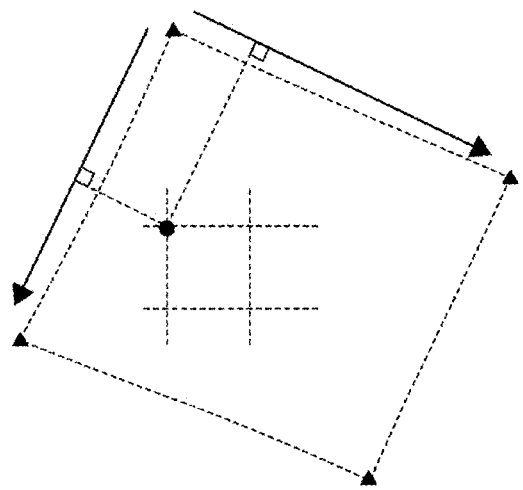
FIG. 42 is an illustrative diagram of trigonometric interpolation for obtaining reference coordinates at each segment position.

The reference coordinate calculation unit 61 specifies a square in the grid point mesh in which each segment position is located through the inside/outside determination (segment search), and then calculates the reference coordinates CR for each segment position through trigonometric interpolation as illustrated in FIG. 42.

Specifically, in this trigonometric interpolation, coordinates of the segment position, coordinates of three grid points among the four grid points of the square including the segment position in the grid point mesh, and information on the grid point reference coordinates associated with the grid points are used.

This trigonometric interpolation, for example, may be performed in a manner as illustrated in FIG. 43.

Figure 44:
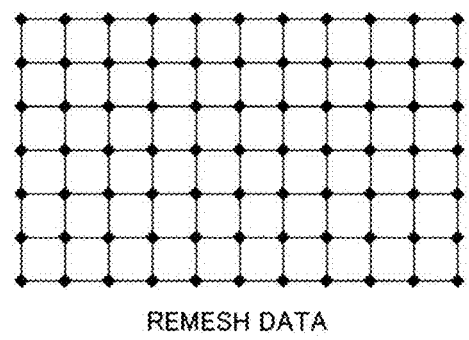
FIG. 44 is an illustrative diagram of remesh data.

Remesh data as illustrated in FIG. 44 can be obtained by obtaining the reference coordinates CR of each segment position through trigonometric interpolation. This remesh data is data indicating the reference coordinates CR of each position in a segment particle size in the output coordinate system. In the figure, the reference coordinates CR of each position at the segment particle size, that is, the reference coordinates CR calculated for each segment position are indicated by a mark ♦.

The reference coordinate calculation unit 61 obtains the reference coordinates CR for each pixel position in the output image on the basis of the remesh data as described above.

Figure 45:
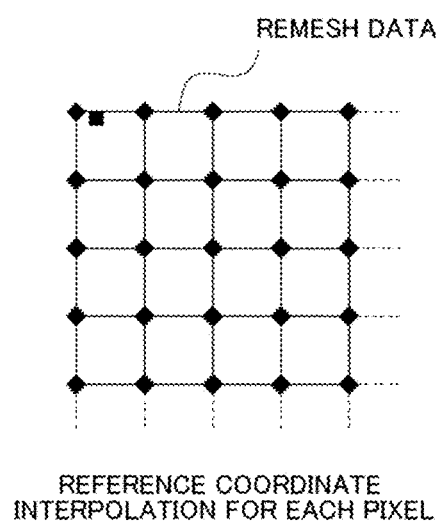
FIG. 45 is an image diagram of obtaining reference coordinates on the pixel position basis from the remesh data.

FIG. 45 is an image diagram illustrating obtaining the reference coordinates CR on the pixel position basis from the remesh data, and in the figure, the reference coordinates CR on the pixel position basis is represented by a mark ■.

In the present example, the reference coordinates CR are obtained by linear interpolation (bilinear interpolation) using the remesh data (reference coordinates CR at the segment particle size). Specifically, the reference coordinates CR are obtained by bilinear interpolation using the reference coordinates CR of each point at each of four corners of the segment including a pixel position that is a target.

In this case, the reason why the above-described trigonometric interpolation is not used is that bilinear interpolation is lighter than the trigonometric interpolation, and for data once converted into the remesh data, sufficient accuracy can be obtained even with bilinear interpolation. However, when trigonometric interpolation is implemented as a circuit as a hardware block in an LSI, it is more advantageous from the viewpoint of circuit scale to divert this block to trigonometric interpolation for all pixels than to separately provide a bilinear interpolation circuit.

It is possible to specify a value of a position in the input coordinate system to be referred to for each pixel position by obtaining the reference coordinates CR for each pixel position of the output image. However, because the reference coordinates CR is calculated by the interpolation processing based on the remesh data as described above, the coordinates may be a value including a decimal number instead of an integer unit (that is, a pixel unit in the input image). Therefore, the interpolation filter 66 illustrated in FIG. 35 is used for rendering of the output image based on the reference coordinates CR.

Figure 46:
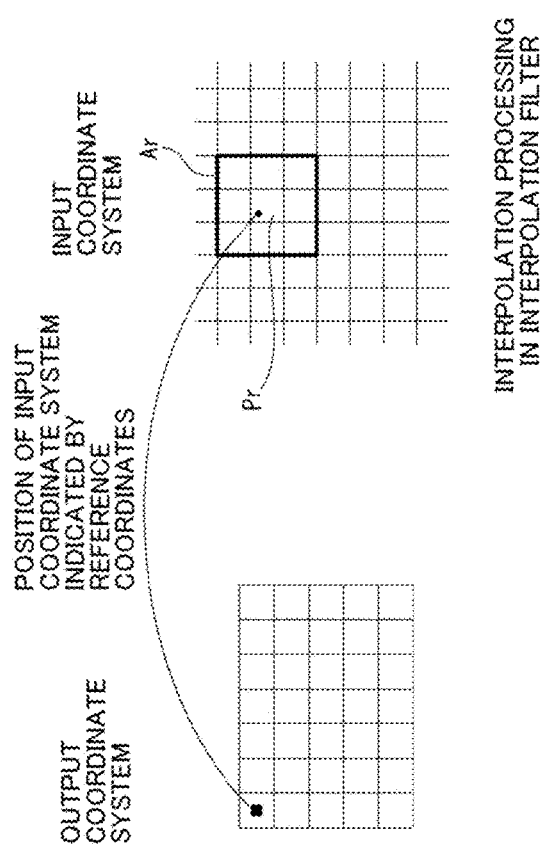
FIG. 46 is an illustrative diagram of interpolation processing in an interpolation filter.

FIG. 46 is an illustrative diagram of the interpolation processing in the interpolation filter 66.

Pixel values of a plurality of pixels required for rendering of each output pixel from input images (pixel values) cached in the cache memory 65 are sequentially input to the interpolation filter 66 under the control of the memory control unit 64. Specifically, the pixel values of a plurality of pixels required for rendering for each output pixel include data of an area consisting of a plurality of pixels including a pixel including the position of the input coordinate system indicated by the reference coordinates CR for the output pixel and pixels around the pixel (see an area Ar surrounded by a thick frame in the figure).

Hereinafter, for description, the pixel including the position of the input coordinate system indicated by the reference coordinates CR is referred to as a "reference pixel Pr". Further, the pixel area required for rendering, including the reference pixel Pr and pixels around the reference pixel Pr is referred to as a "reference area Ar". The reference area Ar is an area of m pixels×m pixels (m is a natural number equal to or larger than 3) centered on the reference pixel Pr. In the figure, the reference area Ar is assumed to be an area of 3 pixels×3 pixels=9 pixels centered on the reference pixel Pr, but this is an example for description, and a size of the reference area Ar is not limited.

The interpolation filter 66 obtains the value of the position indicated by the reference coordinates CR of the output pixel, which is a processing target, through the interpolation processing using a value of each pixel in the reference area Ar. For this interpolation processing, for example, a Lanczos filter is used. Specifically, it is conceivable to use a Lanczos2 filter, or a hybrid filter blended with a Gaussian filter from the viewpoint of preventing aliasing. This hybrid filter is effective for, for example, Lanczos2 interpolation in a RAW format in which an image format is arranged in RGGB, and is particularly used for prevention of aliasing in a high frequency band.

The interpolation filter 66 sequentially performs such interpolation processing for each output pixel. Accordingly, the stabilized output image can be obtained.

In rendering of the stabilized output image, it is possible to perform luminance adjustment for lens shading together with the calculation of the pixel value through the interpolation processing of the interpolation filter 66 as described above. In this case, the grid points are caused to have luminance control information or the like in addition to the reference coordinates CR, and gain adjustment is performed together with the interpolation processing. Similarly, the grid points are caused to have local motion information obtained from an SLAM technology for self-position estimation, depth information from a depth sensor such as a ToF sensor that obtains a depth of an image, or the like, thereby making use for coordinate correction with a high degree of freedom on a grid point basis, depth correction, or the like possible.

Figure 47:
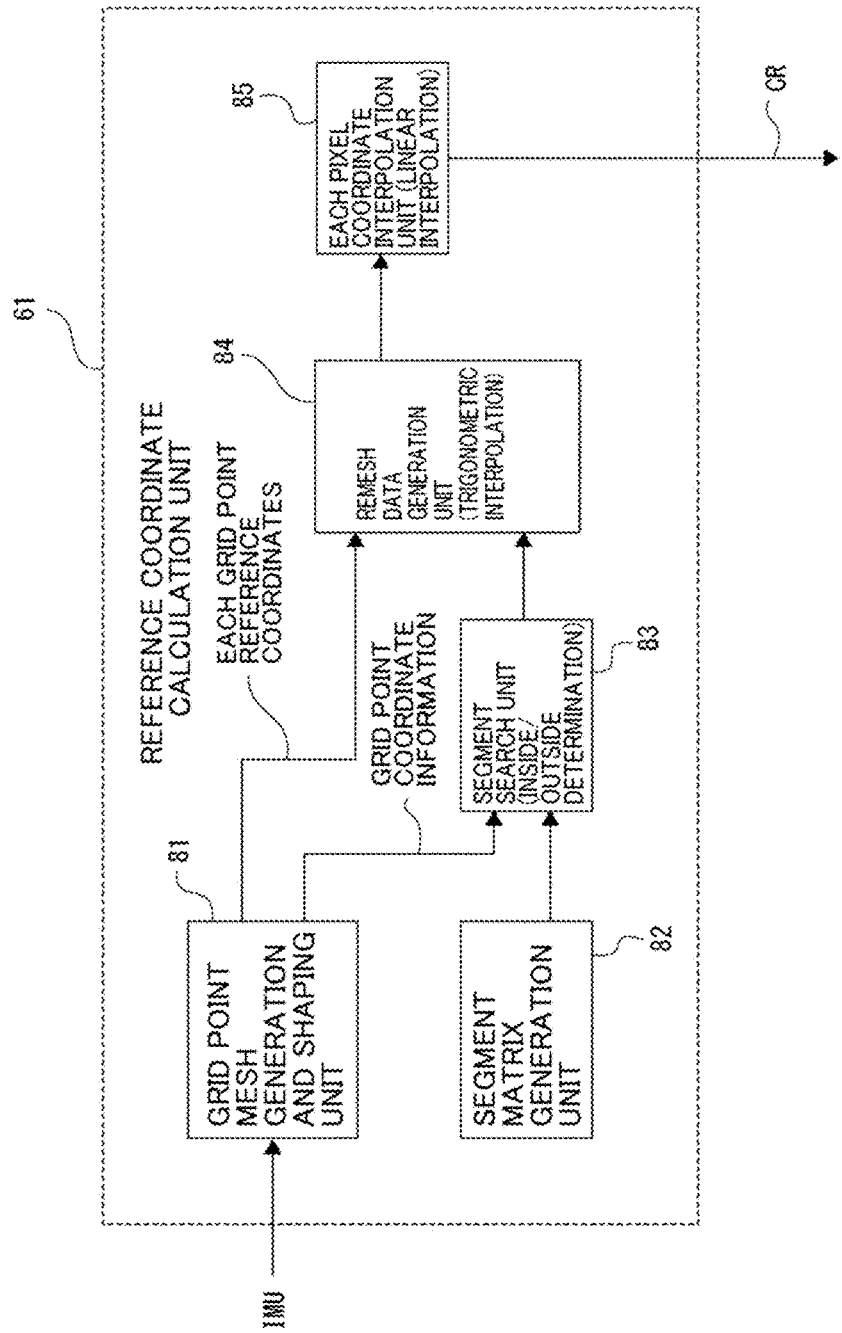
FIG. 47 is a block diagram illustrating an example of an internal configuration of a reference coordinate calculation unit.

FIG. 47 is a block diagram illustrating an example of an internal configuration of the reference coordinate calculation unit 61 illustrated in FIG. 35.

As illustrated in the figure, the reference coordinate calculation unit 61 includes a grid point mesh generation and shaping unit 81, a segment matrix generation unit 82, a segment search unit 83, a remesh data generation unit 84, and each pixel coordinate interpolation unit 85.

The grid point mesh generation and shaping unit 81 performs processing for forming the grid point mesh, such as generation of the grid point mesh and rotation for conversion to the output coordinate system described above (see FIG. 39).

Figure 48:
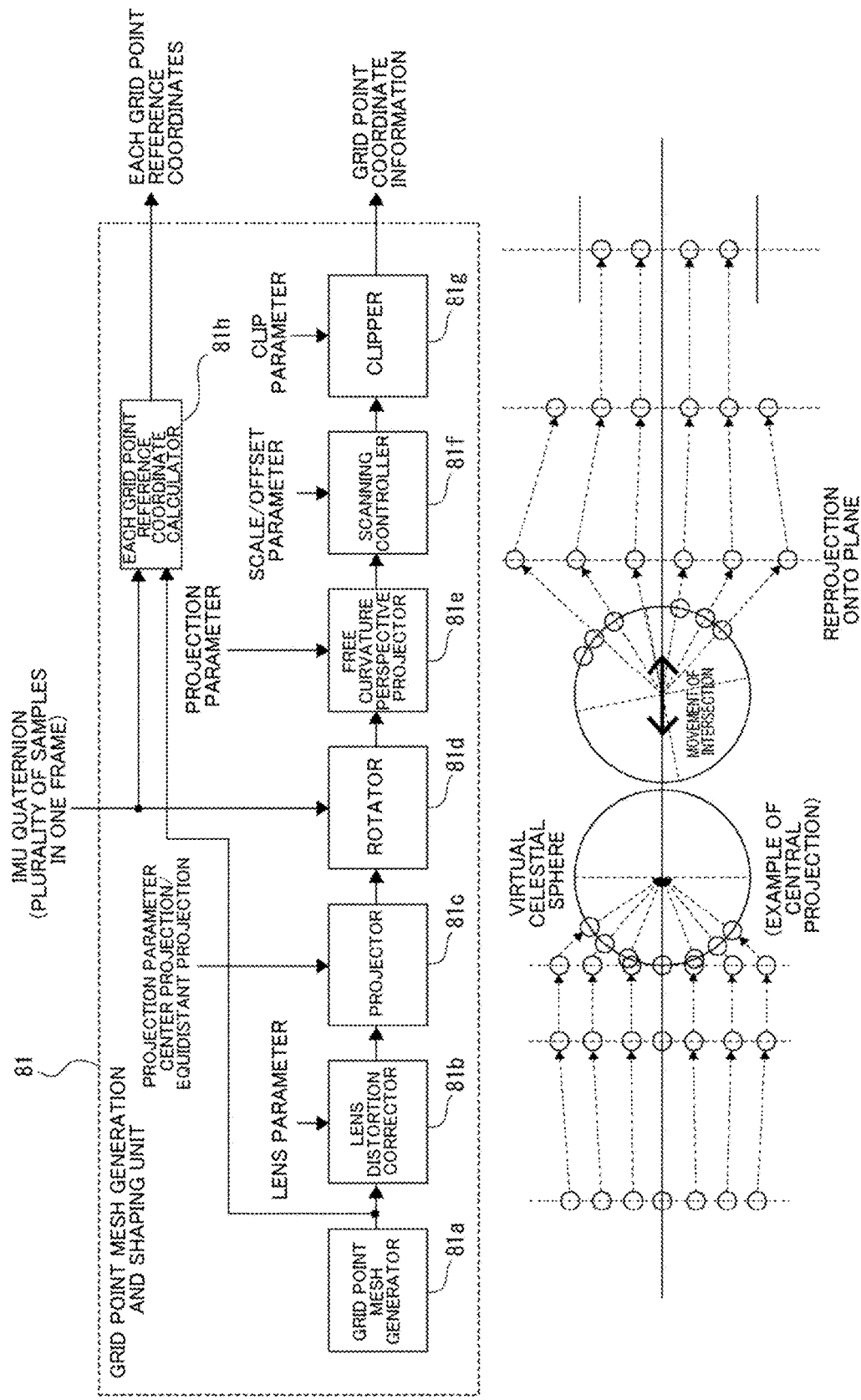
FIG. 48 is a diagram illustrating an example of an internal configuration of a grid point mesh generation and shaping unit.
Figure 49:
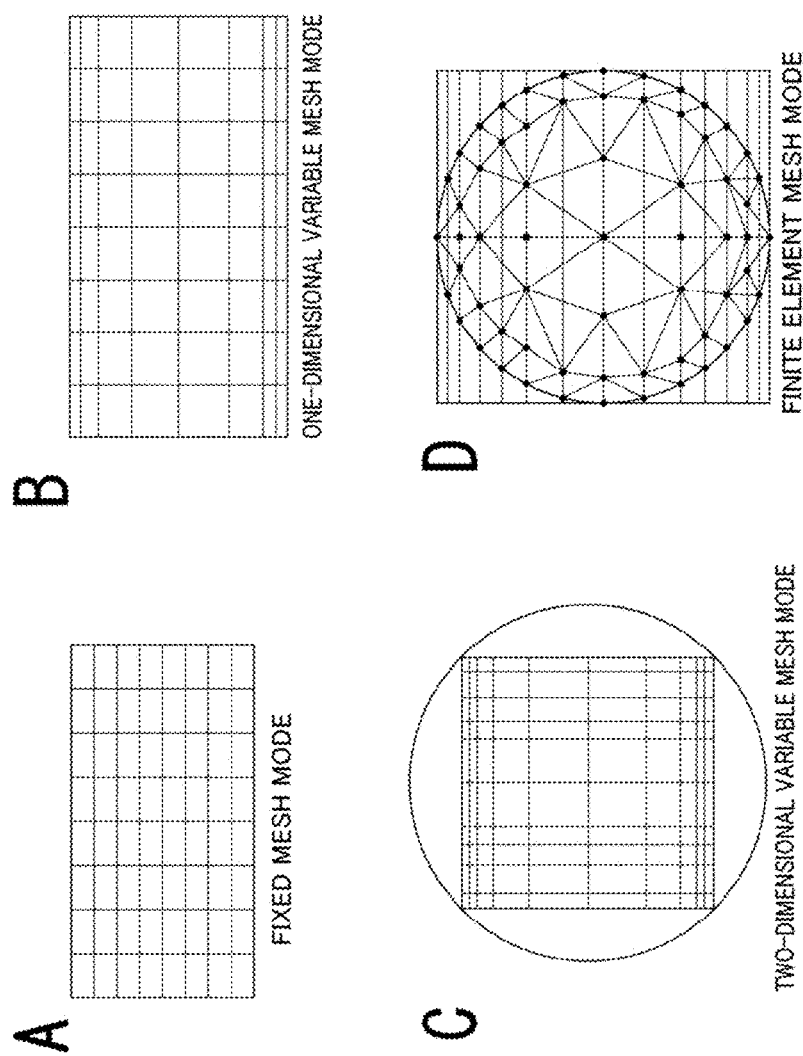
FIG. 49 is an illustrative diagram of a modification example of a grid point mesh.

FIG. 48 is a diagram illustrating an example of an internal configuration of the grid point mesh generation and shaping unit 81. In FIG. 48, an image diagram schematically illustrating a process in which the grid point mesh is formed is also shown together with an internal configuration example of the grid point mesh generation and shaping unit 81.

As illustrated in the figure, the grid point mesh generation and shaping unit 81 includes a grid point mesh generator 81a, a lens distortion corrector 81b, a projector 81c, a rotator 81*d*, a free curvature perspective projector 81*e*, a scanning controller 81*f*, and a clipper 81*g*, and each grid point reference coordinate calculator 81*h*.

The grid point mesh generation and shaping unit 81 generates a grid point mesh. The lens distortion corrector 81*b* performs lens distortion correction processing on the grid point mesh on the basis of the lens parameters.

The projector 81*c* projects the grid point mesh after the lens distortion correction processing in the lens distortion corrector 81*b* onto a virtual celestial sphere. As a projection scheme, it is possible to adopt, for example, central projection, equidistant projection, or the like (the image diagram in the figure illustrates an example of the central projection).

The rotator 81*d* rotates the grid point mesh projected onto the virtual celestial sphere by the projector 81*c*, on the basis of the IMU quaternion. By this rotation, an action of rotating the grid point mesh in the same direction as the camera as described above can be obtained. Information indicating an amount of rotation in the IMU quaternion is used for the rotation.

The free curvature perspective projector 81*e* projects (reprojects) the grid point mesh rotated by the rotator 81*d* onto a plane through free curvature perspective projection on the basis of a projection parameter. By adopting the free curvature perspective projection, it is possible to give a desired lens effect to the reprojected grid point mesh, and to create a picture of the output image.

The scanning controller 81*f* performs affine transformation processing for setting an appropriate scale or changing an offset of the grid point mesh projected onto the plane. The scanning controller 81*f* performs the scale setting and the offset change on the basis of, for example, a predetermined parameter as a predetermined scale/offset parameter.

The clipper 81*g* performs clip processing for preventing data from exceeding fixed decimal point accuracy on the grid point mesh after the processing in the scanning controller 81*f*. When the grid point exceeds a fixed decimal point data area, all segments belonging to the grid points are regarded as invalid segments, and exception processing for black image output is performed in a subsequent stage.

The coordinates of each grid point in the output coordinate system are determined by the clip processing in this clipper 81*g*.

Each grid point reference coordinate calculator 81*h* calculates the reference coordinates of each grid point (the above-described grid point reference coordinates) in the grid point mesh on the basis of the IMU quaternion.

The description is returned to FIG. 47.

As described above, coordinate information in the output coordinate system of each grid point determined by the clip processing of the clipper 81*g* is supplied from the grid point mesh generation and shaping unit 81 to the segment search unit 83 as grid point coordinate information.

Further, each grid point reference coordinate obtained by each grid point reference coordinate calculator 81*h* is supplied from the grid point mesh generation and shaping unit 81 to the remesh data generation unit 84.

The segment search unit 83 performs the segment search (the inside/outside determination: see FIGS. 40 and 41) described above on the basis of the segment matrix generated by the segment matrix generation unit 82 and the grid point coordinate information supplied from the grid point mesh generation and shaping unit 81. Accordingly, for each segment position in the segment matrix, four grid points including the segment position are specified.

The remesh data generation unit 84 performs the trigonometric interpolation (see FIGS. 42 and 43) described above on each segment position on the basis of information on each grid point reference coordinate supplied from the grid point mesh generation and shaping unit 81 and information on a segment search result of the segment search unit 83, to generate remesh data (see FIG. 44). As described above, the remesh data can be rephrased as the reference coordinates CR at the segment particle size.

The remesh data generation unit 84 outputs the generated remesh data to each pixel coordinate interpolation unit 85.

Each pixel coordinate interpolation unit 85 obtains the reference coordinates CR for each pixel position of the output image on the basis of the remesh data. As described above, the reference coordinates CR of each pixel position is obtained by performing bilinear interpolation based on the remesh data.

Each pixel coordinate interpolation unit 85 outputs the reference coordinates CR of each pixel position to the memory control unit 64 illustrated in FIG. 35.

The memory control unit 64 illustrated in FIG. 35 performs control of writing of data from the buffer memory 63 to the cache memory 65 on the basis of the reference coordinates CR.

Further, the memory control unit 64 sequentially reads data of the reference area Ar (see FIG. 46) corresponding to each pixel position of the output image from the cache memory 65 on the basis of the reference coordinates CR, and outputs the data to the interpolation filter 66.

Accordingly, the interpolation filter 66 sequentially performs the interpolation processing using the data of the reference area Ar for each pixel position of the output image to obtain the stabilized output image.

As described above, in the stabilization processing of the present embodiment, when the reference coordinates CR for each pixel position of the output image are obtained, matching with the output coordinate system is taken by using two-dimensional information as the grid point mesh instead of taking matching with the output coordinate system only with one-dimensional information as the virtual line L1 as in the related art.

This makes it possible to improve accuracy of the reference coordinates CR, and to improve performance of the stabilization processing.

Although an example in which the grid point mesh according to a fixed mesh mode as illustrated in FIG. 49A is generated as the grid point mesh has been described above, it is also possible to adopt modes other than the fixed mesh mode, such as a one-dimensional variable mesh mode, a two-dimensional variable mesh mode, and a finite element mesh mode, for example, as illustrated in FIGS. 49B to 49D for generation of the grid point mesh.

7. Structure Example

A specific structure example of the signal processing device 1 will be described with reference to FIGS. 50 to 52.

Figure 50:
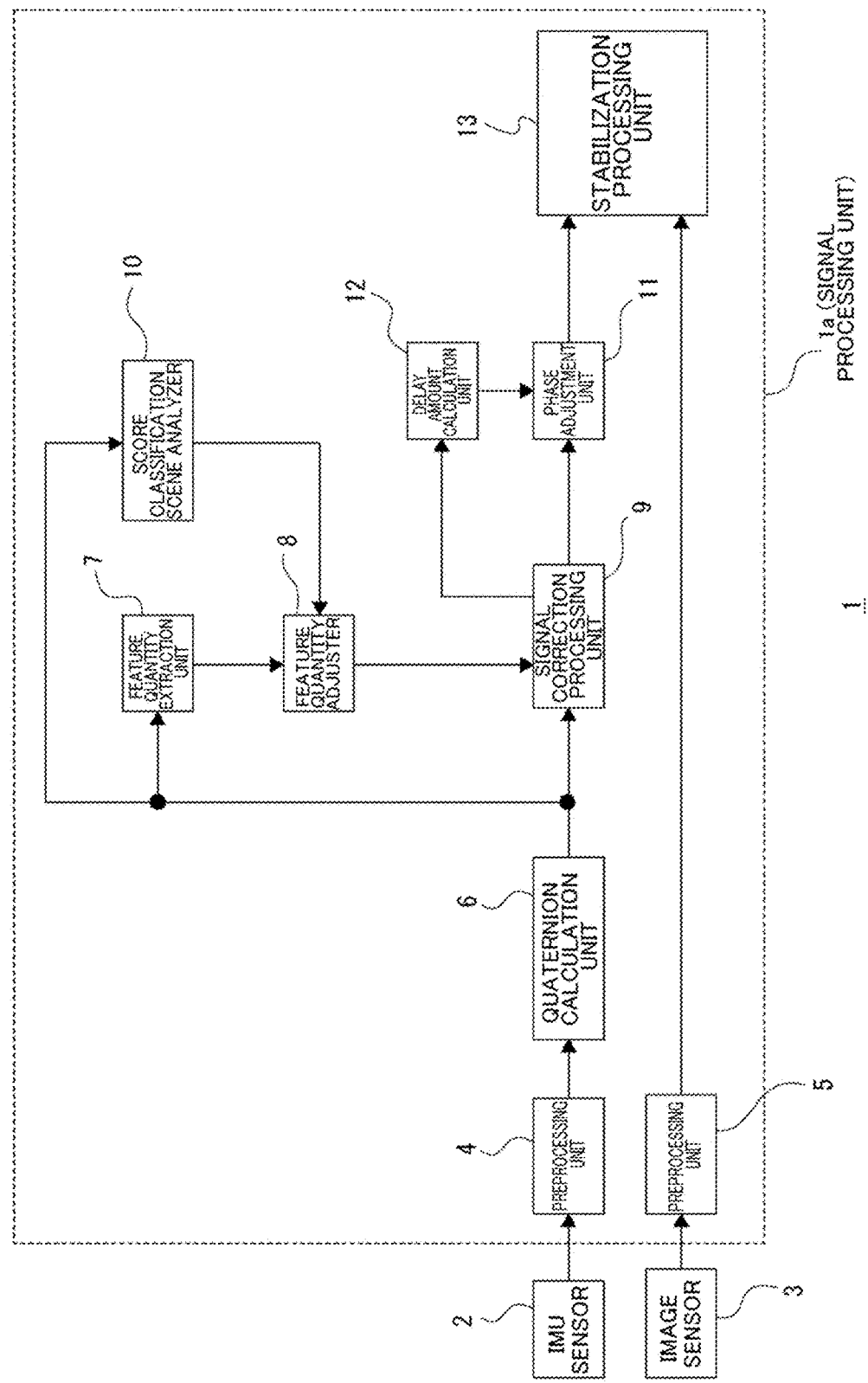
FIG. 50 is a diagram illustrating classification of a "signal processing unit" in a signal processing device.

As illustrated in FIG. 50, in the signal processing device 1, a portion other than the IMU sensor 2 and the image sensor 3, that is, a portion from the preprocessing unit 4 to the stabilization processing unit 13 is a portion that performs signal processing on the sensor signal, which can be called a signal processing unit 1*a*.

The signal processing unit 1*a* can be configured of a chip (another integrated circuit chip) different from the image sensor 3. When the image sensor 3 and the signal processing unit 1*a* are configured as different chips in this way, it is possible to adopt a configuration in which the image sensor 3 and the signal processing unit 1a are mounted in one semiconductor package, as schematically illustrated in FIG. 51.

Figure 52:
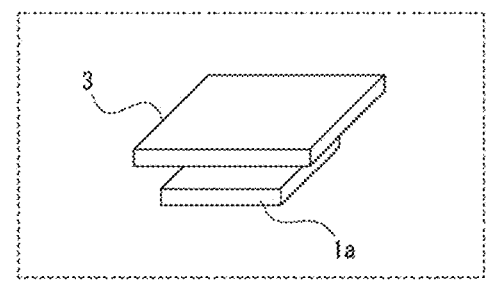
FIG. 52 is a diagram illustrating another structure example of the signal processing device.

Further, when a configuration in which the image sensor 3 and the signal processing unit 1a are mounted in one semiconductor package in this way is adopted, it is possible to adopt a configuration in which the image sensor 3 is laminated on the signal processing unit 1a as illustrated in FIG. 52.

8. Other Peripheral Technologies

Figure 53:
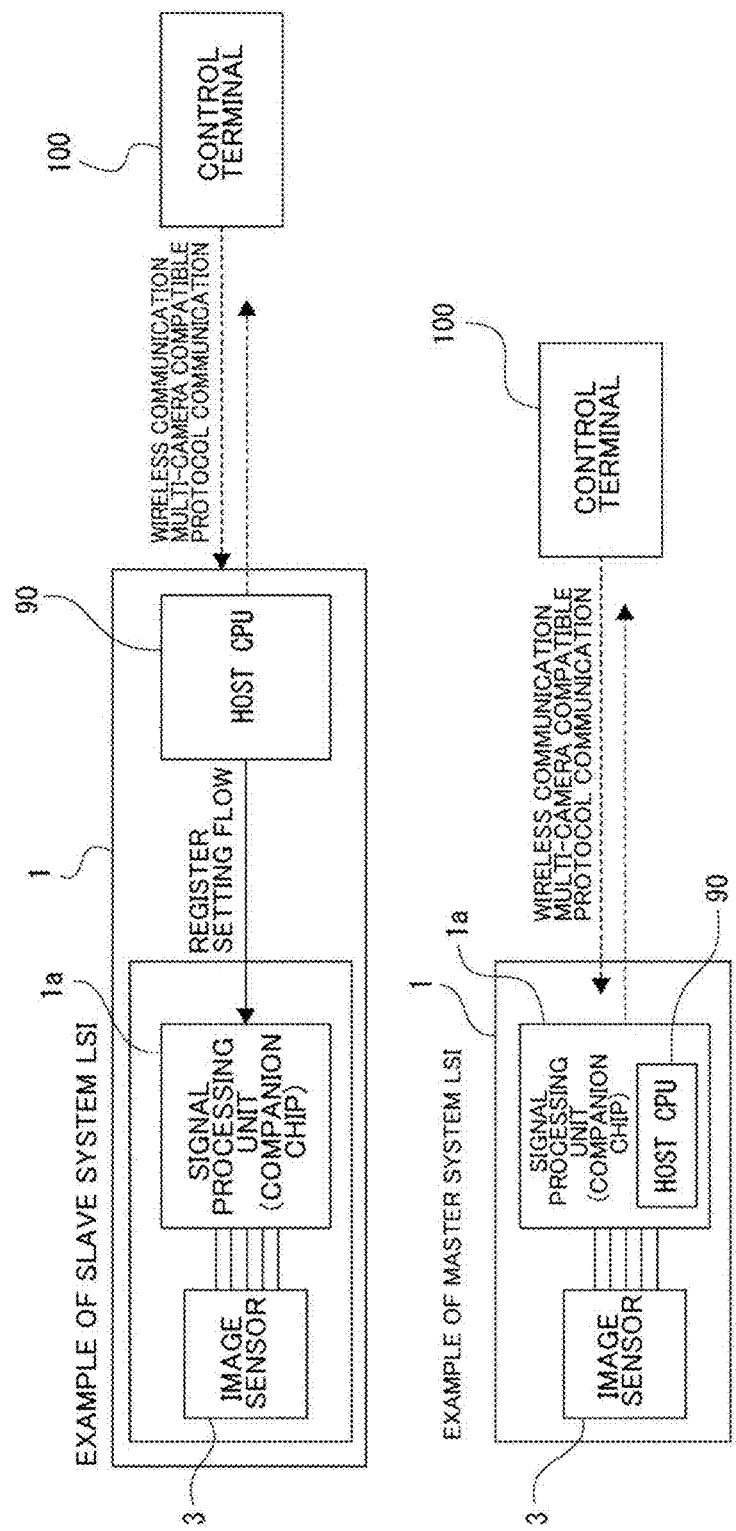
FIG. 53 is a diagram illustrating an example of protocol communication of a camera system to which the signal processing device of the embodiment is applied.

An example of protocol communication of a camera system to which the signal processing device 1 is applied will be described with reference to FIG. 53.

A large scale integrated circuit (LSI) for sensor control in the related art only flows a set value into a register, a protocol specification is a slave system, and a scheme for flowing a register set value from a host CPU 90 is adopted, but in a wearable camera system with a stabilization function, there is a problem with a set configuration in which the host CPU 90 is externally attached from the viewpoint of it being necessary to incorporate complicated host processing such as state machine or sequence control inside, space saving, and low power consumption (see the upper part in the figure). Therefore, a configuration in which the host CPU 90 capable of master processing is built in the signal processing unit 1a, and protocol communication with an external control terminal 100 is performed as illustrated in a lower part of the figure is adopted.

Figure 54:
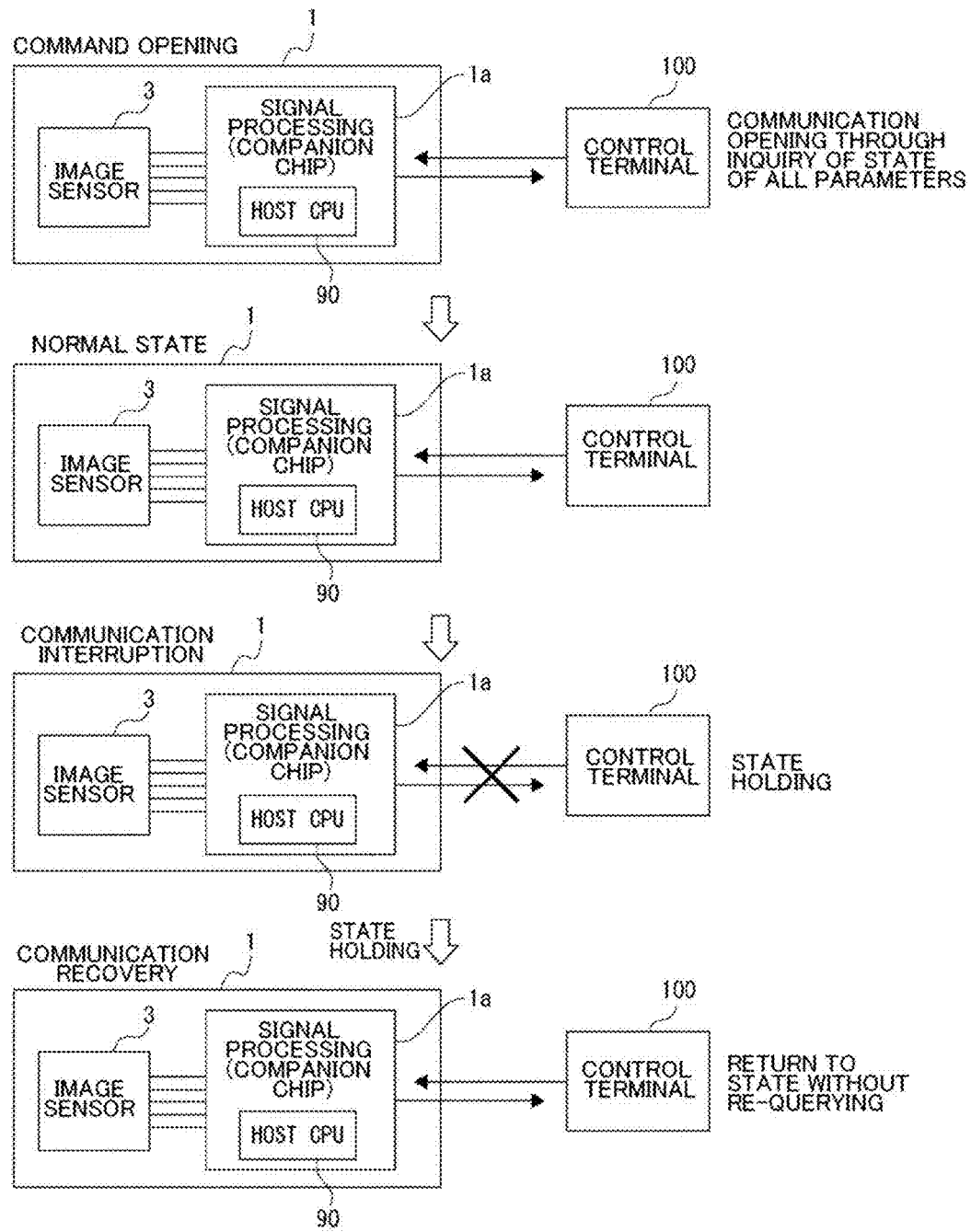
FIG. 54 is a diagram illustrating an example of communication recovery in a case in which communication interruption occurs in protocol communication.
Figure 55:
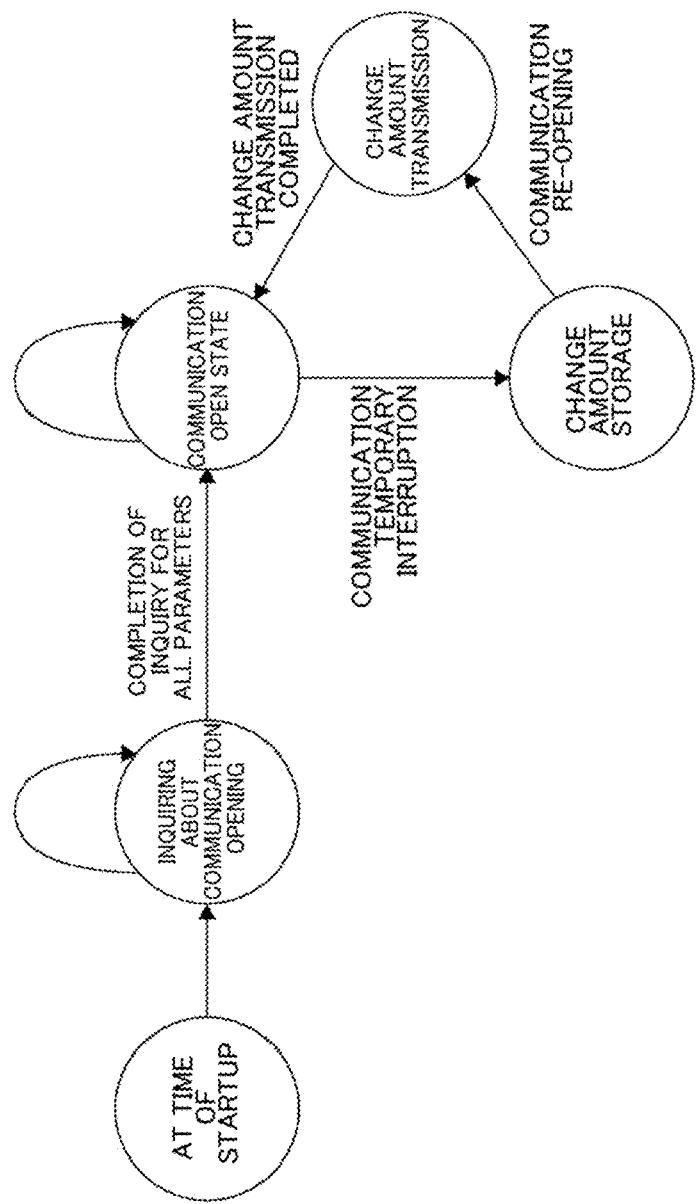
FIG. 55 is also a diagram illustrating an example of communication recovery in a case in which communication interruption occurs in protocol communication.

FIGS. 54 and 55 are diagrams illustrating an example of communication recovery in a case in which communication interruption occurs in protocol communication. In wearable cameras, wireless video transmission is assumed, and a possibility of frequent communication interruptions increases. In particular, in recent 5G transmission, because a communication band is very wide, but directivity is high, and communication strongly tends to be interrupted outside a scope of communication due to a violent motion such as sports, for example, state control capable of high-speed recovery against communication interruption is required in a case in which communication is interrupted, with respect to a broadcasting system of the related art.

First, when normal communication is opened from an initial state, all items of a set state are inquired from the control terminal 100 to the camera side (signal processing device 1 side), and when status notification is completed, a normal communication open state is entered. In protocol communication of the related art, because parameter update content until re-opening is undefined when a command is interrupted momentarily, a connection sequence from an initial state is repeated again to perform command opening for normal return. Because a wearable camera is accompanied by frequent momentary interruption, a heavy load is applied to repeat the connection sequence for each momentary interruption. Therefore, an update history immediately after communication interruption with the signal processing device 1 side and the control terminal 100 side occurs is stored, and only an updated item is communicated when the communication is resumed so that a communication state is restored at high speed and a connection is restored at high speed.

Figure 56:
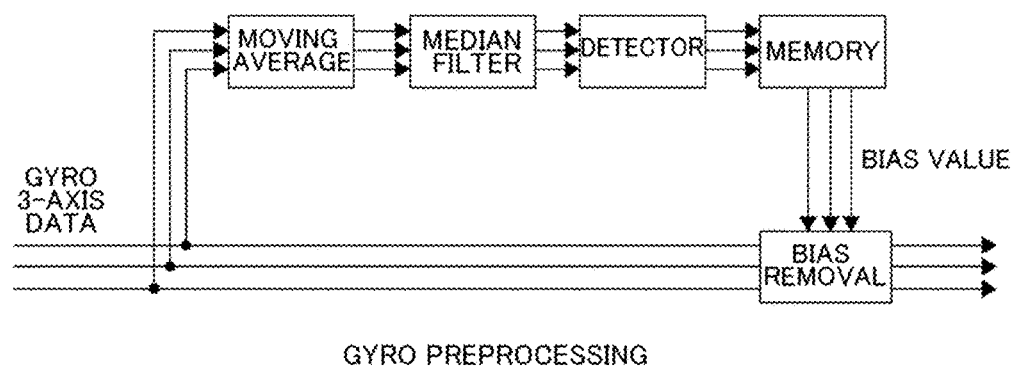
FIG. 56 is an illustrative diagram of a preprocessing for removing a bias on the gyro side.
Figure 57:
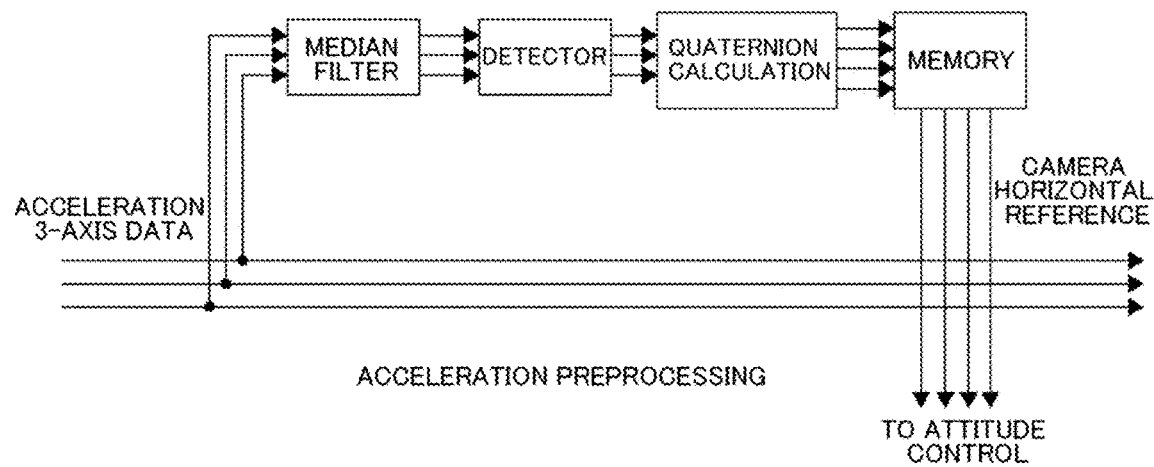
FIG. 57 is an illustrative diagram of preprocessing for horizontal reset on the acceleration side.

FIGS. 56 and 57 are illustrative diagrams of preprocessing of acceleration and gyro (angular velocity).

In the present embodiment, the feature quantity is extracted using AI in the system, but in an actual IMU stabilization system, there is a bias problem in both a gyro sensor and an acceleration sensor, and there is concern that, when these biases are too large, feature quantity correction as expected is difficult to perform. Therefore, a preprocessing block (the preprocessing unit 4) is included as a component.

FIG. 56 is an illustrative diagram of preprocessing for removing a bias on the gyro side.

A detector detects that the IMU is in a stationary state on the basis of a horizontal reset instruction from the host side. A median filter is installed in a stage before the detector to absorb sudden noise. After a static determination is made, a moving average for a predetermined time is calculated, and a calculated moving average value is stored in a memory as an amount of bias. Offset removal is performed on each sample and gyro 3-axis data on the basis of the amount of bias stored in the memory in this way.

FIG. 57 is an illustrative diagram of preprocessing for horizontal reset on the acceleration side.

Unlike the case of a gyro bias, because the acceleration sensor is always influenced by gravitational acceleration, a perfect horizontal state cannot be kept in actual use cases. Therefore, it is not possible to remove a pure bias as in the gyro side. The acceleration sensor regards an amount of deviation as being horizontal even when there is some deviation, for example, in a state in which a wearer of a wearable camera is caused to be in a horizontal attitude.

As the preprocessing in this case, median filter processing is performed on the acceleration 3-axis data as in the case of the gyro, the detector detects that the IMU is in a stationary state, and a quaternion attitude that defines a horizontal attitude is generated from an acceleration value and a gravitational acceleration at that time and stored in a memory. In the attitude control in this case, an acceleration horizontal quaternion value stored in the memory in this way is used as a new camera center reference quaternion attitude.

Figure 58:
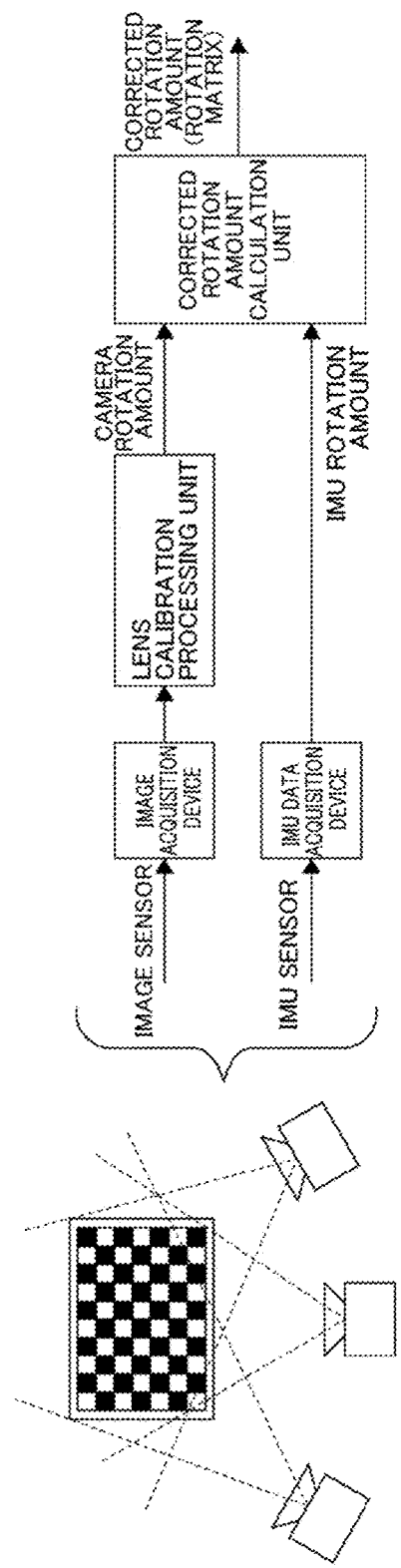
FIG. 58 is an illustrative diagram of correction of a deviation between an optical axis and a rotation axis.

FIG. 58 is an illustrative diagram of correction of a deviation between an optical axis and a rotation axis.

A camera with an IMU sensor is required to be manufactured so that optical axes (three axes composed of a lens and an image sensor) and rotation axes (three axes of the IMU) do not deviate from each other. A "camera calibration" technology for correcting an axis deviation between a lens center and the image sensor has been established and can be easily performed by using OpenCV or the like. Further, an "IMU calibration" scheme for matching an acceleration with an axis deviation of the gyro constituting the IMU has also been established, and can be performed using a widely known technology such as IMU-TK.

However, a technology for correcting the deviation between the optical axis and the rotation axis has not been established, and for a normal operation of the feature quantity correction according to the embodiment, the camera Is required to be manufactured with high accuracy so that the axis deviation do not occur.

In the present example, a board (chess board, or the like) capable of feature extraction is used to perform "optical axis and rotation axis deviation correction" at the same time as "camera calibration". It is assumed that the board is installed so that the board is horizontal and vertical to gravity. As a premise of the present measurement, IMU calibration is performed and applied separately or at the same time as the present measurement. A product of a correction rotation matrix (3×3) and an IMU value (3×1) is an IMU value after correction.

A specific procedure is shown below.

1) Install a board capable of feature extraction horizontally and vertically.

2) Use a camera with an IMU to photograph the board in N directions. Keep the camera still in that an attitude for a few seconds after photographing in one direction.
3) Execute lens calibration processing to obtain a rotation matrix Ri (i=1, ..., N) of N captured images. Obtain a vector ai obtained by rotating an acceleration vector a by Ri−1.
4) Obtain an acceleration vector gi (i=1, ..., N) for each attitude.
5) Obtain a correction rotation matrix R in which R*gi=ai using a least squares method, or the like.

9. Feature Quantity Extraction Related to Images

In the description so far, feature quantity extraction from the IMU signal has been given as an application example of the feature quantity extraction scheme as an embodiment, but the feature quantity extraction scheme as an embodiment is also applicable to other signals, as well as the IMU signal.

Hereinafter, an extraction scheme for various feature quantities for image signals will be described as a specific example.

Figure 59:
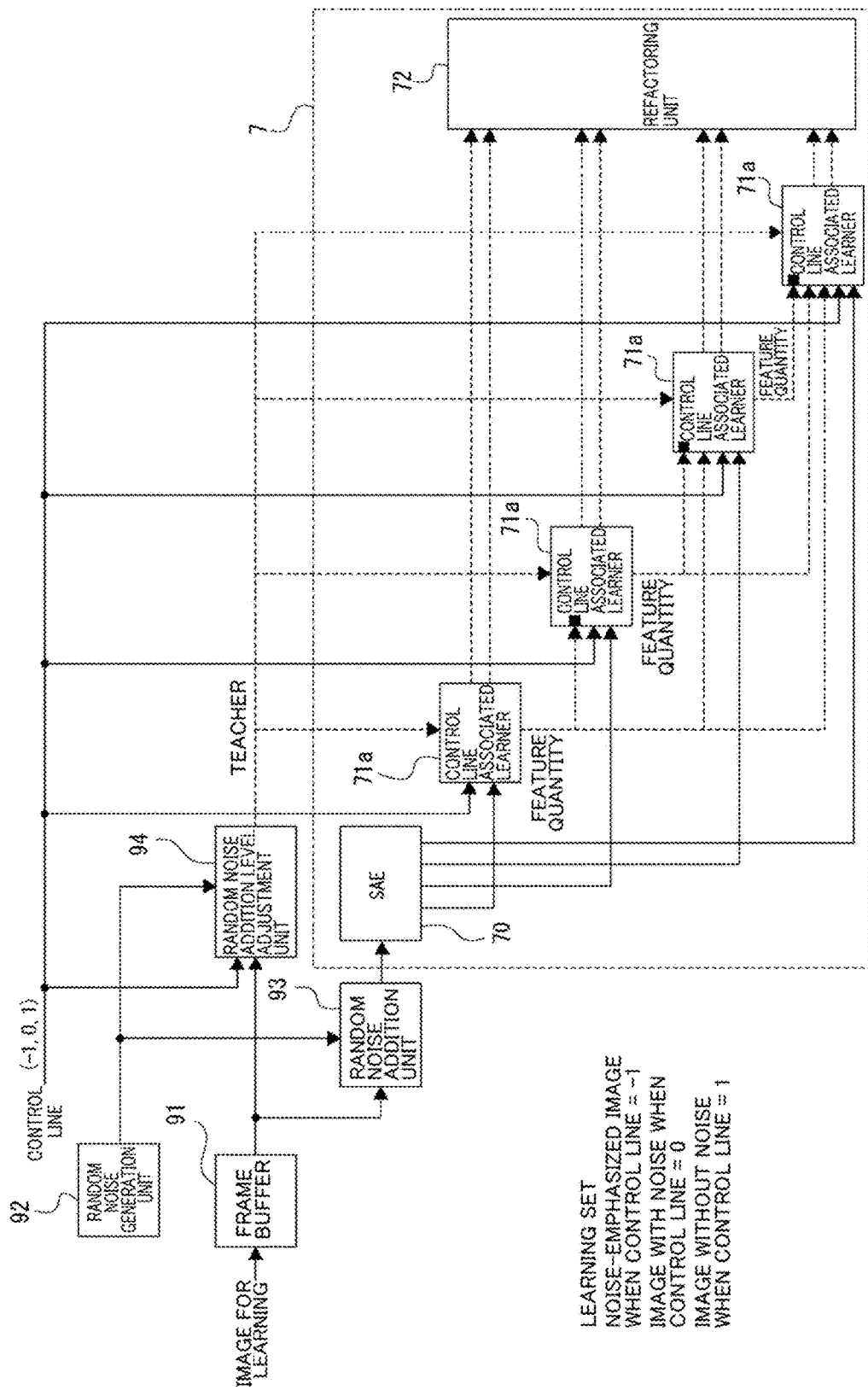
FIG. 59 is an illustrative diagram of an imaging noise feature quantity extraction scheme (learning environment).
Figure 60:
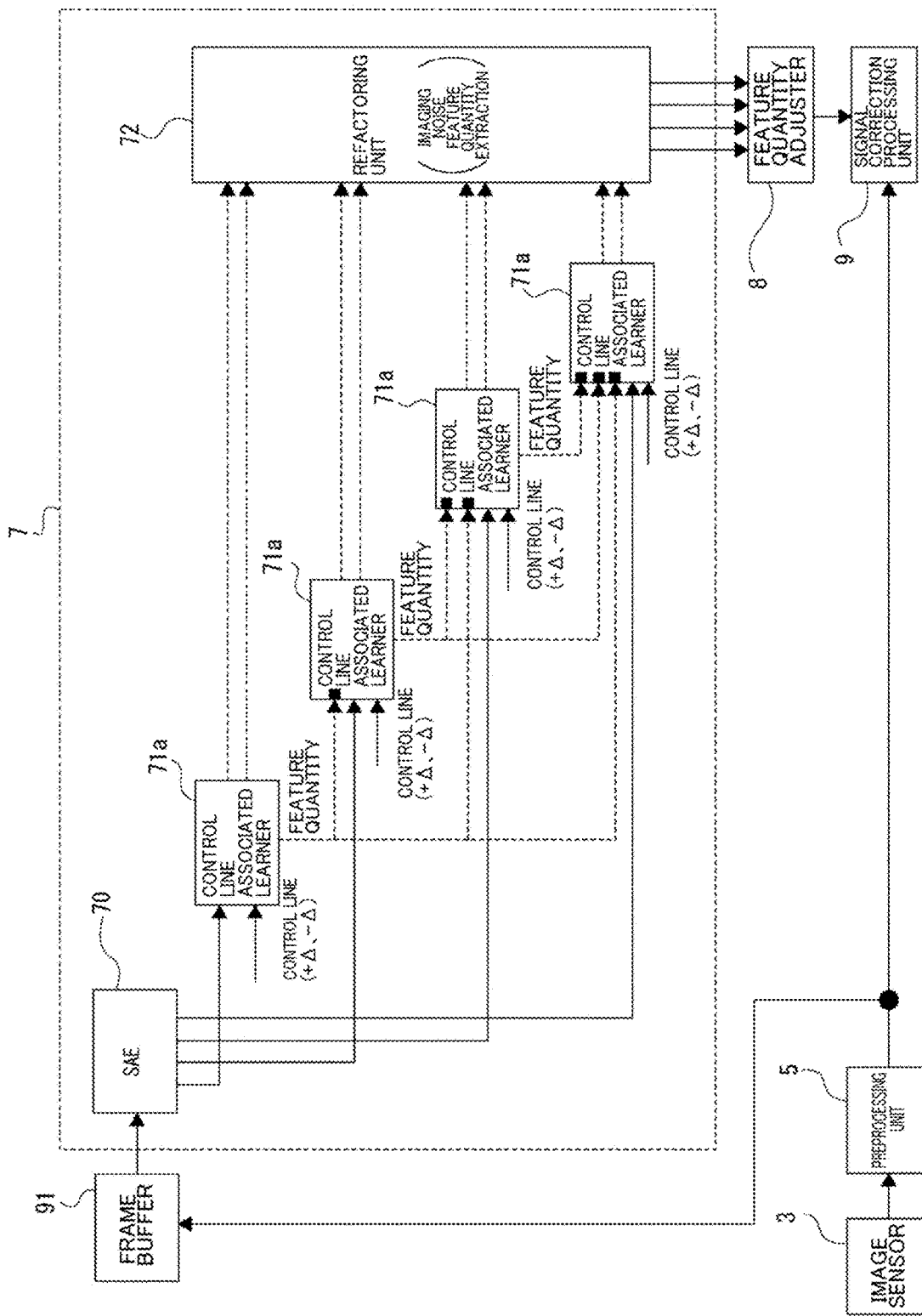
FIG. 60 is an illustrative diagram of an imaging noise feature quantity extraction scheme (environment after mounting).

FIGS. 59 and 60 are illustrative diagram of an imaging noise feature quantity extraction scheme.

In a learning environment illustrated in FIG. 59, image data as the image for learning is prepared. Further, a frame buffer 91 is included in order to use a plurality of frame images to improve estimation accuracy of imaging noise.

The random noise is added to the image data for learning by a random noise generation unit 92 and a random noise addition unit 93, this is given to the input of the SAE 70 in the learner, and control line associated learning is performed.

In this case, as the teacher data, a random noise addition level adjustment unit 94 gives teacher data in which a noise level is changed according to the value of the control line. For example, an image without noise when the value of the control line=1.0, an image with noise when the value of the control line=0.0, and a noise-enhanced image when the value of the control line=−1.0 are given as a teacher.

As shown in the figure, a plurality of control line associated learners 71a are provided, and the feature quantity obtained in each corresponding intermediate layer in the SAE 70 are input to each control line associated learner 71a. A feature quantity obtained by convolution of the control line associated learner 71a on the upper layer is input to each control line associated learner 71a other than the control line associated learner 71a on a top layer, and the accuracy is improved.

As a result of the control line associated learning as described above, an algorithm for switching between the aspects of the noise feature quantity to be output, according to the value given to the control line, is generated.

Specifically, an algorithm for outputting images having different noise levels is generated according to the value given to the control line.

In the environment after mounting on the signal processing device 1, an extracted feature quantity when the control line value=+Δ is given to each control line associated learner 71a, and an extracted feature quantity when the control line value=−Δ is given are input to the refactoring unit 72, as illustrated in FIG. 60. In the refactoring unit 72, a difference between these extracted feature quantities is calculated, and LPF processing or HPF processing is performed as necessary to obtain an imaging noise feature quantity.

The imaging noise feature quantity extracted in this way is input to the signal correction processing unit 9 after being adjusted by the feature quantity adjuster 8.

In this case, the signal correction processing unit 9 performs correction processing for removing imaging noise on the captured image input via the preprocessing unit 5 on the basis of the imaging noise feature quantity.

This makes it possible to realize high-quality imaging noise removal from the captured images. Further, when correction is performed so that the imaging noise is emphasized, a deblurring effect for correcting blur can be obtained as an inverse characteristic of three-dimensional noise reduction (3D-NR).

Figure 61:
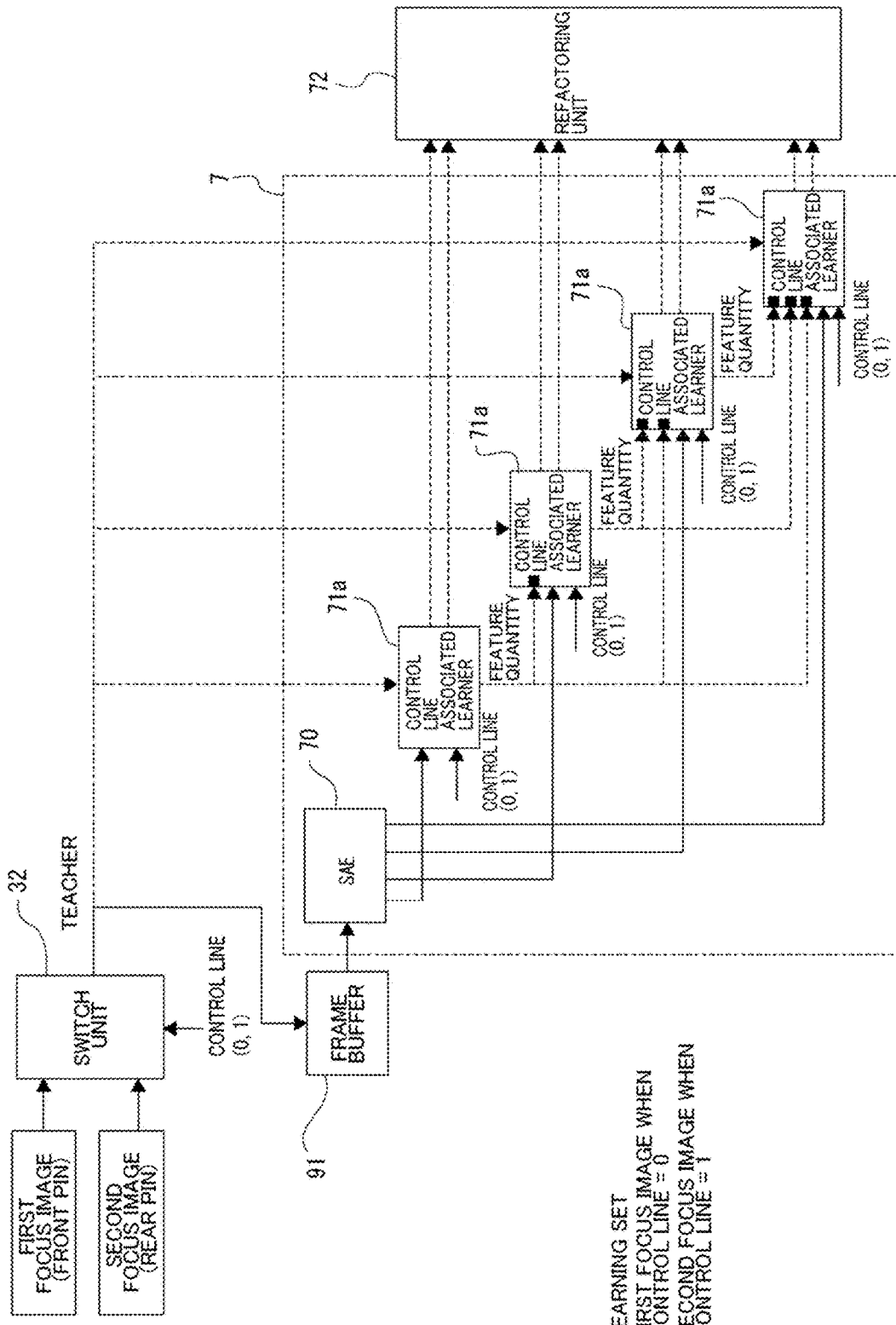
FIG. 61 is an illustrative diagram of a focus feature quantity extraction scheme (learning environment).
Figure 62:
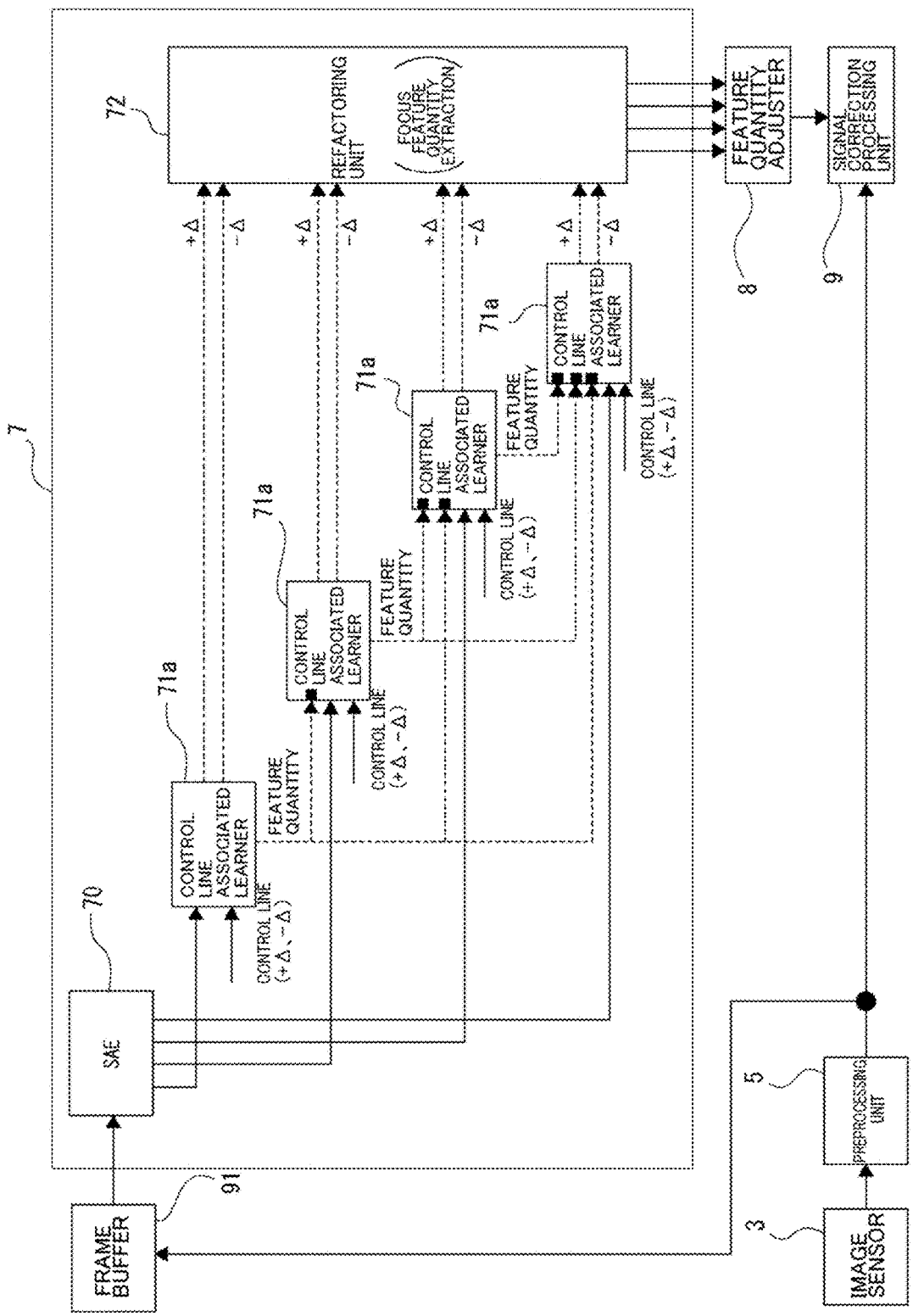
FIG. 62 is an illustrative diagram of a focus feature quantity extraction scheme (environment after mounting).

FIGS. 61 and 62 are illustrative diagram of a focus feature quantity extraction scheme.

When the feature quantity as the focus can be extracted, it is possible to adjust a focus position in a depth direction of the image through image correction processing using the feature quantity. That is, it is possible to adjust the focus after photographing.

In a learning environment illustrated in FIG. 61, a first focus image and a second focus image are prepared as images for learning. The first and second focus images are images having different focus positions in the depth direction (distance direction). Specifically, a front pin image is prepared as the first focus image, and a rear pin image is prepared as the second focus image.

The first and second focus images are switched by the switch unit 32 according to the value of the control line, are output, and are input to the SAE 70 in the learner via the frame buffer 91, and control line associated learning is performed. In this case, the teacher data is given by the switch unit 32 switching between the first and second focus images according to the value of the control line. For example, the focus image is switched to the first focus image when the control line value=0.0, and to the second focus image when the control line value=1.0. In this case, learning at multiple resolutions using a plurality of control line associated learners 71a is also performed to improve accuracy.

An algorithm for switching between aspects of a focus feature quantity to be output according to the value given to the control line is generated by performing the control line associated learning as described above. Specifically, an algorithm for outputting images having different focus positions in the depth direction according to the value given to the control line is generated.

In the environment after mounting on the signal processing device 1, an extracted feature quantity when the control line value=+Δ is given to each control line associated learner 71a, and an extracted feature quantity when the control line value=−Δ is given are input to the refactoring unit 72, as illustrated in FIG. 62. In the refactoring unit 72, a difference between these extracted feature quantities is calculated, and LPF processing or HPF processing is performed as necessary to extract the focus feature quantity.

The focus feature quantity extracted in this way is input to the signal correction processing unit 9 after being adjusted by the feature quantity adjuster 8.

In this case, the signal correction processing unit 9 performs correction processing for adjusting the focus position in the depth direction with respect to the captured image input via the preprocessing unit 5 on the basis of the focus feature quantity.

Figure 63:
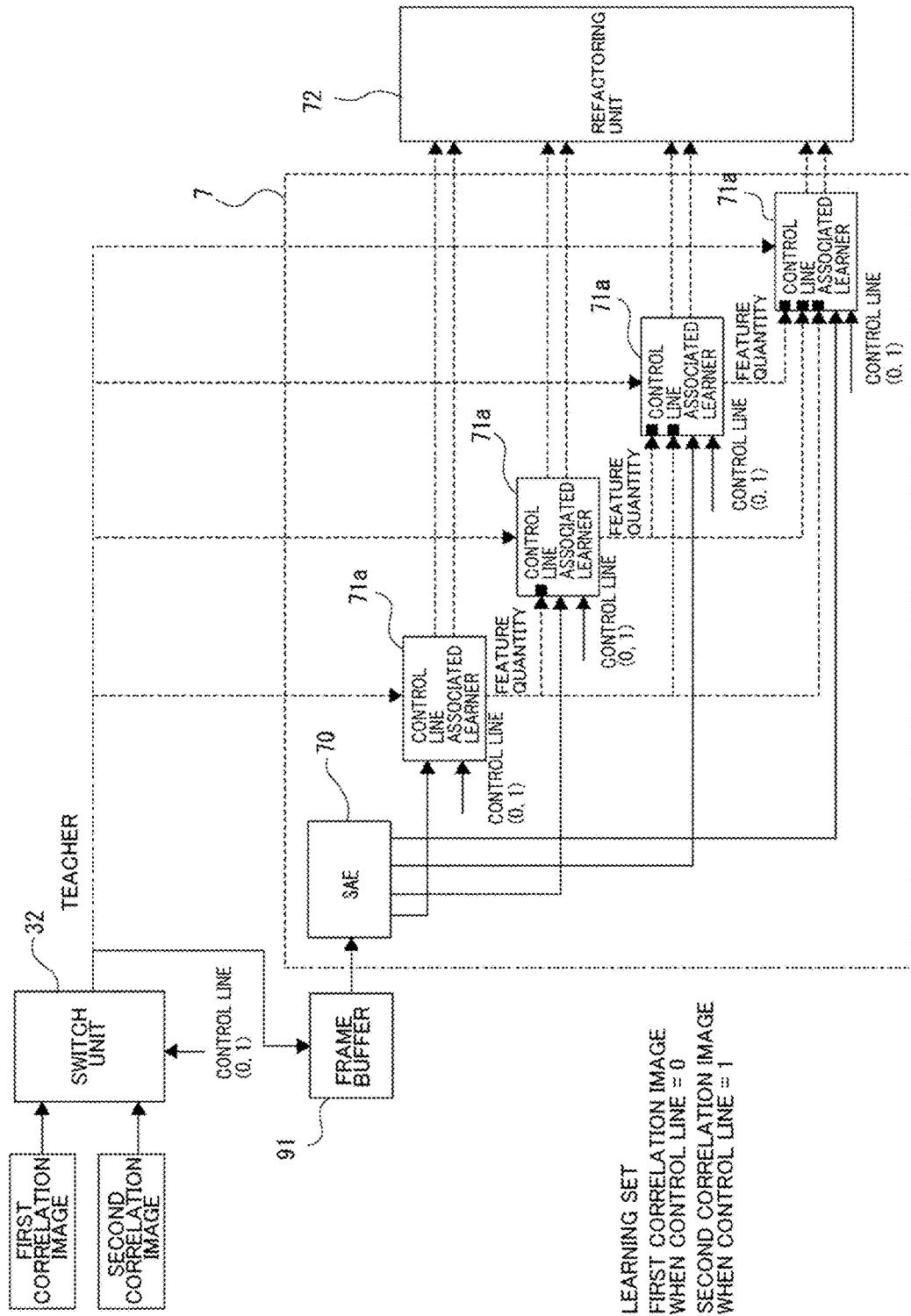
FIG. 63 is an illustrative diagram of a warp feature quantity extraction scheme (learning environment).

FIGS. 63 and 64 are illustrative diagrams of a warp feature quantity extraction scheme.

A warp feature quantity is a feature quantity indicating a warp amount between two images having a correlation. When the warp feature quantity can be extracted, it is possible to obtain an integral image between stereo images, an interpolated image between two temporally continuous frame images, and the like.

In this case, in the learning environment illustrated in FIG. 63, two types of images having a correlation (referred to as a first correlation image and a second correlation image) are prepared. As the first and second correlation images, for example, images having a correlation in time (for example, images for two consecutive frames) or stereo images are prepared.

The first and second correlation images are switched by the switch unit 32 according to the value of the control line, are output, and are input to the SAE 70 in the learner via the frame buffer 91, and control line associated learning is performed. In this case, the teacher data is given by switching between the first and second correlation images according to the value of the control line by the switch unit 32. For example, the correlation image is switched to the first correlation image when the control line value=0.0, and to the second correlation image when the control line value=1.0.

In this case, learning at multiple resolutions using a plurality of control line associated learners 71a is also performed to improve accuracy.

An algorithm for switching between aspects of the warp feature quantity to be output is generated according to the value given to the control line by performing the control line associated learning as described above.

In the environment after mounting on the signal processing device 1, an extracted feature quantity when the control line value=+Δ is given to each control line associated learner 71a, and an extracted feature quantity when the control line value=−Δ is given are input to the refactoring unit 72, as illustrated in FIG. 64.

In this case, the refactoring unit 72 analyzes the motion vector using template matching between the two extracted feature quantities, performs LPF processing or HPF processing on the obtained motion vector quantities as necessary, and outputs a resultant quantity to the feature quantity adjuster 8 as the warp feature quantity.

In this case, the signal correction processing unit 9 performs correction processing for generating an interpolated image (a temporally or spatially correlated image with respect to the input image) with respect to the captured image input via the preprocessing unit 5 on the basis of the motion vector quantity as the warp feature quantity input via the feature quantity adjuster 8.

A scheme for generating an interpolated image based on the warp feature quantity as described above can obtain extremely accurate results as compared with a scheme using a matching scheme such as zero-mean normalized cross-correlation (ZNCC) of the related art.

The example in which the correction processing based on the extracted feature quantity is performed on the captured image input from the image sensor 3 has been given above, but for example, a configuration in which correction processing based on an extracted feature quantity is performed on an image read from a storage device such as a hard disk drive (HDD) or a solid state drive (SSD) can be adopted.

10. Modification Example

The present technology is not limited to the specific examples described so far, and configurations as various modification examples may be adopted.

For example, the IMU sensor 2 and the image sensor 3 are exemplified above as examples of a sensor that is a target in the present technology, but the sensors are not limited to the IMU sensor 2 and the image sensor 3. Examples of the sensors can include various sensors such as a temperature sensor, a microphone, a magnetic sensor, a position sensor, and an altitude sensor.

Further, the example in which the signal processing device 1 includes the score classification scene analyzer 10 has been described above, but it is not essential to include the score classification scene analyzer 10.

11. Conclusion of Embodiments

As described above, the first signal processing device (the signal processing device 1) as the embodiment includes: a feature quantity extraction unit (the feature quantity extraction unit 7) including a neural network and trained to extract a feature quantity for a specific event with respect to an input signal from a sensor; and a correction unit (the signal correction processing unit 9) configured to perform correction of the input signal on the basis of the feature quantity extracted by the feature quantity extraction unit.

Examples of the "feature quantity" for a specific event may include a feature quantity for centrifugal force or vibration as an effect when a sensor is a motion sensor for detecting motion of a target object, such as an acceleration sensor or an angular velocity sensor. That is, the feature quantity is a feature quantity representing what is centrifugal force, a feature quantity representing what is vibration that should be given to produce a sense of presence in stabilization processing of a camera, and the like. Alternatively, when the sensor is an image sensor, examples of the feature quantity can include a feature quantity of imaging noise (feature quantity representing what is imaging noise), and a feature quantity of focus (a feature quantity representing what is focus). For example, when the feature quantity as the centrifugal force can be extracted, it is possible to realize processing of removing an adverse effect of the centrifugal force as the stabilization processing by canceling out the feature quantity in the input signal, and it is possible to improve stabilization performance.

Alternatively, when the feature quantity as the focus can be extracted, it is possible to adjust the focus position in the depth direction of the image through image correction processing using the feature quantity. That is, it is possible to adjust the focus after photographing.

In the present technology, a feature quantity for an event difficult to express by a mathematical equation, such as the centrifugal force or the focus, is extracted like an object by learning using AI technology, and the input signal is corrected on the basis of the extracted feature quantity. This makes it possible to easily realize the correction processing difficult in filter processing of the related art. Therefore, it is possible to improve performance regarding the correction of the input signal from the sensor.

Here, in the present embodiment, signal processing performance is improved by extracting a feature of an object such as "centrifugal force" from sensor information. Further, in image processing, for example, imaging noise, an optical phenomenon such as focus, a warp feature quantity (a motion vector), and the like are all feature-extracted in the form of an object, and image processing with unprecedented performance is realized. Thus, the present embodiment has technical characteristics not found in the related art in that a sensing system in the form of an "object sensor" having a high degree of abstraction is constructed by combining a sensor of the related art with an AI technology.

Further, the first signal processing device as the embodiment includes an adjuster (the feature quantity adjuster 8) that adjusts the feature quantity extracted by the feature quantity extraction unit.

This makes it possible to perform the adjustment of the feature quantity so that a better result can be obtained as a correction result for the input signal. Therefore, it is possible to improve correction performance for the input signal.

Further, in the first signal processing device as the embodiment, the sensor is a motion sensor (the IMU sensor 2) that detects the motion of the imaging device, and a stabilization processing unit (the stabilization processing unit 13) that performs stabilization processing on the captured image of the imaging device on the basis of the input signal from the motion sensor corrected on the basis of the feature quantity by the correction unit is included.

This makes it possible to perform stabilization processing on the basis of a motion detection signal from which the component of the centrifugal force has been removed, for example, when the feature quantity of the centrifugal force is extracted as the feature quantity. Alternatively, when, for example, the feature quantity of the vibration as an effect is extracted as the feature quantity, it is possible to perform the stabilization processing based on the motion detection signal from which the vibration component as the effect has been removed. That is, it is possible to prevent the vibration component as the effect from being removed in the stabilization processing.

Therefore, as the stabilization processing of the captured image, it is possible to realize an appropriate stabilization processing suitable for the purpose.

Furthermore, the first signal processing device as the embodiment includes a score calculation unit (the score classification scene analyzer 10) including a adjuster that adjusts the feature quantity extracted by the feature quantity extraction unit, and a neural network, and trained to calculate an evaluation score representing the performance of stabilization processing on the basis of the input signal from the motion sensor, and performs the adjustment of the feature quantity used for correction of the input signal by the correction unit on the basis of the evaluation score calculated by the score calculation unit.

An amount of calculation can be reduced as compared with a case in which calculation of the evaluation score based on the image after the stabilization processing is performed, by calculating the evaluation score on the basis of the input signal from the motion sensor as described above.

Therefore, it is possible to reduce calculation resources when appropriately adjusting the feature quantity according to the evaluation score.

Further, in the first signal processing device as the embodiment, the stabilization processing unit generates a grid point mesh which has a plurality of grid points arranged in the horizontal direction and the vertical direction in an output coordinate system that is the coordinate system of the output image, and in which motion information obtained from the input signal is associated with each grid point, and the stabilization processing unit performs stabilization processing on the basis of the motion information for each grid point in the grid point mesh. This makes it possible to improve accuracy of the reference coordinates at each pixel position of the output image.

Therefore, it is possible to improve the performance of the stabilization processing.

Further, the first signal processing device as the embodiment includes a phase adjuster (the phase adjustment unit 11) that calculates a delay amount generated by the correction processing for the input signal performed on the basis of the feature quantity by the correction unit, and performs phase adjustment for the input signal on the basis of the delay amount.

This makes it possible to realize appropriate stabilization processing even when the correction processing has a certain amount of delay. In particular, effective correction can be performed on RS distortion.

Therefore, it is possible to improve the stabilization performance.

Figure 51:
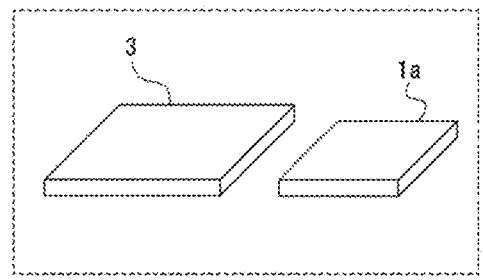
FIG. 51 is a diagram illustrating a structure example of a signal processing device.

Further, in the first signal processing device as the embodiment, the integrated circuit chip (the signal processing unit 1a) including an image sensor that obtains a captured image and including a feature quantity extraction unit and a correction unit is mounted in the same semiconductor package as the image sensor (see FIGS. 51 and 52).

This makes it possible to downsize the signal processing device as compared with a case in which the image sensor and the integrated circuit chip are mounted in separate packages.

Further, in the first signal processing device as the embodiment, the image sensor is laminated on the integrated circuit chip (see FIG. 52).

This makes it possible to stack the image sensor and the integrated circuit chip in a vertical direction in the same package and accommodate these in a small space.

Therefore, it is possible to downsize the signal processing device.

Further, a first signal processing method as an embodiment is a signal processing method including:

performing correction of an input signal on the basis of a feature quantity extracted by a feature quantity extraction unit including a neural network and trained to extract the feature quantity for a specific event with respect to the input signal from a sensor.

With such a first signal processing method, it is possible to obtain the same operation and effects as those in the first signal processing device described above.

Further, a second signal processing device (the signal processing device 1) as the embodiment includes a stacked auto encoder (the stacked auto encoder 70) that processes the input signal from the sensor, a control line associated learner (the control line associated learner 71a) including a neural network and subjected to control line associated learning for performing learning by associating different event aspects related to a specific event with values of different control lines with a feature quantity obtained in an intermediate layer of the stacked auto encoder after pretraining as an input, and a refactorer (the refactorer 72a) that obtains the difference between the first output that is the output of the control line associated learner when the first value is given to the control line, and the second output that is the output of the control line associated learner when the second value different from the first value is given to the control line.

The "specific event" here means an event in which, for example, centrifugal force for motion data and focus for image data are feature quantity extraction targets. Further, the "event aspect" referred to here means, for example, an aspect relating to a specific event, such as an aspect of "with centrifugal force" or an aspect of "without centrifugal force" in the case of centrifugal force, or an aspect of "front pin" and an aspect of "rear pin" in the case of focus. According to the above configuration, the feature quantity for the specific event is obtained as an output difference between a case of a first event aspect (for example, with centrifugal force) and a case of a second event aspect (for example, without centrifugal force).

Therefore, it is possible to appropriately extract the feature quantity for the specific event.

In this case, it is not necessary for the control line associated learner to adopt a configuration using a fully connected layer like a general CNN, and it is possible to reduce calculation resources for feature quantity extraction. Therefore, according to the present embodiment, it is possible to appropriately extract the feature quantity for the specific event while curbing an increase in calculation resources.

Further, in the second signal processing device as an embodiment, the refactorer includes a frequency filter that extracts some frequency components of a signal obtained as a difference (see FIG. 8).

This makes it possible to perform waveform shaping on the signal obtained as the difference between the first output and the second output of the control line associated learner.

Therefore, even when a learning result of the control line associated learner is insufficient, it is possible to approach an expected feature quantity, and to improve accuracy of feature quantity extraction.

Further, the second signal processing device as an embodiment includes an adjuster (the feature quantity adjuster 8) that adjusts the feature quantity extracted by the refactorer.

This makes it possible to perform adjustment so that an appropriate feature quantity can be obtained even when the feature quantity is not extracted at an expected level in the refactorer.

Therefore, it is possible to improve the accuracy of the feature quantity.

Furthermore, in the second signal processing device as the embodiment, the sensor is a motion sensor (IMU sensor 2) that detects a motion of a target object, and the stacked auto encoder receives a detection signal from the motion sensor as an input signal.

This makes it possible to extract the feature quantity related to the motion of the target object using the learned AI.

Therefore, it is possible to appropriately obtain, for example, a feature quantity for an event difficult to formulate among events related to a motion of a target object, such as a feature quantity of centrifugal force acting on an in-vehicle camera (the feature quantity representing what is centrifugal force) or a feature quantity of vibration as an effect (the feature quantity representing what is vibration that should be given to produce a sense of presence in stabilization processing of a camera).

Further, in the second signal processing device as the embodiment, the sensor is an image sensor (the image sensor 3), and the stacked auto encoder receives an image signal captured by the image sensor as an input signal.

This makes it possible to extract the feature quantity related to the captured image using the trained AI.

Therefore, it is possible to appropriately obtain, for example, a feature quantity for an event difficult to formulate among events related to the captured image, such as a feature quantity of the imaging noise (a feature quantity representing what is imaging noise) and a feature quantity of focus (a feature quantity representing what is focus).

Further, in the second signal processing device as the embodiment, the sensor is a motion sensor that detects the motion of the imaging device, the stacked auto encoder receives a detection signal from the motion sensor as an input signal, and a correction unit (the signal correction processing unit 9) that performs correction of the input signal on the basis of the feature quantity extracted by the refactorer, and a stabilization processing unit (the stabilization processing unit 13) that performs stabilization processing on the captured image of the imaging device on the basis of the input signal corrected by the correction unit.

This makes it possible to perform stabilization processing on the basis of a motion detection signal from which the component of the centrifugal force has been removed, for example, when the feature quantity of the centrifugal force is extracted as the feature quantity. Alternatively, when, for example, the feature quantity of the vibration as an effect is extracted as the feature quantity, it is possible to perform the stabilization processing based on the motion detection signal from which the vibration component as the effect has been removed. That is, it is possible to prevent the vibration component as the effect from being removed in the stabilization processing.

Therefore, as the stabilization processing of the captured image, it is possible to realize an appropriate stabilization processing suitable for the purpose.

Furthermore, in the second signal processing device as an embodiment, the integrated circuit chip including an image sensor that obtains a captured image, and including the stacked auto encoder, the control line associated learner, and the refactorer is mounted in the same semiconductor package as the image sensor.

This makes it possible to downsize the signal processing device as compared with a case in which the image sensor and the integrated circuit chip are mounted in separate packages.

Further, in the second signal processing device as the embodiment, the image sensor is laminated on the integrated circuit chip.

This makes it possible to stack the image sensor and the integrated circuit chip in a vertical direction in the same package and accommodate these in a small space.

Therefore, it is possible to downsize the signal processing device.

Further, a second signal processing method as an embodiment is a signal processing method including obtaining a difference between a first output that is an output of the control line associated learner when a first value is given to a control line, and a second output that is an output of the control line associated learner when a second value different from the first value is given to the control line, for a signal processing device including a stacked auto encoder that processes an input signal from a sensor, and a control line associated learner including a neural network and subjected to control line associated learning for performing learning by associating different event aspects related to a specific event with values of different control lines with a feature quantity obtained in an intermediate layer of the stacked auto encoder after pretraining as an input. With such a second signal processing method, it is possible to obtain the same operation and effects as the second signal processing device described above.

Further, a parameter search method as an embodiment is a parameter search method for a signal processing device including a stacked auto encoder that processes the input signal from the sensor, a control line associated learner including a neural network and subjected to control line associated learning for performing learning by associating different event aspects related to a specific event with values of different control lines with a feature quantity obtained in an intermediate layer of the stacked auto encoder after pretraining as an input, and a refactorer that obtains a difference between a first output that is an output of the control line associated learner when a first value is given to the control line, and a second output that is an output of the control line associated learner when a second value different from the first value is given to the control line, in which the information processing device selects a combination of parameters to be set in the signal processing device according to a game operation, acquires an evaluation score for a signal processing result for the signal processing device in which the parameters by the selected combination have been set, and searches for a combination of parameters satisfying a predetermined evaluation score condition on the basis of the acquired evaluation score (see FIGS. 33 and 34).

This makes it possible to realize search for the optimum parameters for parameters related to the feature quantity extraction processing in the signal processing device, such as the first value or the second value given to the control line, through the approach of the distributed processing via game content. Therefore, it is possible to efficiently solve a more complicated refactoring proposition and improve efficiency of parameter search.

The effects described in the present specification are merely examples and are not limited, and other effects may be obtained.

12. Present Technology

The present technology can also adopt the following configurations.

(1) A signal processing device including: a feature quantity extraction unit including a neural network and trained to extract a feature quantity for a specific event with respect to an input signal from a sensor; and a correction unit configured to perform correction of the input signal on the basis of the feature quantity extracted by the feature quantity extraction unit.

(2) The signal processing device according to (1), including an adjuster configured to adjust the feature quantity extracted by the feature quantity extraction unit.

(3) The signal processing device according to (1) or (2), wherein the sensor is a motion sensor configured to detect a motion of an imaging device, and
the correction unit includes a stabilization processing unit configured to perform stabilization processing on a captured image of the imaging device on the basis of the input signal from the motion sensor corrected on the basis of the feature quantity.

(4) The signal processing device according to (3), including:
an adjuster configured to adjust the feature quantity extracted by the feature quantity extraction unit; and
a score calculation unit including a neural network and trained to calculate an evaluation score representing performance of the stabilization processing on the basis of an input signal from the motion sensor,
wherein the adjuster performs adjustment of the feature quantity used for correction of the input signal by the correction unit on the basis of the evaluation score calculated by the score calculation unit.

(5) The signal processing device according to (3) or (4), wherein the stabilization processing unit
generates a grid point mesh having a plurality of grid points arranged in a horizontal direction and a vertical direction in an output coordinate system as a coordinate system of an output image, motion information obtained from the input signal being associated with each grid point in the grid point mesh, and performs the stabilization processing on the basis of the motion information for each grid point in the grid point mesh.

(6) The signal processing device according to any one of (1) to (5), wherein the correction unit includes a phase adjuster configured to calculate a delay amount generated in correction processing of the input signal on the basis of the feature quantity and perform phase adjustment for the input signal on the basis of the delay amount.

(7) The signal processing device according to any one of (3) to (6), comprising an image sensor configured to obtain the captured image,
wherein an integrated circuit chip including the feature quantity extraction unit and the correction unit is mounted in the same semiconductor package as that of the image sensor.

(8) The signal processing device according to (7), wherein the image sensor is stacked on the integrated circuit chip.

(9) A signal processing method including:
performing correction of an input signal on the basis of a feature quantity extracted by a feature quantity extraction unit including a neural network and trained to extract the feature quantity for a specific event with respect to the input signal from a sensor.

REFERENCE SIGNS LIST

1 Signal processing device
2 IMU sensor
3 Image sensor
6 Quaternion calculation unit
7 Feature quantity extraction unit
70 SAE (stacked auto encoder)
71 Control line associated learning unit
71a Control line associated learner
72 Refactoring unit
72a Refactorer
8 Feature quantity adjuster
9 Signal correction processing unit
10 Score classification scene analyzer
11 Phase adjustment unit
12 Delay amount calculation unit
13 Stabilization processing unit
9a Sensor noise correction unit
9b Centrifugal force correction unit
9c Effect correction unit
9d State machine correction unit
9e Camera work correction unit
22 Switch unit
23 Score analyzer
24 Automatic adjuster
50 Information processing device
51 Control unit
F1 Control line and blend ratio control processing unit
F2 Score acquisition processing unit
F3 Display processing unit
F4 Convergence determination processing unit
61 Reference coordinate calculation unit
62 Buffer control unit
63 Buffer memory
64 Memory control unit
65 Cache memory
66 Interpolation filter
CR Reference coordinates
L1 Virtual line
Pr Reference pixel Ar Reference area
81 Grid point mesh generation and shaping unit
82 Segment matrix generation unit
83 Segment search unit
84 Remesh data generation unit
85 Each pixel coordinate interpolation unit
81a Grid point mesh generator
81b Lens distortion corrector
81c Projector
81d Rotator
81e Free curvature perspective projector
81f Scanning controller
81g Clipper
81h Each grid point reference coordinate calculator
91 Frame buffer
92 Random noise generation unit
93 Random noise addition unit
94 Random noise addition level adjustment unit

The invention claimed is:

1. A signal processing device comprising:
circuitry configured to
perform extraction of a feature quantity for a specific event with respect to an input signal from a sensor, the extraction being trained with a neural network, the sensor being a motion sensor detecting a motion of an imaging device,
perform correction of the input signal on the basis of the extracted feature quantity,
generate a grid point mesh having a plurality of grid points arranged in a horizontal direction and a vertical direction in an output coordinate system as a coordinate system of an output image, motion information obtained from the input signal being associated with each grid point in the grid point mesh, and
perform stabilization processing on a captured image of the imaging device on the basis of the input signal from the motion sensor corrected on the basis of the extracted feature quantity, the stabilization processing being performed on the basis of the motion information for each grid point in the grid point mesh.

2. The signal processing device according to claim 1, wherein the circuitry is configured to adjust the extracted feature quantity.

3. The signal processing device according to claim 1, wherein the circuitry is configured to
adjust the extracted feature quantity,
perform calculation of an evaluation score representing performance of the stabilization processing on the basis of an input signal from the motion sensor, the calculation of the evaluation score being trained by a neural network,
wherein the circuitry is configured to perform adjustment of the feature quantity used for correction of the input signal on the basis of the evaluation score.

4. The signal processing device according to claim 1, wherein the circuitry is configured to calculate a delay amount generated in correction processing of the input signal on the basis of the feature quantity and perform phase adjustment for the input signal on the basis of the delay amount.

5. The signal processing device according to claim 1, comprising an image sensor configured to obtain the captured image,
wherein an integrated circuit chip including the circuitry and the image sensor are mounted in the same semiconductor package.

6. The signal processing device according to claim 5, wherein the image sensor is stacked on the integrated circuit chip.

7. A signal processing method comprising:
performing extraction of a feature quantity for a specific event with respect to an input signal from a sensor, the extraction being trained with a neural network, the sensor being a motion sensor detecting a motion of an imaging device;
performing correction of an input signal on the basis of the extracted feature quantity;
generating a grid point mesh having a plurality of grid points arranged in a horizontal direction and a vertical direction in an output coordinate system as a coordinate system of an output image, motion information obtained from the input signal being associated with each grid point in the grid point mesh; and
performing stabilization processing on a captured image of the imaging device on the basis of the input signal from the motion sensor corrected on the basis of the extracted feature quantity, the stabilization processing being performed on the basis of the motion information for each grid point in the grid point mesh.

8. A non-transitory computer-readable storage medium including computer executable instructions, wherein the instructions, when executed by a signal processing device, cause the signal processing device to perform a method, the method comprising:
performing extraction of a feature quantity for a specific event with respect to an input signal from a sensor, the extraction being trained with a neural network, the sensor being a motion sensor detecting a motion of an imaging device;
performing correction of an input signal on the basis of the extracted feature quantity;
generating a grid point mesh having a plurality of grid points arranged in a horizontal direction and a vertical direction in an output coordinate system as a coordinate system of an output image, motion information obtained from the input signal being associated with each grid point in the grid point mesh; and
performing stabilization processing on a captured image of the imaging device on the basis of the input signal from the motion sensor corrected on the basis of the extracted feature quantity, the stabilization processing being performed on the basis of the motion information for each grid point in the grid point mesh.

9. The non-transitory computer-readable storage medium according to claim 8, wherein the method further comprising:
adjusting the extracted feature quantity.

10. The non-transitory computer-readable storage medium according to claim 8, wherein the method further comprising:
adjusting the extracted feature quantity;
performing calculation of an evaluation score representing performance of the stabilization processing on the basis of an input signal from the motion sensor, the calculation of the evaluation score being trained by a neural network; and
performing adjustment of the feature quantity used for correction of the input signal on the basis of the evaluation score.

11. The non-transitory computer-readable storage medium according to claim 8, wherein the method further comprising:

calculating a delay amount generated in correction processing of the input signal on the basis of the feature quantity and perform phase adjustment for the input signal on the basis of the delay amount.

* * * * *